United States Patent
Ansari et al.

(10) Patent No.: US 10,530,598 B2
(45) Date of Patent: Jan. 7, 2020

(54) VOICE CONTROL OF ENDPOINT DEVICES THROUGH A MULTI-SERVICES GATEWAY DEVICE AT THE USER PREMISES

(71) Applicant: KIP PROD P1 LP, New York, NY (US)

(72) Inventors: Amir Ansari, Plano, TX (US); George A. Cowgill, Farmersville, TX (US); Leon E. Nicholls, Santa Clara, CA (US); Atousa Raissyan, Potomac, MD (US); Jude P. Ramayya, Richardson, TX (US); Ramprakash Masin, Plano, TX (US); Alvin R. McQuarters, Euless, TX (US)

(73) Assignee: KIP PROD P1 LP, New York, NY (US)

( * ) Notice: Subject to any disclaimer, the term of this patent is extended or adjusted under 35 U.S.C. 154(b) by 0 days.

(21) Appl. No.: 14/962,165

(22) Filed: Dec. 8, 2015

(65) Prior Publication Data

US 2016/0226823 A1    Aug. 4, 2016

Related U.S. Application Data

(63) Continuation of application No. 12/521,746, filed as application No. PCT/US2007/019534 on Sep. 7, 2007, now Pat. No. 9,209,995.
(Continued)

(51) Int. Cl.
*H04L 12/28* (2006.01)
*H04L 12/24* (2006.01)
(Continued)

(52) U.S. Cl.
CPC .......... *H04L 12/2807* (2013.01); *G05B 15/02* (2013.01); *G05B 19/042* (2013.01);
(Continued)

(58) Field of Classification Search
CPC ...... Y04S 20/20; Y04S 20/227; Y04S 20/228; H04L 12/2803; H04L 12/2816;
(Continued)

(56) References Cited

U.S. PATENT DOCUMENTS 2,273,733 A    2/1942  Paddock
2,316,993 A    4/1943  Sherwood
(Continued)

FOREIGN PATENT DOCUMENTS

CN    102500747 A    6/2012
DE      3002904 A1   8/1980
(Continued)

OTHER PUBLICATIONS

"FAD-binding, type 2," SuperFamily Accession SSF56176, InterPro Accession IPR016166, downloaded May 24, 2012.
(Continued)

*Primary Examiner* — Daniel B Potratz
(74) *Attorney, Agent, or Firm* — Perkins Coie LLP

(57) ABSTRACT

A gateway device providing and managing interactive user voice-controlled home automation services over at least endpoint devices associated with the gateway device is described. Interfaces enable communications of the gateway device with at least one endpoint device located within a use premises and data networks. A processor coupled to the interfaces and programming in storage in the server operate a communications program for configuring the gateway to communicate with endpoint devices, associate endpoint devices with the gateway, and communicate with a remote serve to access service management center applications. A home automation control program provides operation via a home automation controller configured in the gateway with voice automation messaging protocols based on the voice commands to enable interactive voice-controlled control of (Continued)

endpoint devices using voice commands an automate functions associated with the endpoint devices.

50 Claims, 15 Drawing Sheets

Related U.S. Application Data

(60) Provisional application No. 60/882,862, filed on Dec. 29, 2006, provisional application No. 60/882,865, filed on Dec. 29, 2006.

(51) Int. Cl.

| | |
|---|---|
| *H04L 29/06* | (2006.01) |
| *H04N 21/00* | (2011.01) |
| *H04N 21/40* | (2011.01) |
| *G06Q 30/04* | (2012.01) |
| *H04L 29/12* | (2006.01) |
| *G06F 16/68* | (2019.01) |
| *G06F 16/64* | (2019.01) |
| *H04L 12/66* | (2006.01) |
| *H04L 29/08* | (2006.01) |
| *H04L 12/927* | (2013.01) |
| *H04L 12/947* | (2013.01) |
| *G10L 15/22* | (2006.01) |
| *G05B 15/02* | (2006.01) |
| *G08B 13/196* | (2006.01) |
| *G05B 19/042* | (2006.01) |
| *H04W 12/00* | (2009.01) |
| *H04W 12/08* | (2009.01) |
| *H04W 12/06* | (2009.01) |
| *H04W 4/80* | (2018.01) |
| *H04N 7/18* | (2006.01) |

(52) U.S. Cl.
CPC .............. *G06F 16/64* (2019.01); *G06F 16/68* (2019.01); *G06Q 30/04* (2013.01); *G08B 13/19656* (2013.01); *G10L 15/22* (2013.01); *H04L 12/2803* (2013.01); *H04L 12/2812* (2013.01); *H04L 12/2814* (2013.01); *H04L 12/2818* (2013.01); *H04L 12/66* (2013.01); *H04L 29/06027* (2013.01); *H04L 29/12132* (2013.01); *H04L 29/12169* (2013.01); *H04L 41/0803* (2013.01); *H04L 41/12* (2013.01); *H04L 41/22* (2013.01); *H04L 47/80* (2013.01); *H04L 49/25* (2013.01); *H04L 61/1552* (2013.01); *H04L 61/1576* (2013.01); *H04L 63/02* (2013.01); *H04L 63/08* (2013.01); *H04L 63/10* (2013.01); *H04L 63/20* (2013.01); *H04L 65/102* (2013.01); *H04L 67/104* (2013.01); *H04L 67/125* (2013.01); *H04L 67/141* (2013.01); *H04L 67/16* (2013.01); *H04L 67/20* (2013.01); *H04L 67/42* (2013.01); *G05B 2219/2642* (2013.01); *G10L 2015/223* (2013.01); *H04L 69/325* (2013.01); *H04L 2012/2849* (2013.01); *H04N 7/181* (2013.01); *H04N 21/00* (2013.01); *H04N 21/40* (2013.01); *H04W 4/80* (2018.02); *H04W 12/00* (2013.01); *H04W 12/06* (2013.01); *H04W 12/08* (2013.01); *Y10S 370/911* (2013.01)

(58) Field of Classification Search
CPC ......... H04L 12/2818; H04L 29/06448–06462; H04N 21/00; H04N 21/40; H04N 21/47–47211
See application file for complete search history.

(56) References Cited

U.S. PATENT DOCUMENTS

| | | |
|---|---|---|
| 4,297,607 A | 10/1981 | Lynnworth et al. |
| 4,467,586 A | 8/1984 | Long et al. |
| 4,814,552 A | 3/1989 | Stefik et al. |
| 4,835,130 A | 5/1989 | Box |
| 4,991,148 A | 2/1991 | Gilchrist |
| 5,339,259 A | 8/1994 | Puma et al. |
| 5,372,138 A | 12/1994 | Crowley et al. |
| 5,421,338 A | 6/1995 | Crowley et al. |
| 5,515,853 A | 5/1996 | Smith et al. |
| 5,517,579 A | 5/1996 | Baron et al. |
| 5,524,630 A | 6/1996 | Crowley |
| 5,588,432 A | 12/1996 | Crowley |
| 5,673,252 A | 9/1997 | Johnson et al. |
| 5,715,825 A | 2/1998 | Crowley |
| 5,750,941 A | 5/1998 | Ishikawa et al. |
| 5,840,031 A | 11/1998 | Crowley |
| 5,867,146 A | 2/1999 | Kim et al. |
| 5,867,666 A | 2/1999 | Harvey |
| 5,878,223 A | 3/1999 | Becker et al. |
| 5,943,478 A | 8/1999 | Aggarwal et al. |
| 5,977,958 A | 11/1999 | Baron et al. |
| 5,991,739 A | 11/1999 | Cupps et al. |
| 5,995,272 A | 11/1999 | Patz |
| 6,004,269 A | 12/1999 | Crowley et al. |
| 6,016,520 A | 1/2000 | Facq et al. |
| 6,029,045 A | 2/2000 | Picco et al. |
| 6,033,150 A | 3/2000 | Culen |
| 6,055,569 A | 4/2000 | O'Brien et al. |
| 6,092,114 A | 7/2000 | Shaffer et al. |
| 6,118,205 A | 9/2000 | Wood et al. |
| 6,158,483 A | 12/2000 | Trpkovski |
| 6,228,290 B1 | 5/2001 | Reames et al. |
| 6,301,609 B1 | 10/2001 | Aravamudan et al. |
| 6,330,599 B1 | 12/2001 | Harvey |
| 6,377,571 B1 | 4/2002 | Tai |
| 6,426,955 B1 | 7/2002 | Gossett Dalton, Jr. et al. |
| 6,434,158 B1* | 8/2002 | Harris .................. G06Q 20/40 |
| | | 235/472.01 |
| 6,434,618 B1 | 8/2002 | Cohen |
| 6,449,344 B1 | 9/2002 | Goldfinger et al. |
| 6,456,597 B1 | 9/2002 | Bare |
| 6,457,294 B1 | 10/2002 | Virnelson et al. |
| 6,487,646 B1 | 11/2002 | Adams et al. |
| 6,493,128 B1 | 12/2002 | Agrawal et al. |
| 6,526,581 B1 | 2/2003 | Edson |
| 6,542,506 B1 | 4/2003 | Lee |
| 6,549,937 B1 | 4/2003 | Auerbach et al. |
| 6,553,345 B1 | 4/2003 | Kuhn |
| 6,622,168 B1 | 9/2003 | Datta |
| 6,631,412 B1 | 10/2003 | Glasser et al. |
| 6,658,091 B1 | 12/2003 | Naidoo |
| 6,671,730 B1 | 12/2003 | Akatsu |
| 6,677,976 B2 | 1/2004 | Parker et al. |
| 6,681,232 B1 | 1/2004 | Sistanizadeh et al. |
| 6,694,007 B2 | 2/2004 | Lang et al. |
| 6,697,474 B1 | 2/2004 | Hanson et al. |
| 6,731,992 B1 | 5/2004 | Ziegler |
| 6,735,619 B1 | 5/2004 | Sawada |
| 6,745,632 B1 | 6/2004 | Dryer et al. |
| 6,771,006 B2 | 8/2004 | Zioter et al. |
| 6,798,403 B2 | 9/2004 | Kitada et al. |
| 6,850,252 B1 | 2/2005 | Hoffberg |
| 6,850,901 B1 | 2/2005 | Hunter et al. |
| 6,850,979 B1 | 2/2005 | Saulpaugh et al. |
| 6,851,054 B2 | 2/2005 | Wheeler et al. |
| 6,871,193 B1* | 3/2005 | Campbell ............ G06Q 20/102 |
| | | 705/40 |
| 6,889,321 B1 | 5/2005 | Kung et al. |
| 6,891,838 B1 | 5/2005 | Petite et al. |
| 6,898,276 B1 | 5/2005 | Millet et al. |
| 6,910,074 B1 | 6/2005 | Amin |
| 6,928,576 B2 | 8/2005 | Sekiguchi |
| 6,930,598 B2 | 8/2005 | Weiss |
| 6,931,445 B2 | 8/2005 | Davis |
| 6,957,275 B1 | 10/2005 | Sekiguchi |

(56) References Cited

U.S. PATENT DOCUMENTS

| | | |
|---|---|---|
| 6,961,335 B1 | 11/2005 | Millet et al. |
| 6,961,857 B1 | 11/2005 | Floryanzia |
| 6,965,614 B1 | 11/2005 | Osterhout et al. |
| 6,981,025 B1 | 12/2005 | Frazier |
| 6,988,070 B2 | 1/2006 | Kawasaki |
| 7,007,070 B1 | 2/2006 | Hickman |
| 7,035,270 B2 | 4/2006 | Moore, Jr. et al. |
| 7,054,376 B1 | 5/2006 | Rubinstain et al. |
| 7,058,036 B1 | 6/2006 | Yu et al. |
| 7,075,919 B1 | 7/2006 | Wendt et al. |
| 7,123,700 B1 | 10/2006 | Weaver, III et al. |
| 7,130,719 B2 | 10/2006 | Ehlers et al. |
| 7,139,811 B2 | 11/2006 | Lev Ran et al. |
| 7,167,920 B2 | 1/2007 | Traversat et al. |
| 7,203,477 B2 | 4/2007 | Coppinger et al. |
| 7,207,048 B2 | 4/2007 | McQuillan et al. |
| 7,222,087 B1 | 5/2007 | Bezos et al. |
| 7,235,710 B2 | 6/2007 | Hatzfeld et al. |
| 7,266,589 B2 | 9/2007 | Brownhill |
| 7,269,162 B1 | 9/2007 | Turner |
| 7,277,384 B1 | 10/2007 | Chan |
| 7,313,120 B2 | 12/2007 | Ekberg et al. |
| 7,336,262 B2 | 2/2008 | Tsuji |
| 7,349,993 B2 | 3/2008 | Kawamoto et al. |
| 7,397,807 B2 | 7/2008 | Chen et al. |
| 7,403,838 B2 * | 7/2008 | Deen .................. G05B 19/042 379/102.01 |
| 7,421,483 B1 | 9/2008 | Kalra |
| 7,444,401 B1 | 10/2008 | Keyghobad |
| 7,480,724 B2 | 1/2009 | Zimler et al. |
| 7,526,539 B1 | 4/2009 | Hsu |
| 7,551,071 B2 | 6/2009 | Bennett, III et al. |
| 7,574,660 B2 | 8/2009 | Campbell et al. |
| 7,584,263 B1 | 9/2009 | Hicks |
| 7,596,692 B2 | 9/2009 | Fox et al. |
| 7,627,679 B1 | 12/2009 | Bowen et al. |
| 7,650,361 B1 * | 1/2010 | Wong ................ G06F 17/30828 707/999.107 |
| 7,673,001 B1 | 3/2010 | Battle et al. |
| 7,685,629 B1 | 3/2010 | White et al. |
| 7,706,928 B1 | 4/2010 | Howell |
| 7,707,606 B2 | 4/2010 | Hofrichter et al. |
| 7,761,527 B2 | 7/2010 | Ferreira et al. |
| 7,765,294 B2 | 7/2010 | Edwards et al. |
| 7,809,605 B2 | 10/2010 | Tonse et al. |
| 7,831,748 B2 | 11/2010 | Dernis et al. |
| 7,836,044 B2 | 11/2010 | Kamvar et al. |
| 7,895,633 B2 | 2/2011 | Van Hoff et al. |
| 7,913,278 B2 | 3/2011 | Ellis et al. |
| 7,933,970 B2 | 4/2011 | Zimler et al. |
| 7,948,992 B1 | 5/2011 | Holmgren et al. |
| 7,961,712 B2 | 6/2011 | Rabenko et al. |
| 7,970,863 B1 | 6/2011 | Fontaine |
| 7,970,914 B2 | 6/2011 | Bowen et al. |
| 7,987,490 B2 | 7/2011 | Ansari et al. |
| 8,020,174 B2 | 9/2011 | Sedogbo |
| 8,031,726 B2 | 10/2011 | Ansari et al. |
| 8,060,589 B1 | 11/2011 | Kao |
| 8,086,495 B2 | 12/2011 | Ansari et al. |
| 8,090,856 B1 | 1/2012 | Bonefas |
| 8,189,608 B2 | 5/2012 | Duo et al. |
| 8,315,266 B1 | 11/2012 | Lam et al. |
| 8,374,586 B2 | 2/2013 | Bentkovski |
| 8,375,657 B2 | 2/2013 | Buchwald et al. |
| 8,391,299 B2 | 3/2013 | Schliserman et al. |
| 8,459,119 B2 | 6/2013 | Miyamoto |
| 8,461,413 B2 | 6/2013 | Frankard |
| 8,577,739 B2 | 11/2013 | Ansari et al. |
| 8,583,055 B2 | 11/2013 | Park |
| 8,621,588 B2 | 12/2013 | Yoshida |
| 8,654,936 B1 * | 2/2014 | Eslambolchi ....... H04L 12/2818 379/88.04 |
| 8,694,523 B2 | 4/2014 | Lim |
| 8,701,166 B2 | 4/2014 | Courtney et al. |
| 8,971,341 B2 | 3/2015 | Ansari et al. |
| 8,973,056 B2 | 3/2015 | Ellis et al. |
| 9,071,606 B2 | 6/2015 | Braun et al. |
| 9,167,176 B2 | 10/2015 | Winter |
| 9,203,912 B2 | 12/2015 | Krishnaswamy et al. |
| 9,253,150 B2 | 2/2016 | Ansari et al. |
| 9,270,492 B2 | 2/2016 | Ansari et al. |
| 9,325,540 B2 | 4/2016 | Zhang |
| 9,426,151 B2 | 8/2016 | Richards et al. |
| 2001/0011284 A1 | 8/2001 | Humpleman |
| 2001/0025349 A1 | 9/2001 | Sharood |
| 2001/0041982 A1 | 11/2001 | Kawasaki |
| 2001/0048030 A1 | 12/2001 | Sharood |
| 2001/0051996 A1 | 12/2001 | Cooper et al. |
| 2002/0021465 A1 | 2/2002 | Moore |
| 2002/0023131 A1 | 2/2002 | Wu et al. |
| 2002/0027504 A1 | 3/2002 | David |
| 2002/0033416 A1 | 3/2002 | Gerszberg |
| 2002/0046279 A1 | 4/2002 | Chung |
| 2002/0052915 A1 | 5/2002 | Amin-Salehi |
| 2002/0059425 A1 | 5/2002 | Belfiore et al. |
| 2002/0059586 A1 | 5/2002 | Carney et al. |
| 2002/0060994 A1 | 5/2002 | Kovacs et al. |
| 2002/0065894 A1 | 5/2002 | Dalal et al. |
| 2002/0067376 A1 | 6/2002 | Martin |
| 2002/0069243 A1 | 6/2002 | Raverdy et al. |
| 2002/0071440 A1 | 6/2002 | Cerami et al. |
| 2002/0078150 A1 | 6/2002 | Thompson et al. |
| 2002/0103877 A1 | 8/2002 | Gagnon |
| 2002/0112047 A1 | 8/2002 | Kushwaha et al. |
| 2002/0122410 A1 | 9/2002 | Kulikov et al. |
| 2002/0124257 A1 | 9/2002 | Ismagilov |
| 2002/0128930 A1 | 9/2002 | Nakamoto et al. |
| 2002/0133613 A1 | 9/2002 | Teng |
| 2002/0136226 A1 | 9/2002 | Christoffel et al. |
| 2002/0156688 A1 | 10/2002 | Horn |
| 2002/0169858 A1 | 11/2002 | Bellinger |
| 2002/0176404 A1 | 11/2002 | Girard |
| 2002/0184358 A1 | 12/2002 | Traversat et al. |
| 2002/0184620 A1 | 12/2002 | Davies et al. |
| 2003/0005112 A1 | 1/2003 | Krautkremer |
| 2003/0012155 A1 | 1/2003 | Sayeedi |
| 2003/0023131 A1 | 1/2003 | Antaki |
| 2003/0023730 A1 | 1/2003 | Wengrovitz et al. |
| 2003/0083961 A1 | 5/2003 | Bezos et al. |
| 2003/0095569 A1 | 5/2003 | Wengrovitz et al. |
| 2003/0104010 A1 | 6/2003 | Raa et al. |
| 2003/0112755 A1 | 6/2003 | McDysan |
| 2003/0118726 A1 | 6/2003 | Nakayama et al. |
| 2003/0126207 A1 | 7/2003 | Creamer et al. |
| 2003/0135823 A1 | 7/2003 | Marejka |
| 2003/0140103 A1 | 7/2003 | Szeto et al. |
| 2003/0151621 A1 | 8/2003 | McEvilly |
| 2003/0169752 A1 | 9/2003 | Chen et al. |
| 2003/0171996 A1 | 9/2003 | Chen et al. |
| 2003/0185360 A1 | 10/2003 | Moore et al. |
| 2003/0210770 A1 | 11/2003 | Krejcarek |
| 2003/0217110 A1 | 11/2003 | Weiss |
| 2003/0229900 A1 | 12/2003 | Reisman |
| 2003/0231641 A1 | 12/2003 | Ryoo |
| 2003/0237004 A1 | 12/2003 | Okamura |
| 2004/0001480 A1 | 1/2004 | Tanigawa et al. |
| 2004/0003070 A1 | 1/2004 | Fernald et al. |
| 2004/0005859 A1 | 1/2004 | Ghercioiu et al. |
| 2004/0006477 A1 | 1/2004 | Craner |
| 2004/0006769 A1 | 1/2004 | Ansari et al. |
| 2004/0010327 A1 | 1/2004 | Terashima |
| 2004/0019489 A1 | 1/2004 | Funk et al. |
| 2004/0030750 A1 | 2/2004 | Moore et al. |
| 2004/0032399 A1 | 2/2004 | Sekiguchi et al. |
| 2004/0047310 A1 | 3/2004 | Chen et al. |
| 2004/0047358 A1 | 3/2004 | Chen et al. |
| 2004/0060079 A1 | 3/2004 | Tanaka et al. |
| 2004/0062230 A1 | 4/2004 | Taylor et al. |
| 2004/0073867 A1 | 4/2004 | Kausik et al. |
| 2004/0078573 A1 | 4/2004 | Matsuyama |
| 2004/0114608 A1 | 6/2004 | Rao et al. |
| 2004/0114610 A1 * | 6/2004 | Featherston ........ H04L 12/2898 370/401 |
| 2004/0128310 A1 | 7/2004 | Zmudzinski et al. |

(56) References Cited

U.S. PATENT DOCUMENTS

| | | |
|---|---|---|
| 2004/0133657 A1 | 7/2004 | Smith et al. |
| 2004/0136373 A1 | 7/2004 | Bareis |
| 2004/0140989 A1 | 7/2004 | Papageorge |
| 2004/0148655 A1 | 7/2004 | Choe et al. |
| 2004/0160969 A1 | 8/2004 | Moon et al. |
| 2004/0174858 A1 | 9/2004 | Caspi et al. |
| 2004/0174863 A1 | 9/2004 | Caspi et al. |
| 2004/0177376 A1 | 9/2004 | Caspi et al. |
| 2004/0203942 A1 | 10/2004 | Dehlin |
| 2004/0213273 A1 | 10/2004 | Ma |
| 2004/0215750 A1 | 10/2004 | Stilp |
| 2004/0218609 A1 | 11/2004 | Foster et al. |
| 2004/0228324 A1 | 11/2004 | Alexiou et al. |
| 2004/0230695 A1 | 11/2004 | Anschutz et al. |
| 2004/0240389 A1 | 12/2004 | Bessis |
| 2004/0255048 A1 | 12/2004 | Lev Ran et al. |
| 2004/0255326 A1 | 12/2004 | Hicks, III et al. |
| 2005/0018612 A1 | 1/2005 | Fitzgerald |
| 2005/0027887 A1* | 2/2005 | Zimler ............... H04L 12/2814 709/249 |
| 2005/0038526 A1 | 2/2005 | Choi |
| 2005/0038875 A1 | 2/2005 | Park |
| 2005/0065855 A1 | 3/2005 | Geller |
| 2005/0068938 A1 | 3/2005 | Wang |
| 2005/0071663 A1 | 3/2005 | Medvinsky |
| 2005/0076198 A1 | 4/2005 | Skomra et al. |
| 2005/0089052 A1 | 4/2005 | Chen et al. |
| 2005/0094621 A1 | 5/2005 | Acharya et al. |
| 2005/0107086 A1 | 5/2005 | Tell |
| 2005/0108091 A1 | 5/2005 | Sotak et al. |
| 2005/0141492 A1 | 6/2005 | Chan et al. |
| 2005/0144616 A1 | 6/2005 | Hammond |
| 2005/0149922 A1 | 7/2005 | Vincent |
| 2005/0150697 A1 | 7/2005 | Altman et al. |
| 2005/0174950 A1 | 8/2005 | Ayyagari |
| 2005/0180396 A1 | 8/2005 | Lim |
| 2005/0190744 A1 | 9/2005 | Sun et al. |
| 2005/0190898 A1 | 9/2005 | Priest et al. |
| 2005/0195752 A1 | 9/2005 | Amin-Salehi |
| 2005/0195802 A1 | 9/2005 | Klein et al. |
| 2005/0198040 A1 | 9/2005 | Cohen |
| 2005/0208948 A1 | 9/2005 | Hori |
| 2005/0210064 A1 | 9/2005 | Caldini |
| 2005/0216302 A1 | 9/2005 | Raji |
| 2005/0216580 A1 | 9/2005 | Raji |
| 2005/0216949 A1 | 9/2005 | Candelora et al. |
| 2005/0220081 A1 | 10/2005 | Urquizo |
| 2005/0222933 A1 | 10/2005 | Wesby |
| 2005/0226158 A1 | 10/2005 | Takahashi |
| 2005/0232284 A1 | 10/2005 | Karaoguz et al. |
| 2005/0240680 A1 | 10/2005 | Costa-Requena et al. |
| 2005/0240943 A1 | 10/2005 | Smith et al. |
| 2005/0249196 A1 | 11/2005 | Ansari et al. |
| 2005/0257039 A1 | 11/2005 | Marshall |
| 2005/0260996 A1 | 11/2005 | Groenendaal |
| 2005/0286466 A1 | 12/2005 | Tagg et al. |
| 2006/0020589 A1 | 1/2006 | Wu et al. |
| 2006/0025132 A1 | 2/2006 | Karaoguz et al. |
| 2006/0029007 A1 | 2/2006 | Ayyagari |
| 2006/0029064 A1 | 2/2006 | Rao et al. |
| 2006/0031406 A1 | 2/2006 | Watson et al. |
| 2006/0031476 A1 | 2/2006 | Mathes et al. |
| 2006/0040667 A9 | 2/2006 | Coppinger et al. |
| 2006/0041926 A1* | 2/2006 | Istvan ............... H04N 5/4403 725/133 |
| 2006/0067344 A1 | 3/2006 | Sakurai |
| 2006/0075108 A1 | 4/2006 | Sylvain |
| 2006/0075276 A1 | 4/2006 | Kataria |
| 2006/0075429 A1 | 4/2006 | Istvan |
| 2006/0080352 A1 | 4/2006 | Boubez et al. |
| 2006/0104432 A1 | 5/2006 | Evslin |
| 2006/0122976 A1 | 6/2006 | Baluja et al. |
| 2006/0136246 A1 | 6/2006 | Tu |
| 2006/0146784 A1 | 7/2006 | Karpov et al. |
| 2006/0153214 A1 | 7/2006 | Moore et al. |
| 2006/0159116 A1 | 7/2006 | Gerszberg |
| 2006/0164205 A1 | 7/2006 | Buckingham |
| 2006/0167985 A1* | 7/2006 | Albanese ............... H04L 63/08 709/203 |
| 2006/0174289 A1 | 8/2006 | Theberge |
| 2006/0178943 A1 | 8/2006 | Rollinson et al. |
| 2006/0209857 A1 | 9/2006 | Hicks, III et al. |
| 2006/0220830 A1* | 10/2006 | Bennett, III ........ H04L 12/2803 340/506 |
| 2006/0227724 A1 | 10/2006 | Thubert et al. |
| 2006/0236419 A1 | 10/2006 | La Rosa et al. |
| 2006/0239425 A1 | 10/2006 | Hurst et al. |
| 2006/0256759 A1 | 11/2006 | Sayeedi |
| 2006/0258396 A1 | 11/2006 | Matsuoka |
| 2006/0259584 A1 | 11/2006 | Watson et al. |
| 2006/0271695 A1 | 11/2006 | Lavian |
| 2006/0291506 A1 | 12/2006 | Cain |
| 2006/0293965 A1 | 12/2006 | Burton |
| 2007/0005766 A1 | 1/2007 | Singhal et al. |
| 2007/0021867 A1 | 1/2007 | Woo |
| 2007/0038637 A1 | 2/2007 | Taneja |
| 2007/0043476 A1 | 2/2007 | Richards et al. |
| 2007/0043478 A1 | 2/2007 | Ehlers et al. |
| 2007/0049342 A1 | 3/2007 | Mayer et al. |
| 2007/0050351 A1 | 3/2007 | Kasperski et al. |
| 2007/0055759 A1 | 3/2007 | McCoy |
| 2007/0058608 A1 | 3/2007 | Lin |
| 2007/0058644 A1 | 3/2007 | Brahmbhatt et al. |
| 2007/0061149 A1 | 3/2007 | Chang |
| 2007/0089183 A1 | 4/2007 | Poovaiah et al. |
| 2007/0100981 A1 | 5/2007 | Adamczyk et al. |
| 2007/0106570 A1 | 5/2007 | Hartman et al. |
| 2007/0109976 A1 | 5/2007 | Samanta et al. |
| 2007/0115922 A1 | 5/2007 | Schneider et al. |
| 2007/0143262 A1 | 6/2007 | Kasperski |
| 2007/0143831 A1* | 6/2007 | Pearson ............... H04L 63/08 726/5 |
| 2007/0147420 A1 | 6/2007 | Dean |
| 2007/0150286 A1* | 6/2007 | Miller ............... G10L 15/30 704/270.1 |
| 2007/0150345 A1 | 6/2007 | Tonse et al. |
| 2007/0156265 A1 | 7/2007 | McCoy |
| 2007/0165629 A1 | 7/2007 | Chaturvedi et al. |
| 2007/0169144 A1* | 7/2007 | Chen ............... H04N 7/17318 725/30 |
| 2007/0171895 A1 | 7/2007 | Oberle et al. |
| 2007/0192477 A1 | 8/2007 | Hicks et al. |
| 2007/0192486 A1 | 8/2007 | Wilson |
| 2007/0192735 A1 | 8/2007 | Lehto et al. |
| 2007/0198437 A1 | 8/2007 | Eisner et al. |
| 2007/0199022 A1 | 8/2007 | Moshiri |
| 2007/0253443 A1 | 11/2007 | Dean et al. |
| 2007/0286159 A1 | 12/2007 | Preiss et al. |
| 2007/0291650 A1 | 12/2007 | Ormazabal |
| 2007/0294721 A1 | 12/2007 | Haeuser |
| 2007/0297454 A1 | 12/2007 | Brothers |
| 2008/0005306 A1 | 1/2008 | Kushalnagar |
| 2008/0005565 A1 | 1/2008 | Shiga |
| 2008/0022391 A1 | 1/2008 | Sax |
| 2008/0043719 A1 | 2/2008 | Pok et al. |
| 2008/0052393 A1 | 2/2008 | McNaughton et al. |
| 2008/0066126 A1* | 3/2008 | Walter ............... H04N 7/17318 725/97 |
| 2008/0069121 A1 | 3/2008 | Adamson et al. |
| 2008/0084789 A1 | 4/2008 | Altman |
| 2008/0084888 A1 | 4/2008 | Yadav et al. |
| 2008/0098212 A1 | 4/2008 | Helms |
| 2008/0101320 A1 | 5/2008 | Krahn et al. |
| 2008/0123683 A1 | 5/2008 | Cheng et al. |
| 2008/0127880 A1 | 6/2008 | Dhellemmes et al. |
| 2008/0130666 A1 | 6/2008 | Kawamoto et al. |
| 2008/0134258 A1* | 6/2008 | Goose ............... H04N 7/17336 725/91 |
| 2008/0141315 A1 | 6/2008 | Ogilvie |
| 2008/0144642 A1 | 6/2008 | Song |
| 2008/0151778 A1 | 6/2008 | Venkitaraman et al. |
| 2008/0155613 A1 | 6/2008 | Benya |
| 2008/0163059 A1 | 7/2008 | Craner |
| 2008/0165789 A1 | 7/2008 | Ansari et al. |

(56) References Cited

U.S. PATENT DOCUMENTS

| | | |
|---|---|---|
| 2008/0166048 A1 | 7/2008 | Raif et al. |
| 2008/0189774 A1 | 8/2008 | Ansari et al. |
| 2008/0221715 A1 | 9/2008 | Krzyzanowski |
| 2008/0239957 A1 | 10/2008 | Tokura |
| 2008/0240125 A1 | 10/2008 | Purvis et al. |
| 2008/0304500 A1 | 12/2008 | Schliserman et al. |
| 2009/0034419 A1 | 2/2009 | Flammer, III et al. |
| 2009/0037382 A1 | 2/2009 | Ansari et al. |
| 2009/0067441 A1 | 3/2009 | Ansari et al. |
| 2009/0077207 A1 | 3/2009 | Karaoguz et al. |
| 2009/0100460 A1 | 4/2009 | Hicks |
| 2009/0168787 A1 | 7/2009 | Ansari et al. |
| 2009/0178079 A1 | 7/2009 | Derrenberger et al. |
| 2009/0180422 A1 | 7/2009 | Bohacek et al. |
| 2009/0189774 A1 | 7/2009 | Brundridge et al. |
| 2009/0216847 A1 | 8/2009 | Krishnaswamy et al. |
| 2010/0014444 A1 | 1/2010 | Ghanadan et al. |
| 2010/0030734 A1 | 2/2010 | Chunilal |
| 2010/0061309 A1 | 3/2010 | Buddhikot et al. |
| 2010/0071053 A1 | 3/2010 | Ansari et al. |
| 2010/0202450 A1 | 8/2010 | Ansari et al. |
| 2010/0205152 A1 | 8/2010 | Ansari et al. |
| 2010/0205301 A1 | 8/2010 | Ansari et al. |
| 2010/0211636 A1 | 8/2010 | Starkenburg |
| 2010/0217837 A1 | 8/2010 | Ansari et al. |
| 2010/0231790 A1 | 9/2010 | Ansari et al. |
| 2010/0235433 A1 | 9/2010 | Ansari et al. |
| 2010/0238810 A1 | 9/2010 | Ormazabal |
| 2010/0241711 A1 | 9/2010 | Ansari et al. |
| 2010/0241748 A1 | 9/2010 | Ansari et al. |
| 2010/0291940 A1 | 11/2010 | Koo |
| 2011/0019135 A1 | 1/2011 | Koganezawa |
| 2011/0092232 A1 | 4/2011 | Lee |
| 2011/0182205 A1 | 7/2011 | Gerdes et al. |
| 2011/0261654 A1 | 10/2011 | Miyamoto et al. |
| 2012/0060181 A1 | 3/2012 | Craner |
| 2012/0101881 A1 | 4/2012 | Taylor et al. |
| 2012/0110490 A1 | 5/2012 | Keller |
| 2012/0157043 A1 | 6/2012 | LaJoie |
| 2012/0311665 A1 | 12/2012 | Lim |
| 2013/0191871 A1 | 7/2013 | Gilboy |
| 2013/0329745 A1 | 12/2013 | Phillips et al. |
| 2014/0259074 A1 | 9/2014 | Ansari et al. |
| 2014/0362253 A1 | 12/2014 | Kim |
| 2015/0074259 A1 | 3/2015 | Ansari et al. |
| 2015/0208363 A1 | 7/2015 | Fu et al. |
| 2015/0347683 A1 | 12/2015 | Ansari et al. |
| 2016/0226920 A1 | 8/2016 | Ansari et al. |
| 2016/0254962 A1 | 9/2016 | Ansari et al. |
| 2016/0330200 A1 | 11/2016 | Ansari et al. |
| 2016/0344745 A1 | 11/2016 | Johnson et al. |
| 2017/0070395 A1 | 3/2017 | Ansari et al. |
| 2017/0078154 A1 | 3/2017 | Ansari et al. |
| 2017/0078732 A1 | 3/2017 | Ansari et al. |
| 2017/0111182 A1 | 4/2017 | Ansari et al. |
| 2017/0344703 A1 | 11/2017 | Ansari et al. |
| 2018/0123819 A1 | 5/2018 | Ansari et al. |
| 2018/0123905 A1 | 5/2018 | Ansari et al. |
| 2018/0124115 A1 | 5/2018 | Ansari et al. |
| 2018/0126414 A1 | 5/2018 | Ansari et al. |
| 2018/0131571 A1 | 5/2018 | Ansari et al. |
| 2018/0131572 A1 | 5/2018 | Ansari et al. |
| 2018/0152310 A1 | 5/2018 | Ansari et al. |
| 2018/0152311 A1 | 5/2018 | Ansari et al. |
| 2018/0333746 A1 | 11/2018 | Ansari et al. |
| 2018/0361426 A1 | 12/2018 | Ansari et al. |
| 2019/0020496 A1 | 1/2019 | Ansari et al. |

FOREIGN PATENT DOCUMENTS

| | | |
|---|---|---|
| DE | 3818631 A1 | 12/1989 |
| DE | 9116206 U1 | 4/1992 |
| DE | 19723596 C1 | 10/1998 |
| DE | 10024525 A1 | 11/2001 |
| DE | 20304806 U1 | 7/2003 |
| EP | 0805254 A2 | 11/1997 |
| EP | 0921260 A2 | 6/1999 |
| EP | 1113659 A2 | 7/2001 |
| EP | 1195497 A2 | 4/2002 |
| EP | 1377005 A1 | 1/2004 |
| EP | 1394986 A1 | 3/2004 |
| EP | 1657396 A2 | 5/2006 |
| JP | 03269387 A | 11/1991 |
| JP | 07104063 A | 4/1995 |
| JP | 11290082 A | 10/1999 |
| JP | 2002139565 A | 5/2002 |
| WO | WO-0193533 A2 | 12/2001 |
| WO | WO-2005111653 A2 | 11/2005 |
| WO | WO-2007004921 A1 | 1/2007 |
| WO | WO-2008021665 A2 | 2/2008 |
| WO | 2008082346 A1 | 7/2008 |
| WO | 2008082441 A1 | 7/2008 |
| WO | 2008083384 A2 | 7/2008 |
| WO | 2008083385 A1 | 7/2008 |
| WO | 2008083387 A2 | 7/2008 |
| WO | 2008083391 A2 | 7/2008 |
| WO | 2008085201 A2 | 7/2008 |
| WO | 2008085202 A1 | 7/2008 |
| WO | 2008085203 A2 | 7/2008 |
| WO | 2008085204 A2 | 7/2008 |
| WO | 2008085205 A2 | 7/2008 |
| WO | 2008085206 A2 | 7/2008 |
| WO | 2008085207 A2 | 7/2008 |
| WO | WO-2008085205 A3 | 9/2008 |
| WO | WO-2008085204 A3 | 10/2008 |
| WO | WO-2008085207 A3 | 10/2008 |
| WO | WO-2008085203 A3 | 11/2008 |
| WO | WO-2008085206 A3 | 11/2008 |
| WO | 2009036088 A1 | 3/2009 |
| WO | 2009036185 A1 | 3/2009 |
| WO | 2009086134 A1 | 7/2009 |

OTHER PUBLICATIONS

"FAD-linked oxidase, N-terminal," InterPro Accession IPR006094, downloaded May 24, 2012.

Choe, S., et al., "Overexpression of DWARF4 in the Brassinosteroid Biosynthetic Pathway Results in Increased Vegetative Growth and Seed Yield in *Arabidopsis*," The Plant Journal, vol. 26, No. 6, 2001, pp. 573-582.

DLNA enables streaming of premium video in connected homes across Europe. (New Products) IPTV Newsletter, v 5, n 10, p. 4 Oct. 2011.

Fraaije, M.W., et al., "A Novel Oxidoreductase Family Sharing a Conserved FAD-Binding Domain," TIBS, vol. 23, 1998, pp. 206-207.

H. Kashiwagi, "M-sequence and its application," Shokodo, Mar. 25, 1996, pp. 1-5, 16-32.

Haerick W et al., "Success in Home Service Deployment: Zero-Touch or Chaos?", British Telecommunications, Jul. 1, 2007, pp. 36-43, vol. 5, No. 3, London, GB.

Hong et al, "The Rice brassinosteroid-deficient dwarf2 Mutant, Defective in the Rice Homolog of *Arabidopsis* DIMINUTO/DWARD1, Is Rescued by the Endogenously Accumulated Alternative Bioactive Brassinosteroid, Dolichosterone," The Plant Cell, 2006, col. 17, pp. 2243-2254.

Il-Woo Lee, et al., A Proposed Platform & Performance Estimation of Digital-Home Service Delivery/Management Systems, Apr. 10, 2006, pp. 713-719, Information Technology: New Generations, 2006.

International Application No. PCT/US2008/087724, filed Dec. 19, 2008, 7 Pages, 1211 Geneva 20, Switzerland.

International Search Report and the Written Opinion of the International Searching Authority issued in International Application No. PCT/US2008/087724 dated Feb. 17, 2009.

International Search Report and the Written Opinion of the International Searching Authority issued in International Patent Application No. PCT/US08/75889 dated Nov. 24, 2008.

International Search Report and Written Opinion in International Application No. PCT/US05/15860, dated Jul. 17, 2006, 8 pages.

(56) References Cited

OTHER PUBLICATIONS

International Search Report and Written Opinion in International Application No. PCT/US08/76036, dated Nov. 14, 2008.
International Search Report in International Application No. PCT/JP2008/051225, dated Feb. 29, 2008.
Klahre, U., et al., "The *Arabidopsis* DIMINUTO/DWARD1 Gene Encodes a Protein Involved in Steroid Synthesis," The Plant Cell, vol. 10, 1998, pp. 1677-1690.
Machine Translation of JP11290082-A, Oct. 1999.
Notification of Transmittal of the International Search Report and the Written Opinion of the International Searching Authority, or the Declaration dated Aug. 27, 2008, 24 pages, Application No. PCT/US2007/089232.
Notification of Transmittal of the International Search Report and the Written Opinion of the International Searching Authority, or the Declaration dated Aug. 8, 2008, 22 pages, Application No. PCT/US2007/089227.
Notification of Transmittal of the International Search Report and the Written Opinion of the International Searching Authority, or the Declaration dated Oct. 22, 2008, 12 pages, Application No. PCT/US2007/089232.
Notification of Transmittal of the International Search Report and the Written Opinion of the International Searching Authority, or the Declaration, dated Feb. 26, 2008, 11 pages, Application No. PCT/US07/19483.
Notification of Transmittal of the International Search Report and the Written Opinion of the International Searching Authority, or the Declaration, dated Mar. 14, 2008, 12 pages, Application No. PCT/US07/19533.
PCT Invitation to Pay Additional Fees and, where Applicable, Protest Fee (PCT/ISA/206) and Communication Relating to the Results of the Partial International Search (Annex to PCT/ISA/206) dated May 19, 2008 for PCT Application No. PCT/US2007/089237, 7 pages.
PCT Invitation to Pay Additional Fees and, where Applicable, Protest Fee (PCT/ISA/206) and Communication Relating to the Results of the Partial International Search (Annex to PCT/ISA/206) dated May 21, 2008 for PCT Application No. PCT/US2007/089227, 7 pages.
Sakamoto, T., "Phytohormones and Rice Crop Yield: Strategies and Opportunities for Genetic Improvement," Transgenic Research, vol. 15, 2006, pp. 399-404.
Takahashi, T., et al., "The DIMINUTO Gene of *Arabidopsis* is Involved in Regulating Cell Elongation," Genes and Development, vol. 9, 1995, pp. 97-107.
Technology and challenges of virtual communities. International Journal of Business Research , v 7 , n 4, p. 69 Jul. 2007.
Yokota, T., "The Structure, Biosynthesis and Function of Brassinosteroids," Trends in Plan Science, vol. 2, No. 4, 1997, pp. 137-143.
Young-Gab Kim et al., A Service Bundle Authentication Mechanism in the OSGI Service Platform, Advanced Information Networking and Applications, 2004, AINA 2004. 18th International Conference on Fukuoka, Japan, 29-31, Mar. 2004, Piscataway, NJ, USA, IEEE, vol. 1, Mar. 29, 2004, pp. 420-425.
U.S. Appl. No. 15/686,044 of Ansari et al. filed Aug. 24, 2017.
U.S. Appl. No. 15/944,620 of Ansari et al., filed Apr. 3, 2018.
U.S. Appl. No. 16/002,945 of Ansari et al., filed Jun. 7, 2018.
Wen-Shyang Hwang et al., "A QoS-aware Residential Gateway with Bandwidth Management," Aug. 2005.
U.S. Appl. No. 16/291,856 for Ansari et al., filed Mar. 4, 2019.
U.S. Appl. No. 16/370,126 for Ansari et al., filed Mar. 29, 2019.
U.S. Appl. No. 16/439,501 for Ansari et al., filed Jun. 12, 2019.
U.S. Appl. No. 16/452,249 for Ansari et al., filed Jun. 25, 2019.
U.S. Appl. No. 16/460,148 for Ansari et al., filed Jul. 2, 2019.
U.S. Appl. No. 16/512,876 for Ansari et al., filed Jul. 16, 2019.
U.S. Appl. No. 16/514,803 for Ansari et al., filed Jul. 17, 2019.

\* cited by examiner

VOICE CONTROL OF ENDPOINT DEVICES THROUGH A MULTI-SERVICES GATEWAY DEVICE AT THE USER PREMISES

This application is a continuation of U.S. application Ser. No. 12/521,746, filed Nov 24, 2009, entitled "PRESENCE STATUS NOTIFICATION FROM DIGITAL ENDPO LN IT DEVICES THROUGH A MULTI-SERVICES GATEWAY DEVICE AT THE USER PREMISES" which is a U.S. National Application of PCT/US2007/1019534, filed Sep 7, 2007, which claims the benefit of U.S. Provisional Application No. 60/882,862, filed Dec. 29, 2006, and claims the benefit of U.S. Provisional Application No. 60/882,865, filed Dec. 29, 2006, all of which are incorporated herein by reference in their entirety.

TECHNICAL FIELD

The present subject matter relates to a gateway device and/or programming for such devices, wherein the gateway device is enabled with client programming for client-server communications using a presence and networking messaging protocol. The gateway device may be configured by a services subscriber and/or service provider to expose the presence and functionalities of one or more associated endpoint devices to local and/or remote presence and networking message servers or other devices via a wide area network. The subscriber and/or service provider may also configure the gateway to provide notices, status, or other messages in response to events, and may also configure the routing of such messages to particular parties and/or devices for display.

BACKGROUND

The digital home is now becoming more complex with the myriad of new and emerging digital devices and services intended to address many user and consumer needs such as communication, entertainment, privacy and security, etc. These digital devices can be connected with a gateway device in the user premises to form a home network. The digital devices can have a variety of functionalities, as well as proprietary interfaces and communication protocols to access such functionalities. Although an increasing number of emerging digital devices are enabled with programming for client-server communications using presence and networking message protocols, many digital devices rely on proprietary communications protocols and driver programs to allow them to interoperate with devices in a home network.

A home network user may desire to have the associated devices of the home network provide alerts, notifications, status, or other messages to the user in response to particular events, and have such messages directed to specific individuals and/or digital endpoint devices for display. Upon receipt of such messages, the user may desire to provide instructions to one or more of the digital devices of the home network. The user may also desire to determine the status of one or more of the devices of the home network in the absence of an event. The home network user may also desire to remotely handle and/or control various endpoint devices associated with a gateway device of the home network. However, the user may wish to limit the "visibility" of specific endpoint devices and their functions to local or remote servers providing applications services or server-side presence and networking communications for the home network.

Additionally, the user may wish to establish peer to peer communications between the gateway device in the user premises and another local or remote gateway device with associated endpoint devices. The peer to peer connection is desirable, as it may enable a user to access the functionalities and status of endpoint devices associated with another gateway. The peer to peer communication is also desirable, as it minimizes management of communications between two or more gateway devices.

In that regard, it would be desirable to provide a gateway device for a user premises that provides a presence and networking messaging client for client-server communications, wherein endpoint devices associated with the gateway device may not be enabled themselves with such clients. It may be further desirable to enable a gateway device to be configured by a services subscriber or a service provider to facilitate the handling of events by the gateway and provide notices, status, or other messages in response to events, and route such messages to particular parties and/or devices for display. Moreover, it may be desirable for associated endpoint devices to communicate with one another via the gateway device, without using presence and networking communications. It may be further desirable to enable peer to peer communications between two or more gateway devices.

SUMMARY

The technology discussed herein may be embodied in gateway devices, typically for deployment at user premises, and/or to programming for devices that may function as such gateways. The gateway device is implemented in such a manner as to provide client programming to enable client-server communications using a presence and networking message protocol. The gateway device may be further configured to have application service logic that functions as an intermediary between associated digital endpoint devices and one or more driver programs. The driver program may communicate with the endpoint device using its own communication protocol. The driver may abstract the functionalities of the endpoint as a set of attributes for the endpoint device. The service subscriber (i.e., user) or a service provider may configure the gateway so as to control the exposure of the presence and functionalities of the one or more endpoint devices to presence and networking messaging communication servers or other external devices.

Hence, in one example, a gateway device for operation at a user premises is disclosed to provide and manage application services provided for endpoint devices associated with the gateway device. The gateway device has a first interface for enabling communications within the premises, with one or more associated endpoint devices within the premises. The gateway device also has a second interface for enabling bi-directional communications for the gateway device via a wide area network. The gateway device further includes a processor coupled to the interfaces and storage coupled to the processor. The gateway device further comprises programming in the storage including a communications client program for configuring the gateway to enable communications via the interfaces, and to further enable client-server communications between the gateway device and a remote communications server via the wide area network using a presence and networking message protocol. The programming in the storage also includes a driver program for at least one associated endpoint device, the driver program enabling communications between the gateway device and the least one associated endpoint device using at least one driver communications protocol, wherein the driver program enables the gateway device to control and manage the at least one associated endpoint device using the at least one driver communications protocol. The programming of the gateway device includes application service programming for the application services, wherein execution of the programming by the processor causes the gateway device to provide functions, via one or both of the interfaces, for each respective application service for one or more of the associated endpoint devices using the driver program and the at least one driver communications protocol.

Execution of the programming by the processor causes the gateway device to provide enforcement regarding authorization, authentication, configuration, or use of the respective application service via the associated endpoint devices. The execution of the programming by the processor also causes the gateway device to provide management of the application services based upon the communications with a service management center via the wide area network through the second interface.

The associated endpoint device is typically without communications programming for presence and networking communications. The communications client program of the gateway device may provide presence and networking communications for the driver program, wherein the driver program communicates with the associated endpoint device without programming for presence and networking communications via the at least one driver communications protocol. The presence and networking messaging communications may also be provided between the gateway device and the associated endpoint device, the endpoint device having communications programming for presence and networking communications via the respective driver program for the associated endpoint device. The presence and networking messaging communications of the gateway device may also be provided between the gateway device and the associated endpoint device where the endpoint device has presence and networking communications programming.

The presence and networking message protocol used by the communications client of the gateway device may comprise an instant messaging type protocol. Endpoint device having presence and networking communications programming may utilize an instant messaging type protocol for communications.

The programming of the gateway device may also enable the first or second interface of the gateway device to establish peer communications using presence and networking message communications of the client-server communications between the gateway device and the remote server via the wide area network.

Execution of the programming by the processor further causes the gateway device to support one or more application service interfaces via different endpoint devices using the associated driver program, with respect to one or more application services provided through the gateway device. One of the different application service interfaces is a user interface for implementation via a personal computer type endpoint device, a cell phone type endpoint device, a personal digital assistant endpoint device, a remote control type endpoint device, or a television, or any combination thereof. An alert message or status message may be transmitted from the gateway device using the driver communications protocol to the personal computer, cell phone, personal digital assistant, remote control, or the television for display in the user interface, or overlaid onto or inserted into a display of the television, cell phone, personal digital assistant, remote control, or personal computer. An alert message or status message also may be transmitted from the associated endpoint device via the gateway device using the driver communications protocol to the personal computer, cell phone, personal digital assistant, remote control, or the television for display in the user interface, or overlaid onto or inserted into a display of the television, cell phone, personal digital assistant, remote control, or personal computer. The user interface, enabled by the driver program and driver communications protocol, enables a user to determine status, change a configuration, view an event log, or any combination thereof for the associated endpoint device.

The exemplary gateway device may further include programming in the storage that has configuration data for management, responses, and interactions with an associated endpoint device in response to a client-server communication between the gateway and the remote communications server via the wide area network using the presence and networking message protocol. The configuration data may be received by the gateway device from a service management center via the wide area network through the second interface of the gateway device. The configuration data also may be received by the gateway device from a user via the first interface, second interface, or the first and second interfaces. The configuration data and the driver program may also provide a list of functionalities and status of the respective endpoint devices to the communications client program for use with client-server communications with the remote communications server via the wide area network.

The programming on the storage of the exemplary gateway device may include configuration data for parameters of access, control, presentation notification and service for each associated endpoint device.

The exemplary gateway device may be comprised of service logic, wherein the service logic processes communications received by the communications client for an associated endpoint device via the driver program.

In addition, the communications client of the exemplary gateway device may enable client-server communications with a public communications server or a private communications server via the first or second interfaces. The remote communications server may be a presence and networking message server or a service management center.

The driver program of the gateway device may enable communication between a first associated endpoint device and a second associated endpoint device via the at least one driver communications protocol. The first associated endpoint device may transmit an alert message or status message to the second associated endpoint device via the at least one driver communications protocol. The configuration data of the gateway device may provide a list of functionalities and status of the first associated endpoint device to the second associated endpoint device via the at least one driver communications protocol.

The communications client programming of the gateway device that enables client-server communications with a remote communications server via the wide area network may further enable communication with a second gateway device via the remote communications server. The communications client programming of the gateway device may receive wide area network address information via the remote communications server from the second gateway device, such that the received network address information enables the gateway device to establish peer to peer communication between the gateway device and the second gateway device. The gateway device may transmit a list of functionalities to the second gateway device via the peer to peer communications between the gateway device and the second gateway device. The list of functionalities transmitted may be based upon the associated endpoint devices of the gateway device. The list of functionalities of the associated endpoint device transmitted may also be based on configuration data for each associated endpoint device located in the programming in the storage of the gateway device.

In addition, a first endpoint device associated with the gateway device may be a remote control. The gateway device may be enabled to receive a signal from the remote control via the driver communications protocol of the driver program, wherein the gateway device may control and manage the second associated endpoint device via the driver program based on the received signal from the remote control.

The disclosure also encompasses program products for implementing gateways of the type outlined above. In such a product, the programming is embodied in or carried on a machine-readable medium. For example, the detailed description discloses an exemplary product comprising a machine-readable medium and programming embodied in the medium for gateway device for operation at a user premises to provide and manage application services provided for endpoint devices associated with the gateway device. The gateway device has a first interface for enabling communications within the premises, with one or more associated endpoint devices within the premises. The gateway device also has a second interface for enabling bi-directional communications for the gateway device via a wide area network. The gateway has a processor coupled to the interfaces, wherein the programming is executable by the processor. The programming includes a communications client program for configuring the gateway to enable communications via the interfaces, and to further enable client-server communications between the gateway device and a remote communications server via the wide area network using a presence and networking message protocol. The programming also includes a driver program for at least one associated endpoint device, the driver program enabling communications between the gateway device and the least one associated endpoint device using at least one driver communications protocol, wherein the driver program enables the gateway device to control and manage the at least one associated endpoint device using the at least one driver communications protocol. The programming also includes application service programming for the application services, wherein execution of the programming by the processor causes the gateway device to provide functions, via one or both of the interfaces, for each respective application service for one or more of the associated endpoint devices using the driver program and the at least one driver communications protocol.

The detailed description discloses an exemplary system to provide and manage application services for endpoint devices. The system includes a gateway device for operation at a user premises to provide and manage application services provided for endpoint devices associated with the gateway device. The gateway device has a first interface for enabling communications within the premises, with one or more associated endpoint devices within the premises. The gateway device also has a second interface for enabling bi-directional communications for the gateway device via a wide area network. In addition, the gateway device includes a processor coupled to the interfaces, storage coupled to the processor, and programming in the storage. The programming includes a communications client program for configuring the gateway to enable communications via the interfaces, and to further enable client-server communications between the gateway device and a remote communications server via the wide area network using a presence and networking message protocol. The programming also includes a driver program for at least one associated endpoint device, the driver program enabling communications between the gateway device and the least one associated endpoint device using at least one driver communications protocol, wherein the driver program enables the gateway device to control and manage the at least one associated endpoint device using the at least one driver communications protocol. The programming further includes application service programming for the application services, wherein execution of the programming by the processor causes the gateway device to provide functions, via one or both of the interfaces, for each respective application service for one or more of the associated endpoint devices using the driver program and the at least one driver communications protocol. The system also includes a service management system coupled to the wide area network for communication with the gateway device, for remotely managing the delivery of the application services via the gateway device.

The service management center of the system may include the remote communications server. Alternatively, the remote communications server may be separate from the service management center. In either aforementioned arrangement, the remote communications server may be a public communications server or a private communications server.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
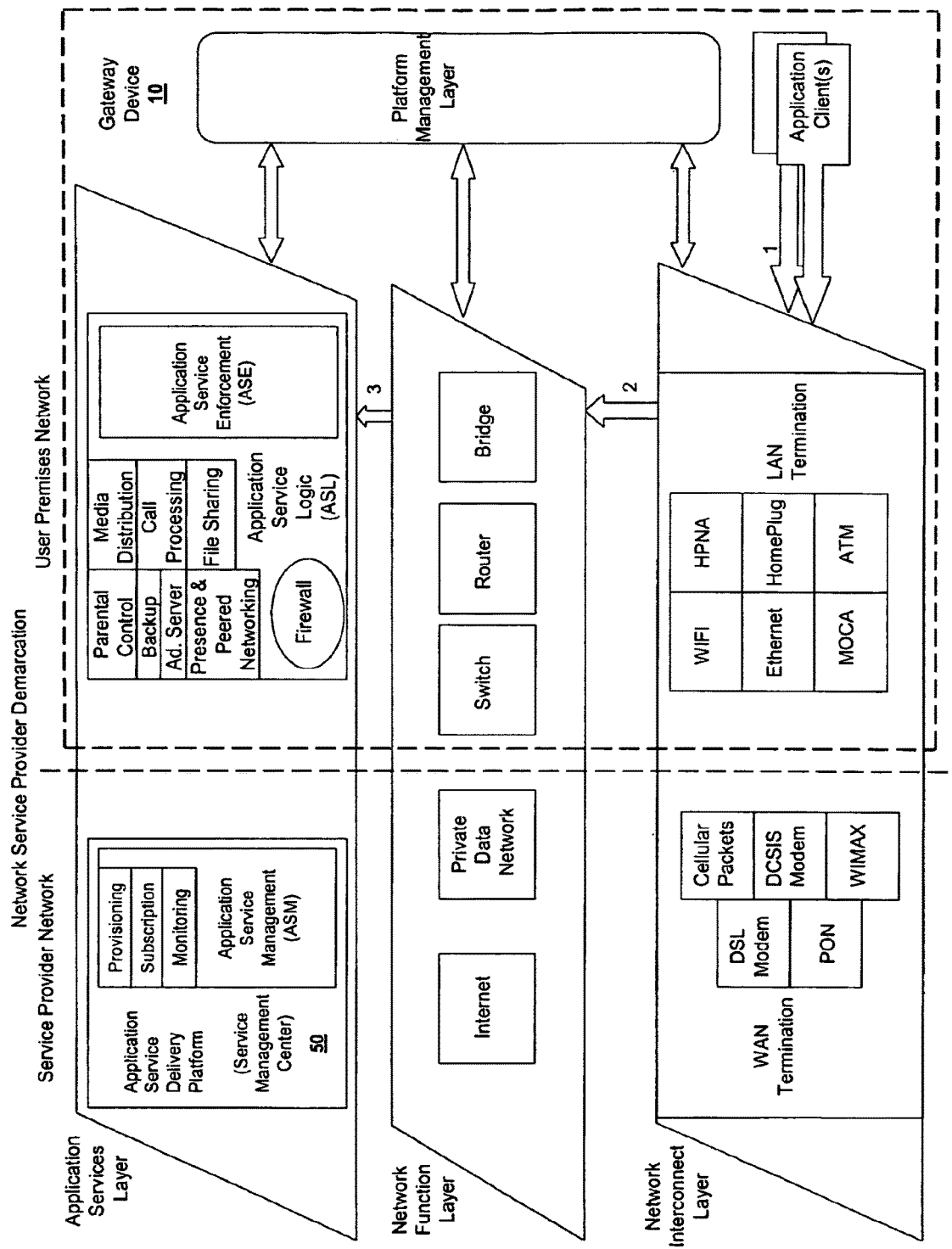
FIG. 1 is a layered logical block diagram with arrows representing steps of a sample logical flow, for an application client to access a specific managed application service, in a gateway device-service management center type network configuration.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed herein provide application service logic in a gateway device in the customer premises. The gateway may be enabled with client programming to facilitate client-server communications using a presence and networking message protocol. The application service logic of the gateway device may have programming for providing application services and to facilitate communications with the client programming, as well as configuration data. The application service logic also serves as an intermediary between the client programming and associated endpoint devices coupled to the gateway device. One or more driver programs enable communications between the endpoint devices and the service logic. The driver program communicates with each device using a proprietary communication protocol.

The driver program may also enable associated endpoint devices to communicate with one another.

As directed by the configuration data of the service logic, which is established by a service subscriber (i.e., user) or service provider, the presence and/or various functions of an endpoint device may be provided to local or remote servers, or other devices. The configuration data of the service logic may also provide guidelines for an endpoint device providing status updates, notices, or other messages to particular users and/or particular display devices.

The gateway device is also implemented in such a manner as to offer its user many of the applications services from the user premises. As further described below, these application services comprise, by way of example, programming to simplify support services in the digital home including one or more of media delivery, content management, access control and use tracking, file sharing, and protection and back-up services of both Internet/Web-generated digital media content and user generated digital media content. The gateway device is programmed to simplify various aspects of managing the emerging home/business digital networks including the myriad of interconnected digital endpoint devices associated with the gateway device. It is important to note that the endpoint devices need not reside within, or be located at, the premises to maintain their association with the gateway device. The application services offered via the gateway device may be managed by the service management center.

The gateway device and the system architecture effectively place a set of application services on a tightly coupled (e.g. always-on or always-available basis), secure hardware platform that is externally managed by the service management center. The gateway device comprises application services programming, and associated hardware, that is positioned on the user premises side of the Network Service Provider Demarcation, which is configured to be managed by an external service management center.

Reference now is made in detail to the examples illustrated in the accompanying drawings and discussed below. FIG. 1 is a high-level diagram of the architecture of the gateway-service management center network as disclosed herein, as well as the logical flow of how a specific Application Client residing at a User Premises could interact with an Application Service in a gateway device that is being managed in the gateway-service management center network configuration. FIG. 1 shows application services that logically reside at the Application Services Layer (AS Layer) in the User Premises Network, i.e., on the hardware components located in the user premises, such as, by example, a gateway device. In particular, the programming that implements application services is logically positioned on the user premises side of the Network Service Provider Demarcation. The application service on the user premises side that enforces authorization, authentication, configuration, or use of the respective service via an endpoint device is logically depicted in FIG. 1 as the Application Services Enforcement (ASE) module in the AS Layer of the User Premises Network. The ASE module may also communicate via the wide area network with the Application Services Management (ASM) logic residing in the service management center.

FIG. 1 depicts an approach in which the Application Services Logic (ASL) and the ASE functions reside on the User Premises side. As discussed more below, the ASL and the ASE functions are implemented as high-level server type logic within a home gateway device at a user premises. Other elements shown in FIG. 1 that may reside in the user premises gateway device include the user premises-side network function or NF (switch, router or bridge) and the LAN termination for communication with the endpoint devices implementing the application client functions. Thus, with reference to FIG. 1, the first interface, as described above, for enabling bi-directional network layer communications on the user's side of the premises with one or more of the associated endpoint devices resides at the Network Interconnect (NI) Layer and provides the LAN (Local Area Network) Termination referenced therein. FIG. 1 also depicts the WAN (Wide Area Network) termination providing connectivity to the wide area network (network-side NF-Internet or private wide area data network). The gateway device's second interface, as described above, for enabling bi-directional network layer communications for the associated endpoint devices via a wide area network resides at the NI Layer and provides the WAN Termination referenced therein. The gateway device's second interface also enables bi-directional communications between it and the service management center via the WAN.

With reference to FIG. 1, the core of the logical capacities of the service management center resides on the Service Provider Network, and is depicted as the Application Service Management (ASM) portion of the Application Service Delivery Platform (ASD) in the AS Layer. The ASM function is implemented in the service management center, which is external to the user premises, and on the network side of the demarcation line in FIG. 1. The ASL and ASE functions maintain logical connectivity or interaction with the Application Service Management (ASM) function in the service management center, typically via communication through a wide area network. This logical connectivity is established through an always-on (or on an as needed, periodic basis), secure communication channel between the User Premises AS Layer (ASL and ASE) and the Service Provider AS Layer (ASM) at the service management center. The service management center and the communications of the center with one or more of the gateway devices provides an infrastructure support and/or management of the application services offered to endpoint devices and their users by the logic implemented in the gateway device(s). Effectively, the ASD, considered in its entirety, extends all the way to the User Premises and traverses the Network and Network Service Provider Demarcation. The secure communications channel is established through the NF Layer and the NI layer.

The examples discussed herein also introduce a logical platform management layer to the user premises-side, which allows for inter-layer allocation of local resources. This function guarantees access between the Application Service Logic function on the user premises network and the applications service management function in the service management center by assuring that the local user premises hardware and software modules are functioning at a required state (CPU and memory usage, bandwidth usage, QoS settings, etc.) in order for the ASL to have the necessary resources to establish its required communications path to the ASM.

The platform manager is also responsible for implementing that part of the managed application services to be performed by the gateway device. In that regard, the platform manager secures and manages the overall hardware platform, given that in this scenario, the NF layer and the AS layer reside on one hardware platform. This secure hardware platform provides a robust and secure operating environment for the AS Layer. So, to establish a secure and robust hardware operating environment, the platform manager must interface with all the layers above it and allow for bi-directional management information flow among all of the functions. For example, if the Application Client is a telephony application and the desired application is call processing, the application must first connect to the LAN termination interface (1). Then a connection must be established to the AS Layer through the NF layer (2). At this point the platform manager determines if there are sufficient resources available for this to take place on the routing and switching modules and if there is not sufficient resources on either the LAN Termination interface or the NF layer functions, it would take the necessary corrective measure to free up the required resources so that the application can execute properly (e.g. prioritize packets, throttle bandwidth, attempt to reduce noise on an RF interface, or free up time slices on a TDMA interface such as MoCA). Once that is done, the connection is established to the AS Layer (3), where the ASE and ASL, having been updated by the ASM in the network, respond instantaneously to the Application Client, completing the service request.

Application services represent functionalities, implemented in the higher layer(s) of the protocol or logical stack above the network layer(s) that may extend up to the top application layer (layer 7of the OSI model). An application service, for example, provides application server communication with a client functionality of one or more endpoint devices, for the respective service, communicated on top of network layer communications through the interfaces. In the examples, the services are provided on a subscription service basis to users at the premises. Hence, the application service logic provides enforcement regarding authorization, authentication, configuration, and/or use of the respective service via the endpoint devices. The application service includes service and feature functions, implemented and controlled by the application service logic. Management of the application service is based on communications with the service management center via the wide area network.

The illustrated architecture of the gateway device-service management center network enables other features and capabilities that have not previously been available to the user. For instance, peer-to-peer application communication between or among gateways is possible without the need to go through, or utilize resources at, an external service management center or presence and networking message server. Communications through the service management center are also possible. In addition, given the considerable functionality present in the gateway device, and its ability to manage the various endpoint devices associated with it (as explained below), the user interface with the gateway can be presented and utilized on the home TV. Additionally, information from other endpoint devices, such as the PC, network sources (such as an RSS (Really Simple Syndication) service), may now be overlaid on the TV screen so that, for example, PC messages, or weather information, can be viewed on the TV screen, and the functionality of the PC (or other home-networked endpoint devices) can be accessed from the TV screen. As described below in connection with FIG. 2, gateway device 10 may direct alerts, notifications, and messages from associated endpoint devices to users and display them on one or more devices as specified by subscribers or service providers in configuration data stored by the gateway device.

Gateway Device, IM Server, and Service Management Center Architecture

Figure 2:
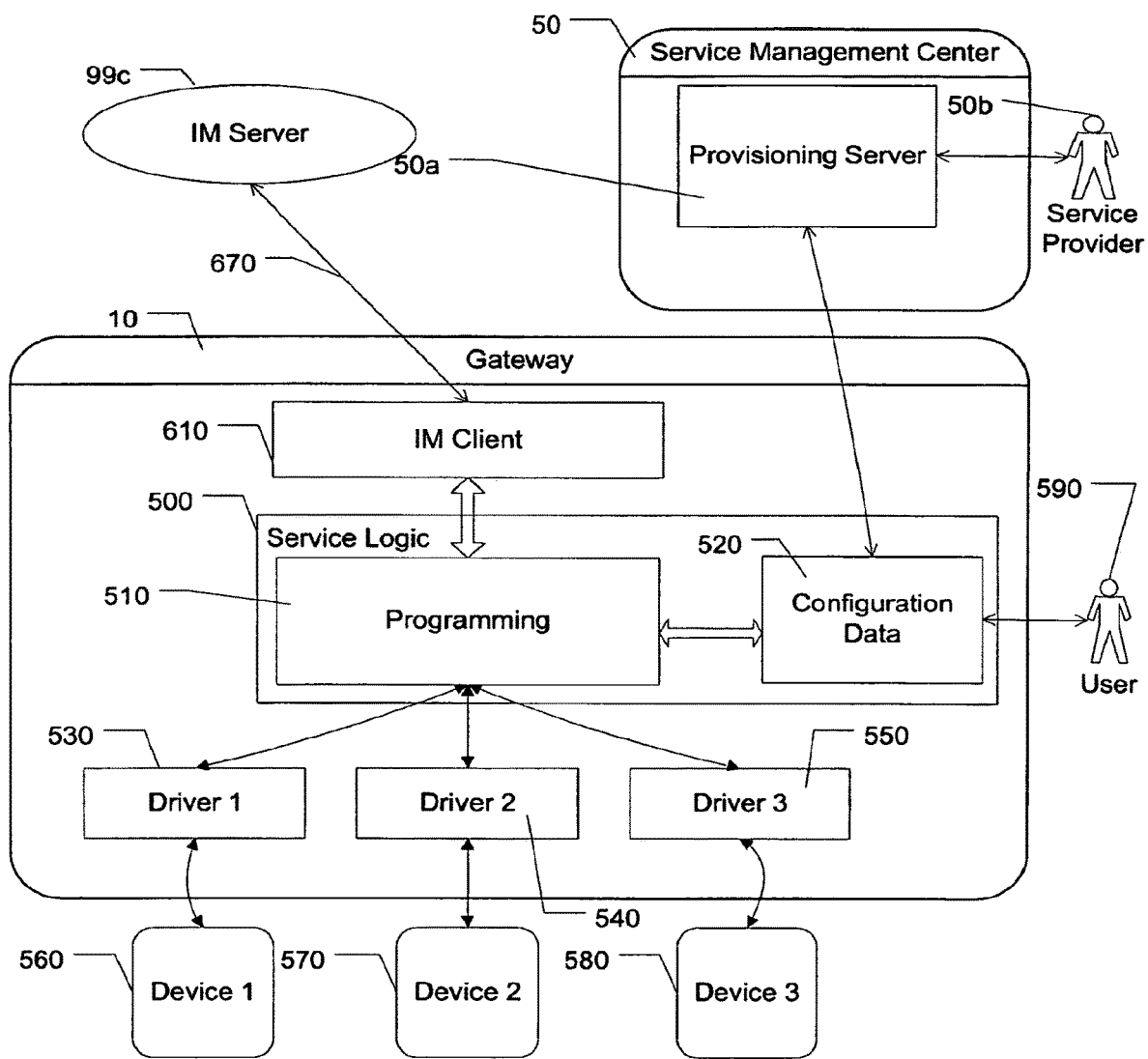
FIG. 2 is a network diagram depicting a gateway device, a presence and networking message communication server, a service management center, and endpoint devices.

As illustrated in FIG. 2, gateway device 10 may be configured with a presence and networking message protocol client (e.g., IM client 610) that may communicate with a local or remote server (e.g., IM server 99c, which may be part of IM networks 99a and/or 99b as described below, or service management center 50). With IM client 610, gateway device 10 may be configured as an IM endpoint so as to expose one or more resources of associated endpoint devices (e.g., devices 560, 570, 580, etc.), and/or the presence of the associated endpoint devices themselves, under the management of gateway device 10. The management by gateway device 10 of the one or more associated endpoint devices (e.g., devices 560, 570, 580, etc.) may include, for example, the routing of notification messages from the associated endpoint devices to users 590 or service providers 50b, and file sharing among the endpoint devices. Preferably, gateway device 10 does not extend the presence and networking message protocol functionality of IM client 610 to the associated endpoint devices (e.g., devices 560, 570, 580, etc.).

As shown in FIG. 2, gateway device 10 may be configured with service logic 500, which acts as an intermediary between the IM client 610 and the drivers for the endpoint devices. Application service logic may include programming 510 that interacts with drivers for devices, and configuration data 520. Drivers (e.g., driver 530, driver 540, driver 550) may be configured to control and manage the various endpoint devices associated with gateway device 10. For example, driver 530, 540, and 550 may manage devices 560, 570, and 580, respectively. Although not shown in FIG. 2, one driver may manage more that one device. Endpoint devices, such as endpoint devices 560, 570, and 580, may include any digitally-enabled device. Additionally, drivers may enable communications between endpoint devices associated with the gateway, as discussed in further detail below.

IM client 610 of gateway device 10 may interact with the driver associated with the endpoint device through the implemented application service logic 500. Service logic 500 is configured to specify which devices, attributes, and operations are exposed to the IM server 99c via messages 670 with IM client 610. Through the service management center 50, the service provider 50b may also specify parameters of operation and presentation of application services provisioned by the service provider (e.g., using provisioning server 50a). The service logic 500, may include configuration data 520, which may be configured by user 590 or the service provider 50b to specify rules for handling incoming IM messages (e.g., IM messages 670, which may be any suitable messages using a presence and networking message protocol, such as Instant Messaging) to gateway device 10 and the routing of those messages to the appropriate managed endpoint device (e.g., endpoint devices 560, 570, 580, etc.) using one or more drivers (e.g., drivers 530, 540, 550, etc.) associated with the endpoint device.

The intermediary service logic 500 in gateway device 10 may be configured by user 590 of gateway device 10 to establish the management parameters of associated digital endpoint devices 560, 570, 580, etc. Configuration data 520 of service logic 500 may store the management parameters for the one or more associated endpoint devices. Thus, local or remote IM users via IM server 99c may interact with or manage endpoint devices associated with gateway device 10 that may not be not be enabled with a presence and networking message protocol client (e.g., IM client) protocol. Thus, service provider 50b and user 590 may configure the configuration data 520 of gateway device 10 so as to manage the response of gateway device 10 to an IM event (e.g., IM message 670) by providing customized notification from associated endpoint devices, as well as management and responses of, and interaction with, associated endpoint devices.

IM client 610 enables gateway 10 to communicate with other external entities through a local or remote IM server 99c using a presence and networking message protocol (e.g., IM protocol). Preferably, IM client 610 is the IM client presented to an external entity via IM server 99c. Alternatively, one or more endpoint devices may be enabled with an IM client and may be visible to IM server. IM client 610 of gateway device 10 presents endpoint devices (e.g., devices 560, 570, 580, etc.) and/or device functionalities to external endpoint clients communicatively coupled to IM server 99c based upon configuration data 520 in service logic 500. For example, gateway device 10 with IM client 610 may be visible to an external user, and the associated endpoint devices of gateway device 10 may not be visible. In a preferred embodiment, IM client 610 of gateway device 10 reveals associated endpoint devices it manages based upon configuration data 520, and such that the endpoint devices and their respective functionalities are revealed as attributes and operations of IM client 610.

Associated with gateway device 10 are one or more endpoint devices (e.g., device 560, device 570, device 580, etc.). These devices do not need to be enabled with presence and networking protocol clients (e.g., IM clients) or function as IM-intelligent devices. Although such devices may have IM clients or function as IM-intelligent devices, the individual devices and their associated functionalities are preferably not presented directly to external clients. Rather, the presence and functionalities of these devices are represented by IM client 610 of gateway device 10 as specified by configuration data 520. Alternatively, configuration data 520 may be configured by user 590 or service provider 50b so as to directly present the presence and/or functionality of an associated IM-intelligent device.

As described herein, endpoint devices may become associated with, and configured to, gateway device 10. Each endpoint device has an associated driver (e.g., driver 530, driver 540, driver 550, etc.) which accomplishes the association with, and configuration to, gateway device 10. The driver communicates with the device (e.g., device 560, device 570, device 580, etc.) directly using its own proprietary communication protocol. The driver abstracts the capabilities of the endpoint device with which it is associated to form a set of attributes and operations for that type of endpoint device. For example, digital photo frames may have the same kind of driver capabilities, but each digital photo frame may have its own particular driver implementation.

Intermediary service logic 500 of gateway device 10 uses the one or more drivers (e.g., driver 530, driver 540, driver 550, etc.) to communicate with the endpoint devices. The intermediary service logic 500 interacts with one or more drivers through, for example, a an applications program interface (API). Thus, specific communication protocols either supported by or utilized by each endpoint device need not reside in intermediary service logic 500, and may reside in the drivers. As discussed above and as illustrated in FIG. 2, intermediary service logic 500 may be positioned between the IM client 610 device drivers (e.g., drivers 530, 540, 550, etc.). Once an endpoint device is detected by and configured to gateway device 10, intermediary service logic 500 may enable user 590 or the service provider 50b to establish or revise configuration data 520 to what extent, if any, the presence and/or functionalities of the endpoint devices are available via IM client 610 to external entities. Thus, user 590 may, for example, set parameters for access, control, presentation, notification and level of service for one or more endpoint devices. These parameter selections may be stored in configuration data 520. For example, the user can decide who can view the endpoint devices and the attributes and operations exposed to an IM external entity. This arrangement allows the IM client 610 to utilize the endpoint devices and functionalities, as well as and present these functionalities as part of the capabilities of gateway device 10 that may be exposed to an external entity. From the perspective of the external entity or external IM server (e.g., IM server 99c), IM client 610 of gateway device 10 appears as the sole endpoint, even though gateway device 10 to utilize the capabilities provided by the associated endpoints.

Intermediary service logic 500 may enable user 590 of gateway device 10 to define the notices and/or alerts provided by gateway device 10 in response to an IM event. User may specify various notification protocols, which may be stored as configuration data 520, that may be used to determine how gateway device 10 responds to an IM event. For example, user 590 may have the ability to establish, with configuration data 520, whether notices may be displayed on certain associated endpoint devices (e.g., a television, PC, personal digital assistant, cell phone, remote control, etc.) advising of an IM event or inviting a response to an IM event. User 590 may also specify in configuration data 520 whether IM notices may be sent to an external entity with an IM client in response to an IM event, whether the notice is informational in nature and that actions in respect to an endpoint device are automatically taken by gateway device 10, or whether a response to the notice is required before any action will be taken. For example, notices may be displayed on the TV a particular room when a phone call is received providing the caller's identification and other related information. The notification protocol, as defined in configuration data 520, may be programmed to display the notice for a predefined period of time (e.g., ten seconds, one minute, etc.) on a television or other display device (e.g., cell phone, personal digital assistant, remote control, PC, etc.). The notification protocol may require a response by which the call may be answered and the TV programming paused, or the call is routed to a voice mail or other messaging storage. Thus, configuration data 520, as set by user 590 or service provider 50*b,* may enable gateway device 10 to have an plurality of different options for response to an IM event, depending on the nature of the event and the endpoint device indirectly involved. This differs from previous approaches in which notification and messaging protocols are provided through a central IM service.

In an illustrative example, a TV, digital picture frame, and garage door may be devices associated with and configured to gateway device 10. Application service logic 500 of gateway device 10 may be utilized by user 590 to present to an external IM entity the following as the identified resource:

Gateway device
  Video
  Digital Pictures
  Garage Door.

In the above example, user 590 has made configuration selections, which may be represented by configuration data 520 such that intermediary service logic 500 may present the garage door, but not the TV or digital picture frame to external IM clients (i.e., IM clients other than IM client 610). Instead, IM client 610 of gateway device 10 offered to the home user environment by the TV or digital picture frame has been presented. Even though the Garage Door is listed as an endpoint and may be IM-enabled, the external entity does not communicate with the Garage Door directly. Rather, IM client 610 may control and communicate with the Garage Door through the intermediary service logic 500.

The resources presented to an external IM entity may be dependent on the identity of the IM entity. For example, a father and mother may be presented with the Garage Door resource, but not their children or those on the roster or buddy list for the registered IM community. Other restrictions that user 590 may implement through the intermediary service logic 500 may allow IM external entities to view identity and state of the endpoint device, but in a read-only attribute on the IM Client 610. Therefore, the configuration of configuration data 520 may determine the external entities that may directly interact with any endpoint device, and the extent of that interaction. The interaction with endpoint devices is governed and managed by the intermediary service logic 500 and associated configuration data 520.

Along with the resources presented, IM client 610 may present corresponding or associated capabilities and states. For example:

Gateway device
  Video (available)
  Digital Pictures (available)
  Garage Door (open).

Intermediary service logic 500 may further enable user 590 to determine the manner in which an event is handled by gateway device 10 and the associated endpoints. In the preceding example, if an external entity sends a digital picture, gateway device 10 may be programmed to notify the subscriber (e.g., user 590), through messages displayed, for example, on the TV, the picture frame, or a cell phone, that a digital picture has been offered. The subscriber may elect which associated end point device to display the digital picture, e.g., the TV, the digital picture frame. Alternatively, gateway device 10 may be programmed to display the offered digital picture on a pre-selected endpoint device, such as the TV, upon receipt. The response to each event may be programmed (e.g., as part of configuration data 520) to be dependent on the source of the event and/or request or the nature of it.

In another example, user 590 may decide not to present resources (e.g., to IM server 99*c*) via IM Client 610, but may configure the service logic to consider the type of incoming IM message (e.g., message 670) for routing to a particular device. For example, incoming file shares could be routed to the digital picture frame without an IM external entity being aware that the IM Client 610 has an associated picture frame.

Gateway device 10 may have further programming (e.g., the API and drivers as described above) that communicates with the endpoint devices (e.g., device 560, device 570, device 580, etc.). If the endpoint device is IM-enabled, the communication may be based on an IM protocol from gateway device 10. Or, it may be based on an alternative communication protocol based on the capabilities of the endpoint device or the programming in service logic 500. Preferably, for IM-enabled end-point devices, the endpoint device does not communicate directly with the external entity, but does so through service logic 500 of gateway device 10.

If the endpoint device is not IM-enabled, the communication may be facilitated by any appropriate communication protocol. In particular, the endpoint device may communicate its state through the associated driver (e.g., driver 530, driver 540, driver 550, etc.) to the intermediary service logic 500. Intermediary service logic 500 may exposes the state condition to, e.g., as an attribute of IM Client 610, if so configured to do so by user 590. The endpoint device is thus able to communicate events to gateway device 10.

As described above, the notification protocol as selected or predefined in configuration data 520 may enable IM client 610 of gateway device 10 to determine the recipient (e.g., an IM external entity or another associated endpoint device) of messages or notification. The messages and/or notifications may be endpoint device state notices and messages generated by IM Client 610 in response to IM events. This determination can be made by reference to a "roster" created by user in accordance with programming selections available by the intermediary service logic 500 (wherein the selections may be stored as configuration data 520). The roster may particularized based on event or endpoint device, and may vary depending on the type of event associated with designated end-point devices. IM client 610 may automatically inform particular end-point devices and/or IM external entities of state changes of other end-point devices or of IM events or messages received from IM external entities. Because IM external entities may include other gateway devices, which in turn have their own associated end-point devices, it is possible that the programming choices may, in response to state changes in one endpoint device associated with gateway device 10, automatically trigger or effect state changes in other gateway device and/or endpoint devices associated with other gateway devices.

The gateway device 10, IM server 99c, and service management center 50 illustrated in FIG. 2 may be used in the context of a home management system. A more specific example of a home management system is described below in connection with FIG. 11, which illustrates a home automation control network. Turning to FIG. 2, the received event (e.g., message 670) may be a state notice from the garage door (e.g., device 560, 570 or 580, etc.) to the gateway device 10 (via a driver program) that it is open. Gateway device 10 may determine the user and device associated with the user that should receive the state notice (e.g., as directed by configuration data 520). For example, while several cell phones (family, friends, etc.) on an IM Roster associated with the gateway device 10, the programming of intermediary service logic 500 gateway device 10 may direct IM client 610 to communicate only to e.g., a mother and father's cell phones regarding the garage door state. The mother may respond by directing the garage door be closed. IM client 610 of gateway device 10 may receive the event (e.g., message 670 with the instruction to close the door), and intermediary application service logic 500 determines if the event is to be processed and implemented. Having verified the event, the instruction is implemented through driver and/or API resident on gateway device 10. The door is closed, and the drivers receive state information. The state information may be shared with the intermediary application service logic 500, which determines if the state information is to be communicated, based on configuration data 520. If it is to be communicated, service logic 500 determines which associated external entities are to receive that state notice (e.g., cell phones for the mother and father of a family).

An event (e.g., message 670 as an incoming file, instruction, state notice, etc.) arriving at the IM client 610 of the gateway device 10, whether received from an associated endpoint device or from an external entity (e.g., IM server 99c), is handled and processed by intermediary application service logic 500 of gateway device 10 according to the configuration and programming choices made by user 590 (stored in configuration data 520). User 590 may determine which of the entities are notified of the event, how they are notified of the event, and the range of responses available to the entity and the endpoint device.

Thus, in the arrangement illustrated in FIG. 2, the external entity or external IM server (e.g., IM server 99c) registers IM client 610 of gateway device 10, and associated endpoint devices are not visible from the standpoint of IM server 99c or other external entity. Although, the functionalities of one or more endpoint devices may be selected to be available to IM server 99c or other external entity. From the standpoint of user 590, gateway device 10 may be enabled to manage and control one or more associated endpoint devices, and utilize them in response to events, according to programming or programming selections made by the user 590 (and stored, e.g., as configuration data 520).

Gateway device 10 may also be managed by service management center 50. Thus, IM client 610 of gateway device 10 and associated application service logic 500 may be provisioned and governed by the service provider 50b through service management center 50. This arrangement may enable service provider 50b to set the parameters for access, control, presentation, and level of service which may be stored in configuration data 520, with user 590 able to make programming and service choices within the parameters set by the service provider 50b. The various services available through the gateway device 10 (e.g., home automation, file sharing, video download), and the features or capabilities within each of those services, may be provisioned, configured, managed, initiated, or terminated through service management center 50. Thus, IM Client 610 may be managed externally to provide different levels and types of services and capabilities.

Note that the external IM Server 99c illustrated in FIG. 2 can be public (e.g., an IM server operated by Yahoo®, Google®, MSN®, etc.) or private. In one particular embodiment, service management center 50 may be configured to serve as an external but private IM server. This capability is in addition to the management, servicing and provisioning capabilities (e.g., as with provisioning server 50a of service management center 50) described above. Thus, the architecture of the system illustrated in FIG. 2 may be configured to enable an established public IM service to provide presence and networking functions to gateway device 10, or it can be configured to have the service management center 50 configured to be a private external IM server. Thus, the communication between gateway device 10 and service management center 50, may provide a private, proprietary, and closed presence and networking message communication system. In addition, the IM client-server communication link, whether public or private, may be operated in a secure manner. When service management center 50 is enabled as a private external IM Server, the IM client server communications between service management center 50 and gateway device 10 may be private and secure.

Communication Amongst Endpoint Devices Via the Gateway Device

Gateway device 10 may facilitate communication between various digital endpoint devices (e.g., devices 560, 570, 580, etc.) associated with gateway device 10 using drivers (e.g., drivers 530, 540, 550, etc.) and service logic 500.

For example, device 560 may be a remote control, device 570 may be a television, and device 580 may be a garage door. A user may use the remote control to make selections of video content for display on the television. A remote control receiver may be communicatively connected to gateway device 10, wherein the receiver has an associated driver program (e.g., driver 530). The driver may process the received signal from the remote, as the communication between the device and the driver may utilize a driver communications protocol. The driver may transmit the processed remote signal to programming 510 of service logic 500 to enable the remote to communicate with the television. Programming 510 may determine which endpoint device may receive the processed remote signal, as well as determine the application or service that the signal is requesting from the determined endpoint device. For example, the signal from the remote may be to direct the television to change the channel. Service logic 500 provides the request from the remote to the driver for the associated television. The driver for the television communicates the request from service logic 500 (which was originally from the remote) to the television using a driver communication protocol that may be specific for communications between the driver and the television. Upon receipt of the request as facilitated by the driver, the television may change the channel as the user had indicated.

Similarly, the garage door (e.g., device 580 as in the example above) may send a notification that the door is open. The notification may be transmitted to the driver (e.g., driver 550 of gateway device 10) using a driver communication protocol. The driver may transmit the notification to programming 510 of service logic 500. Using configuration data 520, programming 510 may determine which endpoint device to direct notification messages from the garage. For example, the configuration data may provide instructions that notification messages should be directed to the television (e.g., device 570). Programming 510 directs the notification message to the driver program (e.g., driver 540) associated with the television (e.g., device 570). The driver program uses a driver communication protocol to transmit the notification message to the television for display. The television receives the communication from the driver program and presents the notification message for display.

Using the remote control, a user may respond to the notification message by selecting a option to change the status of the garage door (e.g., either from a selection offered by the notification message displayed or by selecting a menu option with the remote). Thus, the remote may provide a signal to the remote control receiver that is communicatively connected to gateway device 10, wherein the receiver has an associated driver program (e.g., driver 530). The driver may process the received signal from the remote, as the communication between the device and the driver may utilize a driver communications protocol. The driver may transmit the processed remote signal to programming 510 of service logic 500 to enable the remote to communicate with the garage door via, e.g., driver 550. Driver 550 may utilize a driver communications protocol to communicate to the garage door the command to close the door. Upon receipt of the command via the driver communications protocol, the garage door (e.g., device 580) may close.

A notification message may be sent from the garage door to driver 550 via the driver communications protocol that the door has been closed. Driver 550 may provide the message to programming 510, which, in turn, may provide the message to driver 540. This routing of the message may be, for example, based at least in part on configuration data 520. Driver 540 may transmit the message to the television (e.g., device 570) via the driver communication protocol for display. Thus, the user may be updated as to the change in status of the garage door (i.e., status has been changed from open to closed).

In addition, the remote control (e.g., device 560) may be enabled to facilitate two-way communication between the remote control and gateway device 10 via a driver communication protocol and a driver (e.g., driver 530). To enable this communication, the remote control may be configured with a display that presents alarm, status, and/or notification messages, or any other information to a user. The remote and its associated display may be configured to present a menu to the user for selecting options to display the status of endpoint devices associated with gateway device 10, and enable the user to change the status of the associated devices by providing selections.

A user may determine which messages are to be routed to the remote control by gateway device 10, as well as determine which endpoint devices associated with gateway device 10 may be controlled by the remote by setting various device and messaging parameters in configuration data 520 of gateway device 10.

Turning to the example above, the remote control may provide a signal to gateway device 10 to close the associated garage door endpoint device, and may also receive a notification message from the garage door via gateway device 10 that the door has been closed. This notification message may be, for example, presented on the display of the remote. In another example, a user may be notified of the phone number of an incoming phone call, which may be displayed on the remote control's display.

Figure 3:
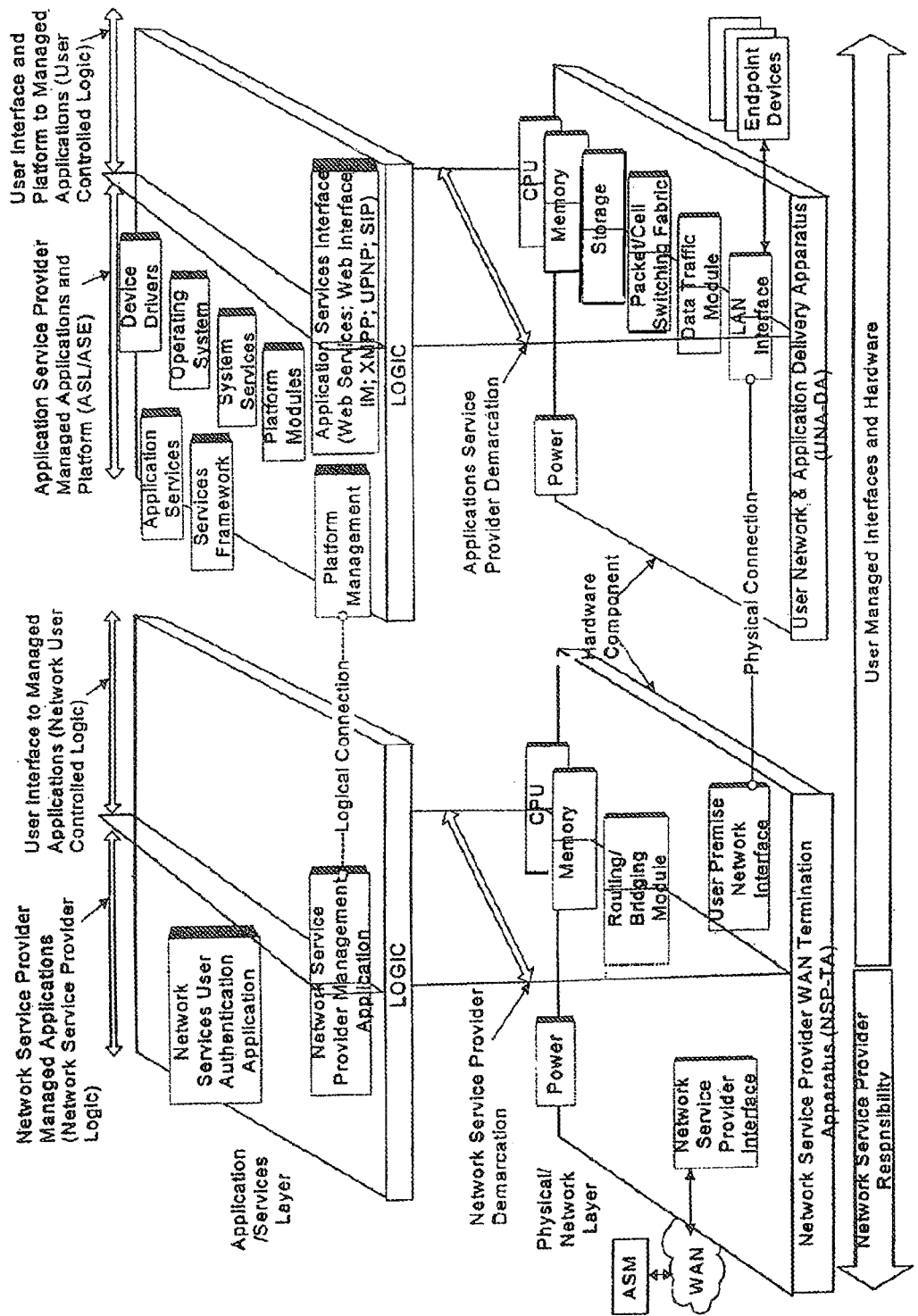
FIG. 3 depicts the managed application services delivery platform.

Gateway device 10, in conjunction with service management center 50, may deliver application services to associated endpoint devices, as described further in connection with FIG. 3.

Managed Application Services Delivery Platform

FIG. 3 depicts, at the Physical/Network layer shown therein, an example of user premises hardware components required for delivering data services (i.e. Internet connectivity) along with a separate, non-integrated managed hardware used in delivering a set of managed application services (i.e. IP telephony). The Network Service Provider Wide Area Network Termination Apparatus (NSP-TA) allows for a typical termination of Wide Area Network Services, such as DSL, Cable, Fiber, etc, by a network services provider. The NSP-TA provides the WAN Termination in the NI Layer (FIG. 1). The NSP-TA may be an existing user-premises device, provided by the carrier supplying network services to the premises. FIG. 2 also depicts the Network Service Provider Demarcation at the hardware level.

If configured as a standalone device, the NSP-TA device is required to have its own CPU, Memory, physical interfaces and logic control. In order for Network Service Providers to deliver managed services, they typically require a management element controlled by the CPU on the NSP-TA. To depict these logical elements residing on the hardware components, FIG. 3 includes an Application/Services Layer above the hardware layer. This layer corresponds to the AS Layer of FIG. 1, but without reference to any logical elements residing at the network services provider. The management element, represented by the Network Service Provider Managed Application, allows the network service provider to determine the status of the network hardware device and interfaces as well as maintain a certain degree of security enforcement at the customer premises. As noted, the network service functionality is at the NI and NF Layers and generally does not extend to the AS Layer(s) beyond basic authentication authorization and state management. As with the hardware components, the logical elements also have a Network Service Provider Demarcation as shown in FIG. 3. On the WAN side, depicted as the Network Service Provider Managed Applications side, of the Network Service Provider Demarcation, resides the applications that are managed, and under the exclusive control, of the network service provider (the Network Service Provider Logic). The User Interface to Managed Applications is present on the LAN side of the Network Service Provider Demarcation within the Application/Services Layer. Within this interface resides programming and logic available to users other than the network service provider referred to as the Network User Controlled Logic. The Network User Controlled Logic, which is depicted at the Application/Services Layer in FIG. 3, provides a user interface to the Network Service Provider Logic and, to the extent permitted by the Network Service Provider Logic, interaction with or communication between the user and network service provider through the Network User Controlled Logic and the Network Service Provider Logic, and to the NSP-TA hardware components. The Network User Controlled Logic allows for the User of the hardware to make certain, minimal programming changes relevant to their preferences (e.g., user name and password changes, local IP addresses changes, local interface selection). All user devices typically can only communicate with the NSP-TA through one or more of the User Premises Network Interfaces. The user can modify the Network User Controlled Logic through the User Premises Network Interface. The Network Service Provider Demarcation is typically within the NSP-TA, logically dividing the Network Service Provider Interface and the User Premises Network Interface modules. The network service provider does not have any in depth visibility or significant responsibility beyond the Network Service Provider Demarcation.

The User Network and Application Delivery Apparatus (UNA-DA), shown on the right hand side of FIG. 3, is a separate managed gateway device that a managed service provider (which may be different than the network service provider) would control in delivering a set of application services to the user premises. This device is required to have its own dedicated CPU, memory, logic control, as well as its own dedicated set of interfaces. The UNA-DA includes one or more Network Interfaces providing connectivity to the NSP-TA as well as to user premises endpoint devices. The interfaces provide the LAN Termination functionality at the NI Layer (FIG. 1). One skilled in the art will readily recognize, however, that the physical connection that connects the UNA-DA to the NSP-TA also provides connectivity for the UNA-DA to the public (WAN side) network, and is the means by which the UNA-DA accesses the public network. The end point devices connected to the LAN Interface are on the private (LAN) side of that interface. The UNA-DA also includes a switch, router or bridge for the NF Layer.

Programming elements of the UNA-DA are depicted at the Application/Services Layer of the UNA-DA. Certain logical elements, depicted as the Application Service Provider Managed Applications and Platform in FIG. 3, on which resides, inter alia, the programming corresponding to the ASL and ASE of FIG. 1, are managed by the managed application service provider's network control center, e.g. by the ASM through a wide area network (WAN) by means of a control channel to the Application Service Provider Managed Applications and Platform. The Application Service Provider Managed Applications and Platform includes a platform management logic module that, with other programming in the Platform and the ASM, allows the managed application service provider to control the hardware elements of the UNA-DA in addition to any other relevant application services logic or hardware that may reside on the user premises. For example, this programming enables managed application service provider to control and manage the hardware elements on the UNA-DA to ensure proper use and allocation of the UNA-DA's processing, memory, storage, and bandwidth, to monitor local hardware security and generate needed alarms or protection sequences, and to prioritize applications based on a set of established policies. The user would have control over specific parameters of the UNA-DA through the User Interface and Platform to Managed Applications (User Controlled Logic) shown in FIG. 3. These parameters allow the user to control the local behavior of the interfaces and to configure the specific applications to accommodate the user network as configured by the user and to implement the user preferences for those applications.

To identify the separation of, and distinguish between, the programming and hardware components subject to control by the managed service provider and those subject to control by the user premises, FIG. 3 identifies a dividing line across the logical elements of the UNA-DA, and a corresponding dividing line across hardware components, referred to as the Applications Service Provider Demarcation. The Applications Service Provider Demarcation is flexible in that it may extend logically through the Application Services Interface (and, in a hardware context, through the Network Interface) to other devices that are under the logical control of the Application Services Provider Managed Applications and Platform, given that "services" are not restricted to a specific hardware boundary.

There is no hard requirement for cross management between the UNDA-DA and the NSP-TA. Under this first scenario the user is responsible for making the configuration changes in the specific user controlled logic modules in order to get the two devices to communicate with each other. Optionally the two sub-systems can be combined together, either physically in one hardware device, or logically as two separate hardware devices, but having one user managed interface.

The two hardware regimes described above (NSP-TA and the UNA-DA) may be combined into one managed hardware platform and, thereby, replace the need for the user to have access to the User Premises Network Interface with the logic residing in the Platform Management logic module of the Application Service Provider Managed Applications and Platform. This would in effect replace the "user" access with a managed "machine" access, for aspects of the NSP-TA, as well as aspects of the application services offered through the UNA-DA. Thus, the combination creates an integral gateway device providing both network service and application services, under centralized management. Although integrated, network interconnect functions of the NSP-TA may still be managed by the network service provider, as in the example of FIG. 3. Those skilled in the art will readily see additional combinations and configurations for the hardware comprising the NSP-TA and the UNA-DA. For example, in a further embodiment, all the hardware dedicated to the Network Service Provider Interface may reside and be integral with the hardware comprising the UNA-DA. Thus, the hardware for the WAN interface may reside on the UNA-DA.

It may be helpful now to consider more detailed examples of the gateway device-service management center network.

Gateway Device and Service Management Center Elements

Those skilled in the art will recognize that functions of the service management center, which reside in the Application Service Management node on the Service Provider Network, as depicted in FIG. 1, may be implemented in a variety of different ways, on one or more computer hardware platforms connected to the gateway devices via a wide area network. FIG. 3 depicts an example wherein the implementation is on Internet or other wide area IP network 99. The example uses a distributed processing approach, in which the elements/platforms implementing the service management center are interconnected for communication and for wide area communication, and in this way, those elements form a network 50 for implementing the service management center.

Figure 4:
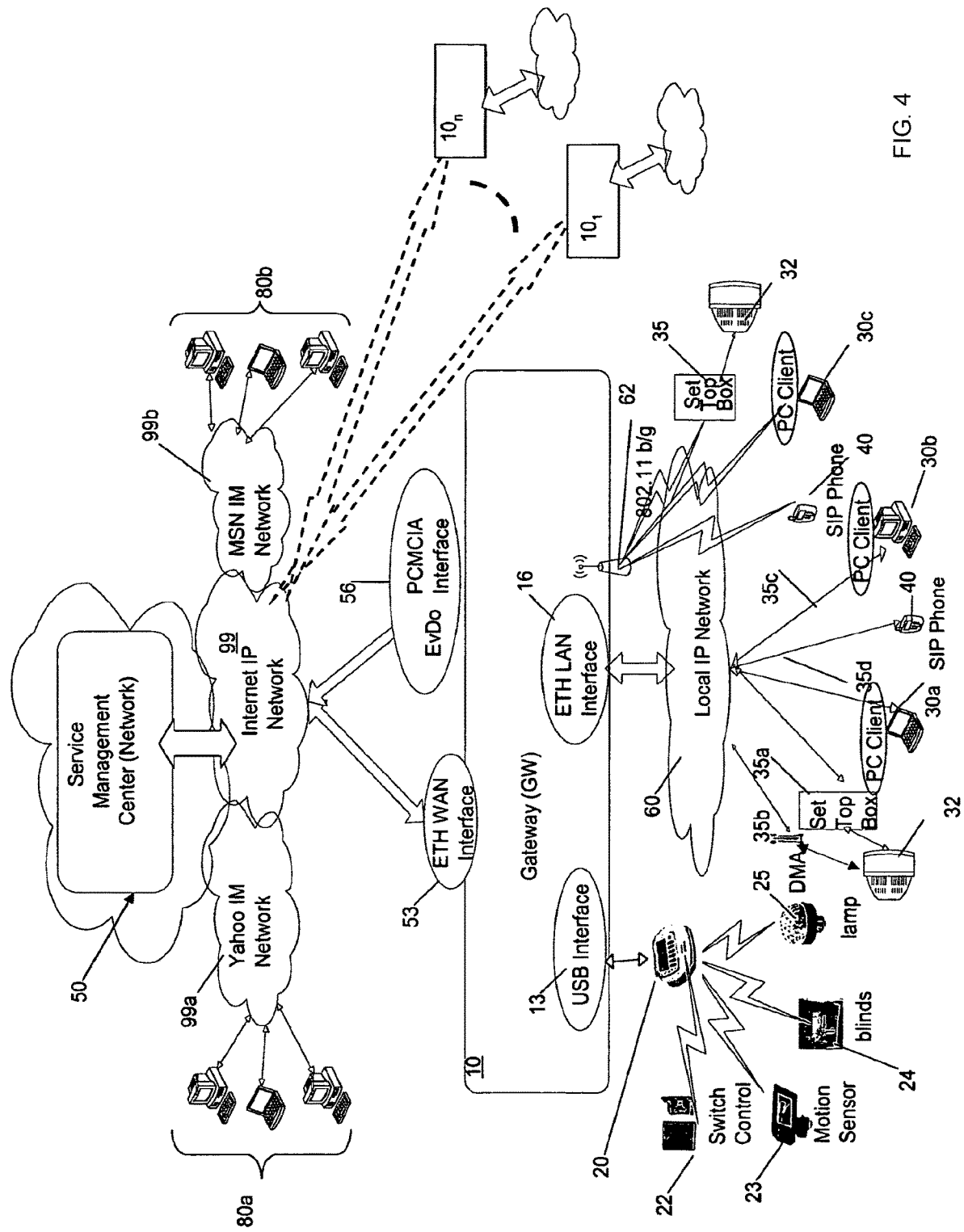
FIG. 4 is a network diagram, depicting a gateway device, endpoint devices at the user premises, one or more wide area networks and a service management center.

As shown in FIG. 4, the service management center network, through the logical capabilities earlier depicted in FIG. 1 as the ASM module of the ASD Platform at the AS Layer, manages application services for a number of gateway devices 10, $10_1$ . . . $10_n$, located at various users' premises. These application services, shown as ASL and ASE in FIG. 1, implement their functionality within the Application Services Layer (FIG. 1), through programming that resides, at least in part, within the Application Service Provider Managed Applications and Platform of the UNA-DA (FIG. 3). As shown in FIG. 3, secure connectivity to the service management center network 50 is provided, in one embodiment, via a WAN Termination interface, such as Ethernet WAN 53 over a broadband connection via the public Internet 99, or, for example, via a wireless EvDO (Evolution Data Optimized) Internet data interface embodied as a PCMCIA (personal computer memory) wireless card 56. When the WAN Termination interface 53 is used, for example, it may provide connectivity to a broadband modem serving as the NSP-TA of FIG. 3, either as a separate unit or on a board included within the gateway device 10. If the wireless WAN interface is used, there may be no physical NSP-TA device, and the logic of the gateway device would implement functions of the NSP-TA as well.

As will be described in greater detail herein below, the service management center 50 generally provides a communications and processing infrastructure for supporting the variety of application services and related communications residing at the gateway devices 10, $10_1$ . . . $10_n$. In an exemplary embodiment, this infrastructure may be configured to provide a secure environment and may be IP-based. Preferably, this support architecture is designed for high availability, redundancy, and cost-effective scaling.

The secure platform for building and providing multiple application services for digital endpoints associated with a gateway device requires connectivity between the gateway device 10 and each of a user's devices (referred interchangeably herein as "endpoint devices" or "digital endpoint devices"). This connectivity may be provided by implementation of one or more USB ports (interfaces) 13, a wired Local Area Network connection such as provided by an Ethernet local area network (LAN) interface 16, or, a wireless network interface via a WiFi LAN access point 62 provided, for example, in accordance with the I.E.E.E. 802.11 b/g/n wireless or wireless network communications standard. These physical interfaces provide the required network interconnectivity for the endpoint devices to connect to the multiple application services. Although not shown in FIG. 4, this connectivity between digital endpoint devices and the gateway device may be accomplished by other means, including, by way of example, through of a virtual private area network connection accessed through a WAN interface.

That is, the gateway device 10 interfaces with digital endpoint devices including, but not limited to: a home automation networking device 20 (e.g. X10, Z-Wave or ZigBee) for wired or wireless home network automation and control of networked home devices such as a switch controller 22, sensor devices 23, automatically controlled window blinds 24, a controlled lighting or lamp unit 25 etc, individual or wired or wireless network of personal computing (PC) and laptop/mobile devices 30a, . . . , 30c that serve as file sources, control points and hosts for various other client endpoints, one or more television display devices 32 including associated set top boxes (STB) 35a or digital media adapters (DMA) 35b, one or more VoIP phone devices (e.g. SIP phones) 40, or other devices (not shown) that convert IP interfaces to PSTN FXO and FXS interfaces.

As noted earlier, the gateway device 10 may provide an interface 35b to the Digital Media Adapter (DMA) for television (TV) 32, which enables bidirectional wireline or wireless communication. This interface supports several functions for multiple services including, but not limited to: media (e.g., video and music) by enabling the transfer of media (e.g., video and music) to the TV; voice services, by providing for Called Line ID and for voice mail control; and provide Home Automation Services including status and control of networked home automation devices. The DMA element 35b converts audio and video (optionally) to a format suitable for a TV. In addition, the Digital Media Adapter 35b may be capable of receiving context-sensitive commands from a remote control device (not shown) and forwarding those commands to the gateway device 10. This enables the use of menus on the TV 32 for controlling application services and various features functions thereof, as offered by the gateway device 10. For example, the Media Adapter/TV combination is able to provide the following features including, but not limited to: display of media; media control functions, when enabled (FF, REW, STOP, PAUSE, etc); display of Calling Line Identification (CLID); control of voicemail; picture viewing; control of home automation; and user functions for the gateway device 10.

A Set Top Box 35a as shown in FIG. 4 also may handle media format conversion (for example NTSC to ATSC television RF signals), digital decryption and other DRM (digital rights management) functions, and Video On Demand Purchases, etc. The Set Top Box/TV combination may thus enable, by way of example: Media format conversion (for example NTSC to ATSC); decryption; other DRM functions (such as expiry of leases), prohibition of copying to digital outputs, function restriction, etc.; Video On Demand Purchases; and media control functions (e.g., FF, REW, STOP, PAUSE, etc.).

Whether provided by the DMA interface 35b and the TV 32 or by the set-top-box 35a and the TV 32, the communications to and from the TV provide a user interface for interaction with the gateway device 10. The programming of the gateway device supports, among other things, a graphical user interface (GUI) via the TV, sometimes referred to as the "ten-foot" interface.

With respect to PCs interfacing with the gateway device 10, PCs may serve as, among other things, file sources, control points and hosts for various software clients. Thus, the PC programming may work in conjunction with the ASL and ASE programming of the gateway device. Together, the PC programming and the ASL and ASE programming provide a more comprehensive and robust user experience. The gateway device 10 may further provide a bidirectional wireline or wireless interface 35c to a PC device 306 for supporting the transfer of media (e.g., video and music) to the computer for storage and viewing; for supporting voice services, e.g., by providing for calls from SIP soft clients; for file sharing, file back-up and home storage and home automation control functions. The access point 62 offers wireless data communications with a PC 30c. The gateway device interface through any PC may provide for the bidirectional moving of files, and status and control for the endpoint devices, including for example, status and control of networked home automation devices. In addition, using the PC interface, users may, for example, share files on the gateway devices, back-up or transfer files to the gateway devices or other storage; access personal page for notifications, RSS, shared photos, voicemail, etc. In addition to the IM and SIP capabilities of the gateway device, as described more below, PCs may also serve as a host for IM and SIP soft phone clients and other client devices. The client-server interaction of the PC with the application service logic of the gateway device 10 offers an alternative GUI for at least some of the services. The PC based GUI is sometimes referred to as the "two-foot" interface.

Although not shown in FIG. 4, other digital endpoint devices for which connectivity may be established with the gateway device 10 include, but are not limited to: personal music or media players, hi-fi audio equipment with media streaming capability, game stations, Internet radio devices, WiFi phones, WiFi or other wirelessly enabled digital cameras, facsimile machines, electronic picture frames, health monitors (sensor and monitoring devices), etc.

As described in greater detail herein, the gateway device 10 includes both a hardware and software infrastructure that enables a bridging of the WAN and LAN networks, e.g. a proxy function, such that control of any digital endpoint device at the premises from the same or remote location is possible via the gateway device 10 using, optionally, a secure peer and presence type messaging infrastructure or other communications protocols, e.g. HTTPS. For example, via any IM—capable device or client 80a, 80b respectively connected with an Instant Messaging (IM) or XMPP (Extensible Messaging and Presence Protocol) network messaging infrastructure, e.g. IM networks 99a, 99b such as provided by Yahoo, Microsoft (MSN), Skype, America Online, ICQ, and the like, shown for purposes of illustration in FIG. 4, a user may access any type of functionality at a subordinate digital endpoint device at the premises via the gateway device 10 and service management center 50 by simple use of peer and presence messaging protocols. In one exemplary embodiment, a peer and presence communications protocol may be used such as Jabber and/or XMPP. Particularly, Jabber is a set of streaming XML protocols and technologies that enable any two entities on the Internet to exchange messages, presence, and other structured information in close to real time. The Internet Engineering Task Force (IETF) has formalized the core XML streaming protocols as an approved instant messaging and presence technology under the name of XMPP (Extensible Messaging and Presence Protocol), the XMPP specifications of which are incorporated by reference herein as IETF RFC 3920 and RFC 3921. Thus, the gateway device is provided with functionality for enabling a user to remotely tap into and initiate functionality of a digital endpoint device or application at the premises via the IM-based messaging framework. In addition, the gateway device 10 and network connectivity to the novel service management center 50, provides, in a preferred embodiment, a secure peer and presence messaging framework, enabling real-time communications among peers via other gateway devices $10_1 \ldots 10_n$. For instance, the device 10 provides the ability to construct communication paths between peers with formal communications exchanges available between, for example, one gateway device $10_1$ at a first premises and a second gateway device $10_n$ located at the remote premises. Thus, such an infrastructure provides for content addressing, enabling peers through remote gateway devices $10_1 \ldots 10_n$. to supply and request content such as files, media content or other resources of interest to a community of interest.

As noted above, the novel system architecture allocates the logical functionality of the ASD Platform (FIG. 1) between the gateway device 10 and the service management center 50 within an environment that enables communication and feedback at the AS Layer (FIG. 1) between the gateway device 10 and service management center 50. Thus, the gateway device 10, when operable with the service management center 50, makes possible the management of services for the digital home and facilitates the easy addition of new services or modification of existing services. Such services may include, for example, facility management (home automation), media content downloading and Digital Rights Management (DRM), device updates, data backups, file sharing, media downloading and transmission, etc., without the intermediary of a plurality of external service providers who may typically provide these individual services for every digital endpoint device in the home or premises. The programming for these services resides in the Application Service Provider Managed Applications and Platform of the UNA-DA (FIG. 3). That is, as earlier shown, the gateway device 10 is integrated with hardware and software modules and respective interfaces that handle all aspects of home automation and digital endpoint service and management for the home in a manner without having to rely on external service providers and, in a manner that is essentially seamless to the user. This, advantageously is provided by the service management center 50 which is able to access regions of the gateway device 10 that are not accessible to the user, e.g. for controlling the transport and storing of digital content and downloading and enabling service applications and upgrades and providing largely invisible support for many tasks performed by users.

For example, with the robust capabilities of the Application Service Provider Managed Applications and Platform (FIG. 3), the gateway device 10 is capable of handling all aspects of the digital home communications, e.g. IP, voice, VoIP, phone connectivity. In this example, the service logic located and stored at the gateway device 10 may provide soft-switch functionality for implementing call-processing features at the premises (rather than the network) for voice communications, and enabling management of other service features to be described. With the provision of central office type call services and other service features provided at the gateway devices $10_1 \ldots 10_n$, a distributed soft-switch architecture is built. The ASM logical functionality of the service management center 50, in cooperation with the ASE logical functionality of the gateway device, may, among other things, provide, manage and regulate, for example, service subscription/registration, authentication/verification, key management, and billing aspects of service provision, etc. With all of the service logic and intelligence residing at the gateway device, a service provider can offer customers a broad spectrum of services including, but not limited to: media services, voice services, e.g. VoIP, automated file backup services, file sharing, digital photo management and sharing, gaming, parental controls, home networking, and other features and functions within the home or premises (e.g. home monitoring and control). Users can access their content and many of the solution's features remotely. Moreover, software updates for the in-home devices that require updating are handled in an automated fashion by the system infrastructure. The service management center infrastructure additionally provides a web interface for third-party service providers to round out the service solutions provided at the gateway device for the premises. For example, a third-party service provider other than the managed service provider associated with the service management center may be allowed access through the infrastructure to particular endpoint devices to provide additional services such trouble shooting, repair and update services.

Gateway Device Software and Hardware Architecture

Figure 5A:
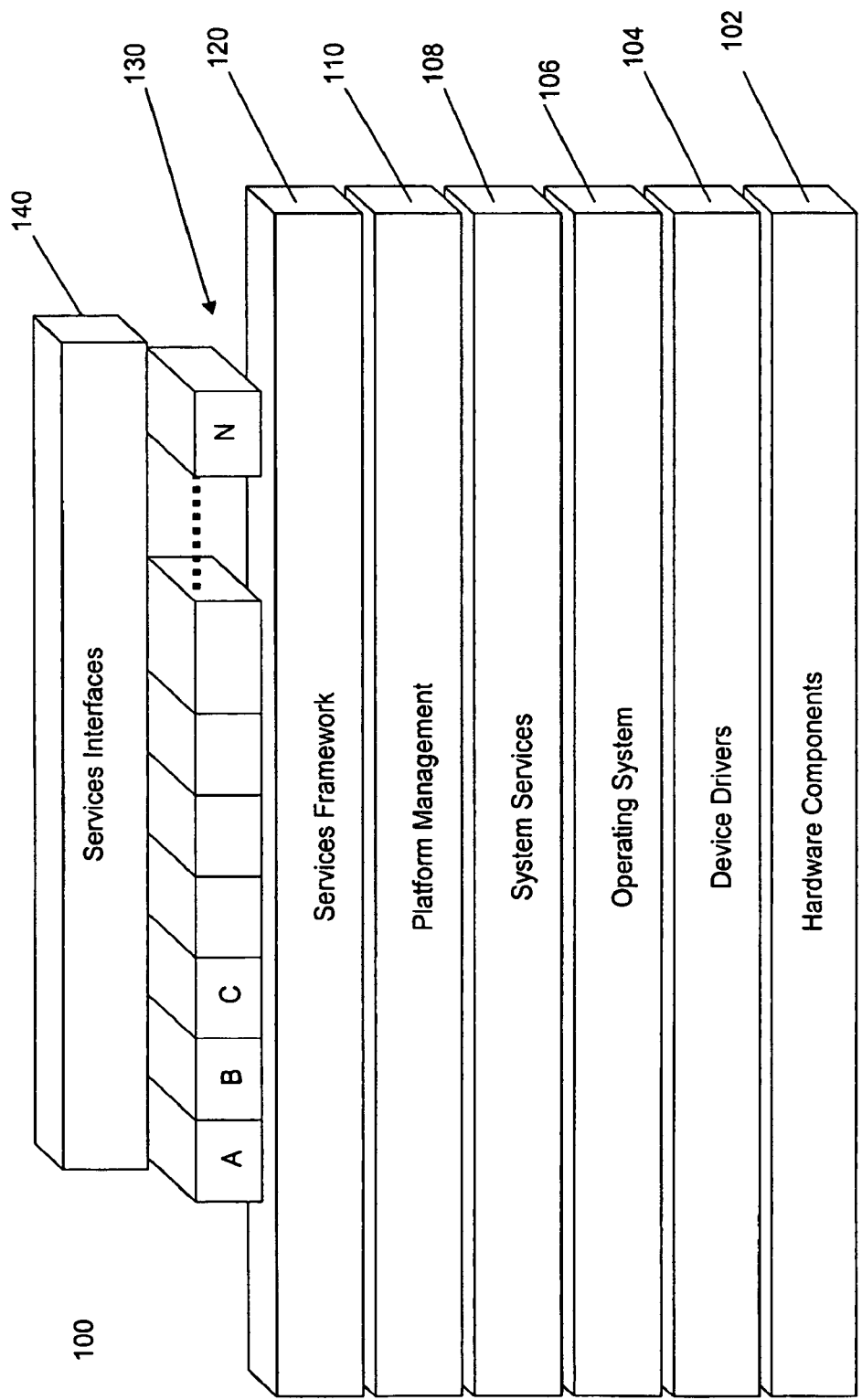
FIGS. 5A-5D depict the software and hardware architectures of the multi-services applications gateway device.
Figure 5B:
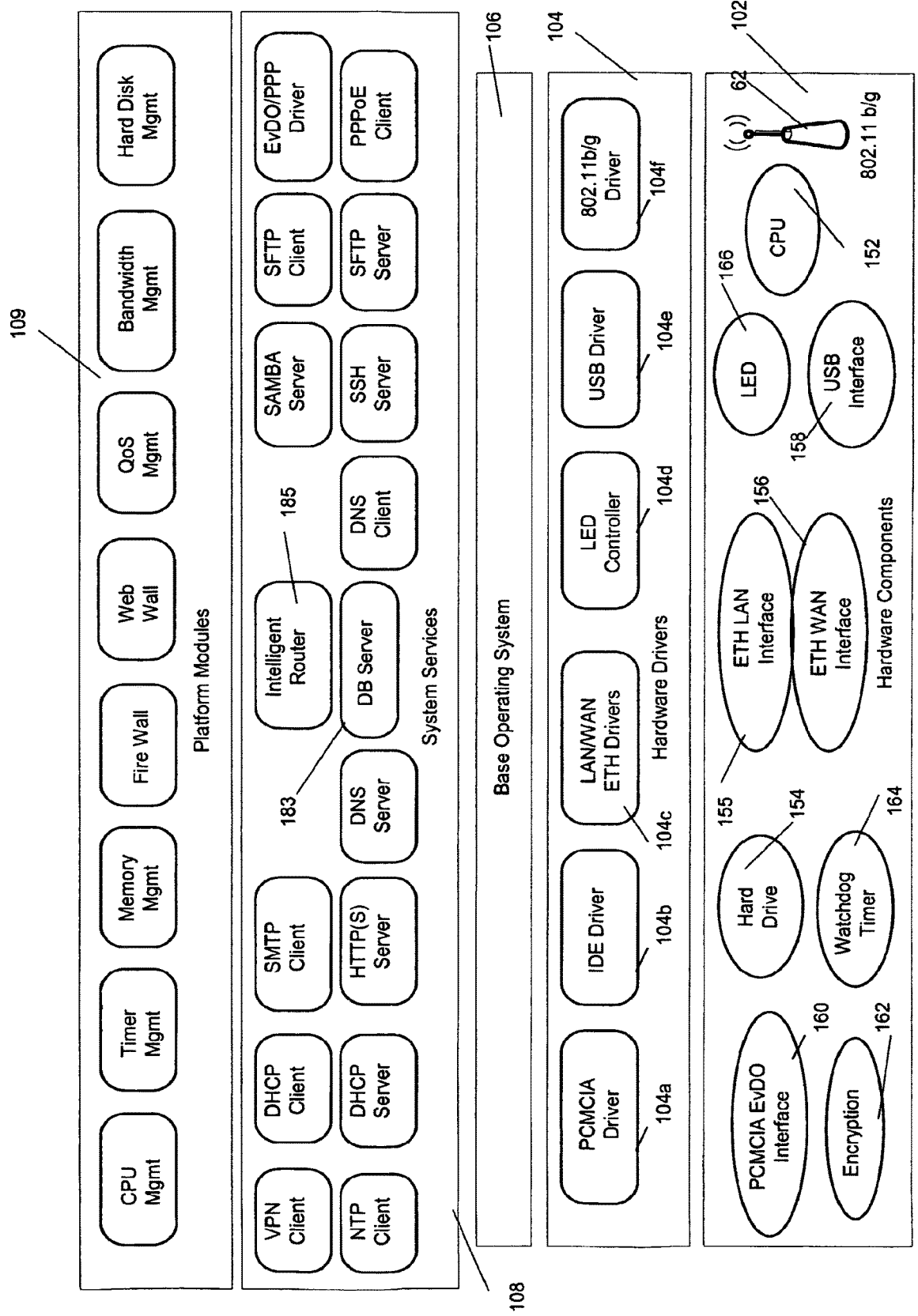
Figure 5C:
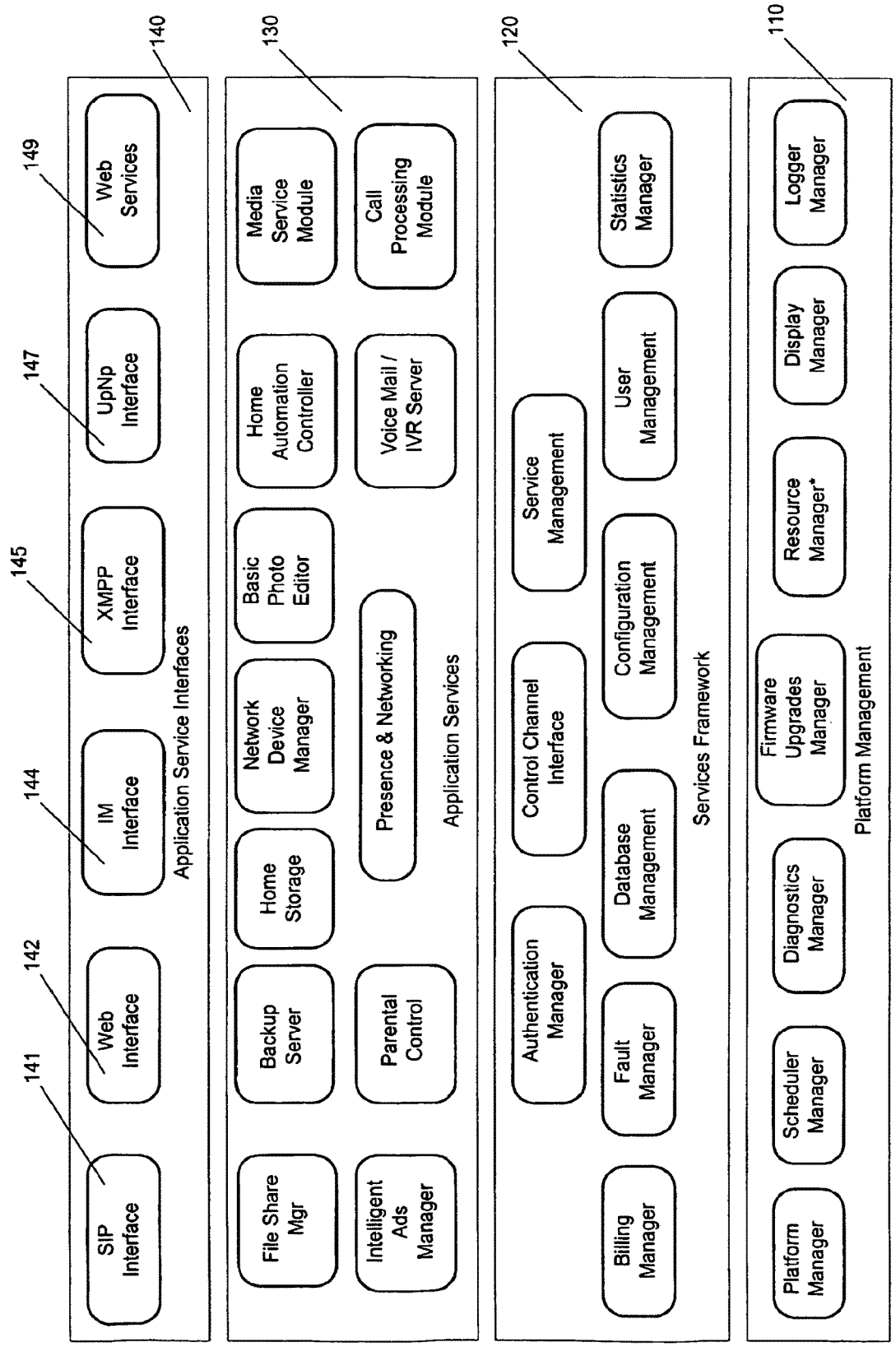
Figure 5D:
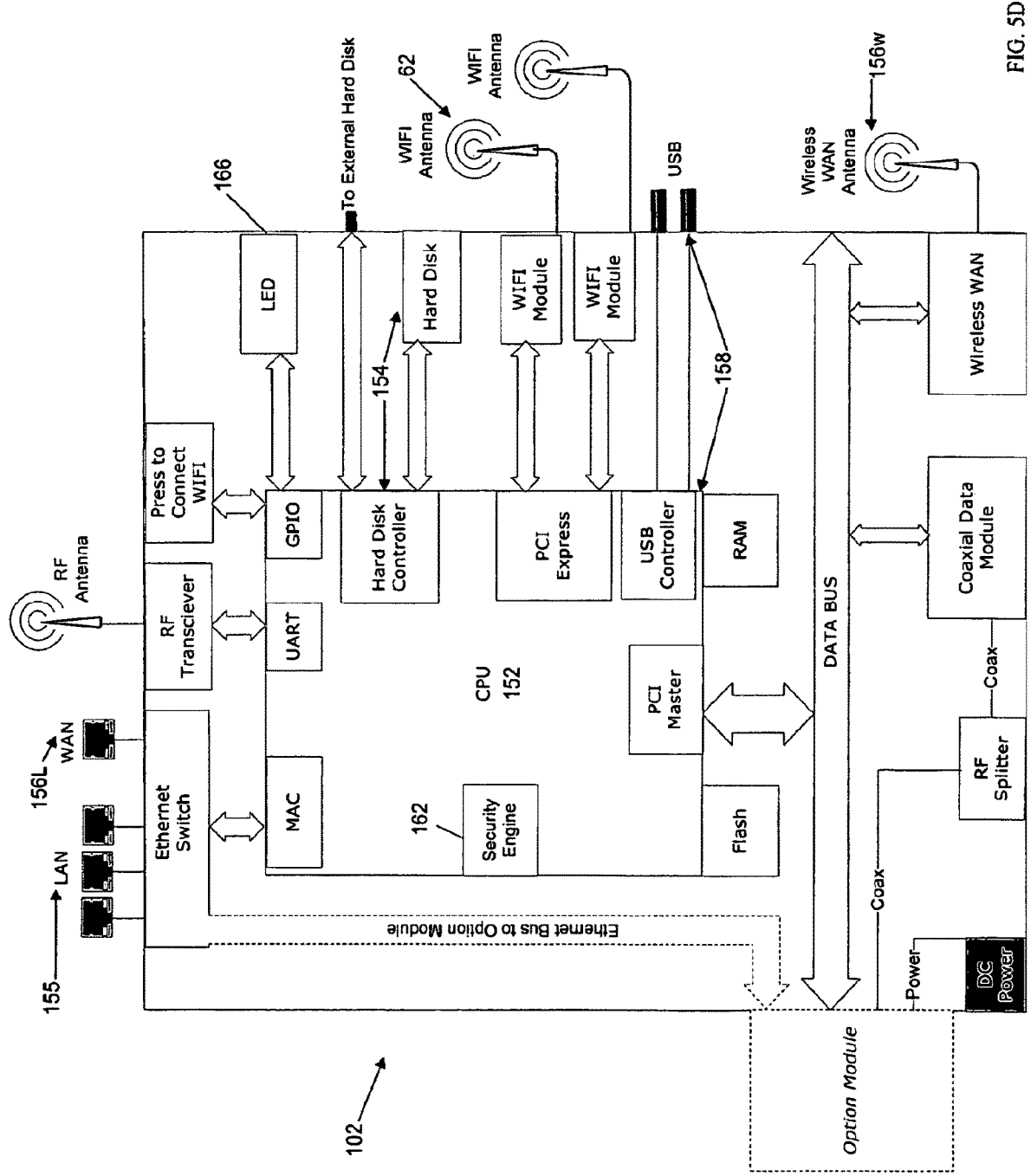

The composition of the premises gateway device 10, earlier described with reference to FIG. 3, is now described in greater detail with reference to FIGS. 5A-5D. As shown in FIG. 5A, the gateway device 10 utilizes a layered architecture 100, which enables the encapsulation of similar functionality and the minimization of dependencies between functions in different layers. FIGS. 5B and 5C depict exemplary functionality (hardware and logical) resident in, or corresponding to, each of the layers shown in FIG. 5A. The layers include a hardware layer 102, and device driver software 104 for allowing the processor to operate other hardware elements of the gateway device 10. FIG. 5D is a functional block diagram illustrating interconnection of exemplary elements of the hardware layer 102. The logical elements of the NI Layer residing on the gateway device 10 (FIG. 4) are found in the Hardware Drivers 104 which govern the operation of the Hardware Components 102. The processor runs an operating system shown at layer 106, which plays a role in each of the NI, NF, AS and Platform Management Layers (FIG. 1). The layered architecture 100 also includes software for systems services 108 and for the platform management layer shown at 110 in this drawing. Logical elements represented by the NF Layer depicted in FIG. 1 are comprised of elements from the system services 108 of FIG. 4. In a similar fashion, the Platform Management Layer depicted in FIG. 1 is implemented in the exemplary architecture of FIGS. 5A-5D by the platform modules 109 and the platform management layer 110.

Particular logical elements comprising the ASL and ASE functionalities of the AS Layer represented in FIG. 1, and that reside on the gateway device 10 (predominately in the Application Service Provider Managed Applications and Platform of the UNA-DA shown in FIG. 3) are depicted in FIG. 5C, and comprise logical elements from each of services framework 120 and application services 130. The layered architecture in FIG. 5C facilitates reuse or sharing of logic across the layers to provide a managed service framework 120. The service management functionality provided by the framework 120 enables deployment of new services as pluggable modules comprising computer readable instructions, data structures, program modules, objects, and other configuration data, in a plug and play fashion. The layered service architecture 100 additionally provides the gateway device 10 with intra-process communication and inter-process communication amongst the many services and modules in the service framework layer 120 that enables the provisioning, management and execution of many applications and services 130, depicted e.g. services A, B . . . N at the gateway device 10. Additionally provided are the application service interfaces 140 that enable communications from user endpoint devices with service environments. In that regard, the interfaces 140 enable the application service logic 130 to act as an appropriate server with respect to client device application or service functionality of the endpoint devices. The application service interfaces 140 also enable corresponding interfaces for the application services with aspects of service environments implemented outside the user premises. In that regard, the interfaces 140 enable the application service logic 130 to act as an appropriate client, for extending the application or service related communications to a server accessed via the wide area network 99, such as a server of the service management center 50. For example, the gateway device may appear as a SIP server to a SIP client in an end point device, e.g. for a VoIP telephone service; but the gateway device will appear as a SIP client with respect to some related functions provided by a server (such as a SIP directory server) provided by the service management center 50.

FIG. 5A thus depicts a high level service framework upon which are built services, e.g. downloaded via the service management center network 50 and wide area network 99 as packages that are developed and offered by a service entity for customers. These services may be offered as a part of a default service package provisioned and configured at the gateway device 10, or provisioned and configured subject to user subscription and may be added at any time as plug-in service modules in cooperation with the service management center 50. It is understood however, that while the gateway device 10 includes much of the intelligence or service logic for providing various services, it is also possible that for some services, some or all of service logic may reside in the service management center network and/or with a third party provider.

As shown in more detail in FIGS. 5B and 5D, the base support layer 102 comprises hardware components including a processor device 152, e.g. a system on chip central processing unit ("CPU") that includes processing elements, digital signal processor resources and memory. The CPU 152 is also coupled to a random access memory ("RAM") and additionally, non-volatile hard drive/disk magnetic and/or optical disk memory storage 154. Generally, the above-identified computer readable media provide non-volatile storage of computer readable instructions, data structures, program modules, objects, service configuration data and other data for use by the gateway device. The non-volatile hard drive/disk magnetic and/or optical disk memory storage 154 may be partitioned into a network side which is the repository for storing all of the service logic and data associated with executing services subscribed to by the user, and, is invisible to the user, and, a user side for storing user generated content and applications in which the user has visibility. Although not shown, the CPU 152 may be coupled to a microcontroller for controlling a display device.

Additional hardware components include one or more Ethernet LAN and WAN interface cards 155, 156 (e.g. 802.11, T1, T3, 56 kb, X.25, DSL or xDSL) which may include broadband connections (e.g. ISDN, Frame Relay, ATM, Gigabit Ethernet, Ethernet over SONET, etc.), wireless connections, or some combination of any or all of the above. The card 155 referred to as the LAN interface card provides data communication connectivity within the user premises, essentially, for communication via a user premises network 60 with any endpoint devices operating within the premises. The card 156 referred to as the WAN interface card provides data communication connectivity for the gateway device 10 and endpoint devices communicating through the device 10, with the wide area IP network 99. For additional or alternative customer premises communications, the hardware components 102 may also include one or more USB interfaces 158; and for additional or alternative communications with the wide area network, the hardware components may also include the PCMCIA EvDO interface card 160.

A data encryption/decryption unit 162 is additionally provided as part of the architecture for providing data security features. A watchdog timer element or like timer reset element 164 is provided as is one or more LED devices 166 for indicating status and other usable information to users of the gateway device 10.

As mentioned above, the gateway device provides an in-premises footprint enabling the service connectivity and local management to client(s). The implementation of functions and the related control such as a router (with quality of service (QoS)), firewall, VoIP gateway, voice services and voice mail may be embodied and performed within the CPU 152.

The discussion of the gateway hardware layer above and the illustration thereof in the drawings provides a high-level functional disclosure of an example of the hardware that may be used in the gateway device. Those skilled in the art will recognize that the gateway device may utilize other hardware platforms or configurations.

Continuing, as shown in FIG. 5B, the device driver layer 104 comprises a multitude of driver interfaces including but not limited to: a PCMCIA driver 104*a,* for enabling low level communication between the gateway CPU 152 and the PCMCIA network interface card wireless interface, an IDE driver 104*b* for enabling low level communication between the gateway CPU 152 and the local mass memory storage element, and LAN/WAN drivers 104*c* for enabling low level communication between the gateway CPU 152 and the respective network interface cards 155 and 156. The exemplary driver layer also includes an LED driver/controller 104*d* for driving LED(s) 166, a USB driver 104*e* allowing CPU 152 to communicate via USB interface 158, and an 802.11 b/g (or n) wireless network driver 104*f* for allowing the CPU 152 to communicate via the access point 62. The drivers provide the logical connectivity between the low level hardware devices 102 and the operating system 106 which controls the execution of computer programs and provides scheduling, input-output control, file and data management, memory management, and communication control and related services for the gateway device. With respect to the operating system 106, the gateway computing may support any embedded operating system, any real-time operating system, any open source operating system, any proprietary operating system, or even any operating systems for mobile computing devices as long as the operational needs of the client discussed herein below can be met. Exemplary operating systems that may be employed include Windows®, Macintosh®, Linux or UNIX or even an embedded Linux operating system. For instance, the gateway device 10 may be advantageously provided with an embedded operating system 106 that provides operating system functions such as multiple threads, first-in first-out or round robin scheduling, semaphores, mutexes, condition variables, message queues, etc.

Built upon the system operating system 106 is a system services support layer 108 providing both client-like and server-like functions that enable a wide range of functionality for the types of services capable of being managed by the gateway device 10. For instance, there is provided a Dynamic Host Configuration Protocol (DHCP) client and server software modules. The DHCP client particularly requests via a UDP/IP (User Datagram Protocol/Internet Protocol (e.g. Ipv4, Ipv6, etc.) configured connection information such as the IP address that the gateway device 10 has been dynamically assigned by a DHCP service (not shown), and/or any the subnet mask information, the gateway device should be using. The DHCP server dynamically assigns or allocates network IP addresses to subordinate client endpoints on a leased, e.g. timed basis. A Virtual Private Network (VPN) client may communicate via a proxy server in the service control network 50, according to a VPN protocol or some other tunneling or encapsulation protocol. An SMPT client handles incoming/outgoing email over TCP, in accordance with the Simple Mail Transfer protocol. A Network Time Protocol (NTP) (RFC 1305) generates and correlates timestamps for network events and generally provides time synchronization and distribution for the Internet. A Domain Name Server (DNS) client and server combination are used by the IP stack to resolve fully-qualified host or symbolic names, i.e. mapping host names to IP addresses.

An HTTP(S) server handles secure Hypertext Transfer Protocol (HTTP) (Secure Sockets Layer) communications and provides a set of rules for exchanges between a browser client and a server over TCP. It provides for the transfer of information such as hypertext and hypermedia, and for the recognition of file types. HTTP provides stateless transactions between the client and server.

A Secure File Transfer Protocol (SFTP) client and server combination govern the ability for file transfer over TCP. A SAMBA server is an open source program providing Common Internet Files Services (CIFS) including, but not limited to file and print services, authentication and authorization, name resolution, and service announcement (browsing). An EvDO/PPP driver includes a Point-to-Point Protocol (PPP) daemon configuration for wireless broadband services. A PPPoE (Point-to-Point Protocol over Ethernet) client combines the Point-to-Point Protocol (PPP), commonly used in dialup connections, with the Ethernet protocol; and it supports and provides authentication and management of multiple broadband subscribers in a local area network without any special support required from either the telephone company or an Internet service provider (ISP). The gateway device 10 is thus adapted for connecting multiple computer users on an Ethernet local area network to a remote site through the gateway and can be used to enable all users of an office or home to share a common Digital Subscriber Line (DSL), cable modem, or wireless connection to the Internet. A Secure Shell or SSH server implemented with HTTP protocol provides network protocol functionality adapted for establishing a secure channel between a local and a remote computer and encrypts traffic between secure devices by using public-key cryptography to authenticate the remote computer and (optionally) to allow the remote computer to authenticate the user.

Additionally provided as part of the system services layer 108 is intelligent routing capability provided by an intelligent router device 185 that provides Quality of Service (QoS, guaranteed bandwidth) intelligent routing services, for example, by enforcing routing protocol rules and supporting unlimited multiple input sources and unlimited multiple destinations and, particularly, for routing communications to networked digital endpoint devices subordinate to the gateway. A central database server 183 handles all of the database aspects of the system. For example, the database server 183 maintains and updates registries and status of connected digital endpoint devices, maintains and updates service configuration data, services specific data (e.g. indexes of backed-up files, other service specific indexes, metadata related to media services, etc.) and firmware configurations for the devices. The database server 183 may also store billing and transaction detail records and performance diagnostics. The database server logic 183 also satisfies all other database storage needs as will be described in greater detail herein.

Referring back to FIGS. 5A and 5B, built on top of the system services layer 108 is the platform module layer 109. The platform module layer 109 provides a software framework for operating system and communications level platform functionality such as CPU management; Timer management; memory management functions; a firewall; a web wall for providing seamless WWW access over visual displays via access technologies enumerated herein, e.g. HTTP, SMS (Short Messaging Service) and WAP (Wireless Access Protocol); QoS management features, bandwidth management features, and, hard disk drive management features. The layered architecture 100 further provides a platform management layer 110 as shown in FIG. 5C, which together with the platform modules 109 implement the platform management layer/logic discussed earlier (with regard to FIG. 1).

The features/functions in the layer 110 include a platform manager module which will implement unique rules based notification services. On operational failure, for example, when one of the components or services fails, the platform manager would detect this failure and take appropriate action such as implement a sequence of rules to provide notification to a user. A scheduler module manages scheduled device maintenance, managing scheduled services, e.g. back-up services, etc. The layer 110 also includes a diagnostics module and a firmware upgrades management module for managing firmware upgrades. A resource management module manages system resources and digital contention amongst the various resources, e.g. CPU/Bandwidth utilization, etc. A display management module and a logger management module store and track gateway log-in activity of users and applications, e.g. voice call logs, at the user premises. The platform management layer 110 in concert with resource and service management components enforces the separation of network side managed service control and user side delegations depending upon service subscriptions and configurations. For example, the platform and resource management encompass rules and guidelines provided according to subscribed services that act to enforce, manage and control input/output operations, and use of hard drives space etc. A demarcation point, logically depicted as the Application Service Provider Demarcation in FIG. 3, is thus defined that provides a hard line between what is owned by the customer and what is owned by the service provider.

The logical platform management layer 110 allows for inter-layer allocation of local resources. This function guarantees access between the application service/management logic implemented at the higher layers in the gateway device 10 and the applications service management function in the service management center 50, by assuring that the local user premises hardware and software modules are functioning at a required state (CPU and memory usage, bandwidth usage, QoS settings, etc.). The platform manager is also responsible for implementing that part of the managed application services to be performed by the gateway device. In that regard, the platform manager secures and manages the overall hardware platform, given that in this scenario, the network function layer and the application service layer reside on one hardware platform. This secure hardware platform provides a robust and secure operating environment for the application services layer. So, to establish a secure and robust hardware operating environment, the platform management layer must interface with all the layers above it and allow for bi-directional management information flow among all of the functions.

Referring back to FIGS. 5A and 5C, built on top of the platform management layer 110 is the Services Framework 120, which provides a library of application support service processes that facilitate data collection and data distribution to and from the multimedia endpoint devices. The application support service processes include, but are not limited to: an authentication manager for use in authenticating devices connected to the gateway device; a billing manager for collecting and formatting service records and service usage by endpoint devices, e.g. calls, back-up services etc.; a fault manager for detecting and managing determined system and/or service faults that are monitored and used for performance monitoring and diagnostics; a database manager; a control channel interface via which the gateway initiates secure communications with the operations support infrastructure; a configuration manager for tracking and maintaining device configuration; a user manager; a service manager for managing service configuration and firmware versions for subscribed services provided at the gateway device; and a statistics manager for collecting and formatting features associated with the gateway device. Statistics may relate to use of one or more services and associated time-stamped events that are tracked.

Built on top of the Services Framework layer 120 is the Application Services layer 130 providing library of user application services and application support threads including, but not limited to: file sharing functionality; backup services functionality; home storage functionality; network device management functionality; photo editing functionality; home automation functionality; media services functionality; call processing functionality; voice mail and interactive voice response functionality; presence and networking functionality; parental control functionality; and intelligent ads management functionality. The multi-services applications gateway 10 further provides application service interfaces 140 that are used to enable a variety of user applications and communications modalities.

For instance, the SIP Interface 141 is an interface to the generic transactional model defined by the Session Initiation Protocol (SIP) that provides a standard for initiating, modifying or terminating interactive user sessions that involve one or more multimedia elements that can include voice, video, instant messaging, online games, etc., by providing access to dialog functionality from the transaction interface. For instance a SIP signaling interface enables connection to a SIP network that is served by a SIP directory server via a Session Border Controller element in the service management center 50 (FIG. 4).

The Web Interface 142 enables HTTP interactions (requests and responses) between two applications. The Web services interface 149 provides the access interface and manages authentication as multi-services gateway devices access the service management center 50 (FIG. 4) via web services. The IM Interface 144 is a client that enables the multi-services gateway device 10 to connect to one or more specific IM network(s). As further shown in FIG. 5C, the UpNp (Universal Plug and Play) interface enables connectivity to other stand-alone devices and PCs from many different vendors.

The XMPP interface 145 is provided to implement the protocol for streaming (XML) elements via the gateway device 10, in order to exchange messages and presence information in close to real time, e.g. between two gateway devices. The core features of XMPP provide the building blocks for many types of near-real-time applications, which may be layered as application services on top of the base TCP/IP transport protocol layers by sending application-specific data qualified by particular XML namespaces. In the example, the XMPP interface 145 provides the basic functionality expected of an instant messaging (IM) and presence application that enable users to perform the following functions including, but not limited to: 1) Exchange messages with other users; 2) Exchange presence information with other devices; 3) Manage subscriptions to and from other users; 4) Manage items in a contact list (in XMPP this is called a "roster"); and 5) Block communications to or from specific other users by assigning and enforcing privileges to communicate and send or share content amongst users (buddies) and other devices.

As noted, FIG. 5D provides a functional block diagram of exemplary elements of the hardware layer 102. For example, a system on a chip provides the CPU 152 and associated system components. The CPU 152 is also coupled to a random access memory ("RAM") and flash memory. The system on a chip also includes a hard drive controller for controlling a hard disk drive, and together the controller and drive form the hard disk example of the storage 154. An Ethernet switch and associated LAN port(s) provide the Ethernet LAN interface 155; and the Ethernet switch and associated WAN port provide a landline implementation of the WAN interface 156L, for connection to a broadband modem or the like implementing the NSP-TA. The WAN interface may also be wireless, as implemented at 156w for example by a wireless WAN module and associated antenna. An example of such an interface would be the EvDO interface discussed earlier. If the gateway device uses the wireless WAN interface 156w, there would be no separate NSP-TA.

In the example of FIG. 5D, a USB controller in the system on a chip and one or more associated USB ports provide the USB interface 158. The USB interface 158 may provide an alternate in-premises data communication link instead of or in addition to the wired or wireless Ethernet LAN communications. The system on a chip includes a security engine, which performs the functions of the data encryption/decryption unit 162.

The hardware layer 102 may also include an option module. The UNA-DA hardware components at layer 102 have multiple interfaces for connection to such an option module. These interfaces, by way of example, could be a data bus (e.g. PCI, etc), network interface (e.g. Ethernet (RJ45), MoCA/HPNA (Coax)) and Power feeds. The option module allows additional functionality to be added to the base UNA-DA functionality of the gateway device. For example, this additional functionality could be everything from support for a variety of extra Wide Area Network Interfaces (e.g. xDSL, DOCSIS, Fiber (PON), Cellular Packet, WIMAX, etc.), Media Processing (e.g. Cable TV termination, Digital Video Recording, Satellite TV Termination, etc), to Voice Processing (FXS, FXO, Speech Detection, Voice to Text, etc). The option module may have its own standalone CPU, Memory, I/O, Storage, or provide additional functionality by its use of the CPU, Memory, I/O, and storage facilities off of the main hardware board. The option module may or may not be managed directly by the Platform Management of the UNA-DA.

Gateway Processing

For the in-home services, the multi-services gateway device 10 connects the various service delivery elements together for enabling the user to experience a connected digital home, where information from one source (for example, voicemail) can be viewed and acted on at another endpoint (for example, the TV 32). The multi-services gateway device 10 thus hosts the various in-home device interfaces, and facilitates the moving of information from one point to another. Some of the in-home endpoint device processing duties performed by the gateway device 10 include, but are not limited to: 1) detecting new devices and provide IP addresses dynamically or statically; 2) functioning as a (Network Address Translator) NAT, Router and Firewall; 3providing a centralized disk storage in the home; 4) obtaining configuration files from the service management center and configuring all in-home devices; 5) acting as a Registrar for SIP-based devices; 6) receiving calls from and delivering calls to voice devices; providing voicemail services; 7) decrypting and securely streaming media having digital rights management (DRM) encoding; 8) distributing media to an appropriate in-home device; 9) compressing and encrypting files for network back-up; 10) backing-up files to the network directly from gateway device; 11) handling home automation schedules and changes in status; 12) providing in-home personal web-based portals for each user; 13) providing Parental Control Services (e.g. URL filtering, etc.); 14) creating and transmitting billing records of in-home devices including, recording and uploading multi-service billing event records; 15) distributing a PC client to PCs in the home, used in support of the various services such as monitoring events or diagnostic agents; 16) storing and presenting games that users and buddies can play; 17) delivering context-sensitive advertising to the endpoint device; and, 18) delivering notifications to the endpoint device; and, 19) enabling remote access through the web, IM client, etc. Other duties the gateway device 10 may perform include: service maintenance features such as setting and reporting of alarms and statistics for aggregation; perform accessibility testing; notify a registration server (and Location server) of the ports it is "listening" on; utilize IM or like peer and presence communications protocol information for call processing and file sharing services; receive provisioning information via the registration server; utilize a SIP directory server to make/receive calls via the SBC network element to/from the PSTN and other gateway device devices; and download DRM and non-DRM based content and facilitating the DRM key exchanges with media endpoints.

Logical Architecture and Service Management Center Network

While the gateway devices 10 as described above are each equipped with various logic and intelligence for service features that enable the gateway devices to provide various integrated digital services to the premises, as described herein with respect to FIG. 4, the network-based elements of the service management center 50 supports and manages multi-services gateway devices, for instance, so as to control the accessibility to functionalities and service features provisioned in the gateway devices and the ability to communicate with other gateway devices and various digital endpoint devices connected thereto. These elements that support and manage the gateway devices 10 comprise the ASM module described above with reference to FIG. 1. These ASM elements may, for example, provide the necessary data to the ASE and ASL modules so that they may carry out their respective functions, oversee the overall integration and communication among all the modules and the services that are managed by the ASM, manages the overall security and integrity of the ASD, and maintains alarm, statistical, subscription and provisioning data, and data necessary for the integration of services from third-party service providers, e.g., media content aggregators.

Examples of various ASM functionalities performed at the service management center 50, from the Service Provider Network regime, include but are not limited to: service initialization of the gateway devices, providing security for the gateway devices and the network support infrastructure, enabling real time secure access and control to and from the gateway devices, distributing updates and new service options to the gateway devices, providing service access to and from the gateway devices and remote access to the gateway devices, but not limited to such. In support of these services, the service management center 50 provides the following additional services and features: authentication; multi-service registration; subscription control; service authorization; alarm management; remote diagnostic support; billing collection and management; web services access; remote access to gateway devices (e.g. via SIP or Internet/web based communications); reachability to access challenged gateway devices; software updates; service data distribution; location service for all services; SIP VoIP service; media services; backup services; sharing services; provisioning; gateway interfaces to other service providers (Northbound and peering); load balancing; privacy; security; and network protection.

Figure 6:
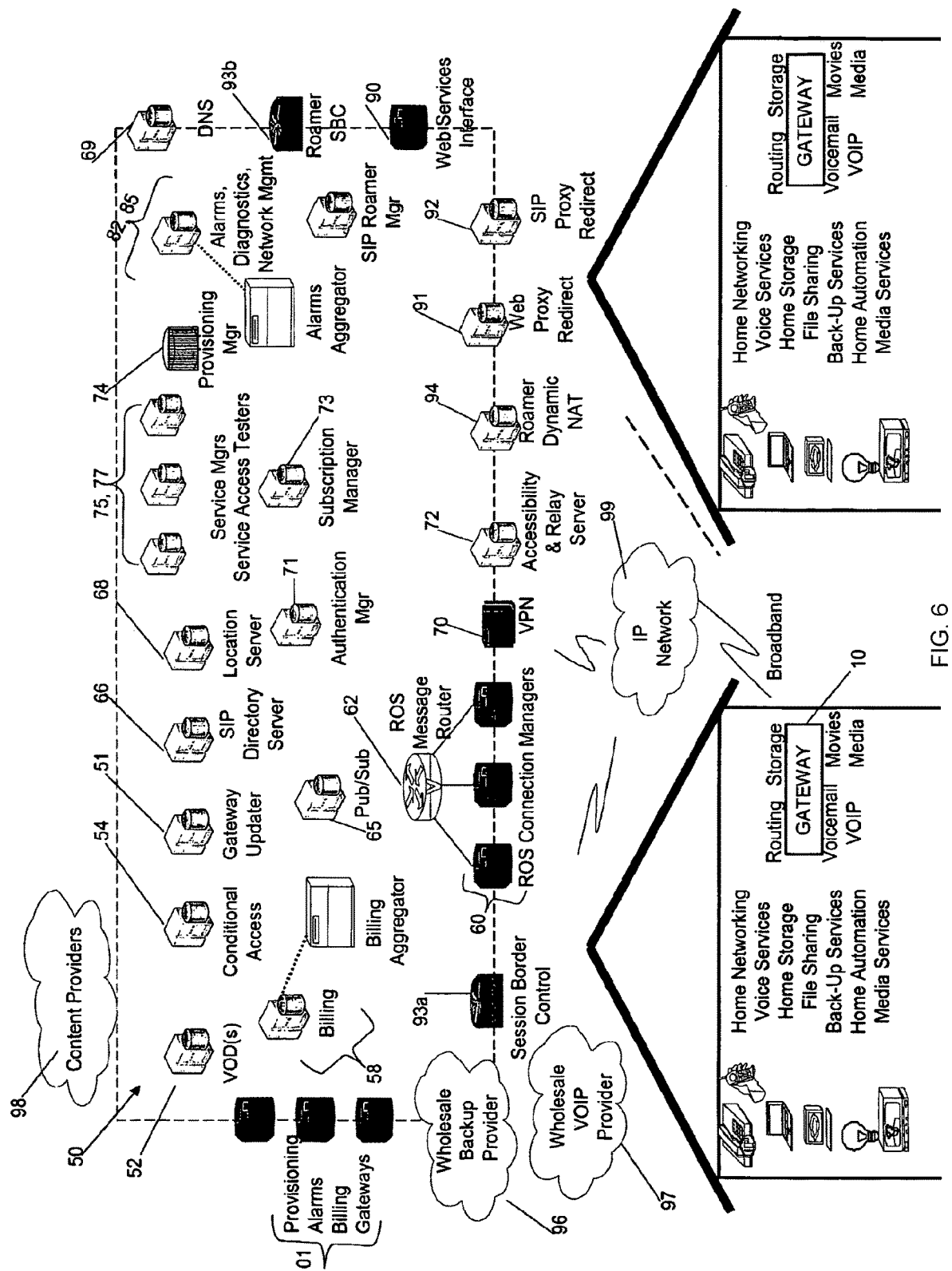
FIG. 6 depicts the networked operations services support infrastructure of a network implementation of the service management center, for delivering service capabilities to the multi-services applications gateway device of FIG. 4.

The logical network architecture for the service management center network delivering these capabilities is illustrated in FIG. 6. It should be understood that the functional components described in view of FIG. 6 may be combined and need not be running on discrete platforms or servers. Rather one server or component may provide all the service management center functionalities for providing managed network of gateway devices 10. In addition, any one of the components shown in FIG. 6 may perform any one of the functionalities described herein. Thus, the description in the present disclosure associating certain functions with certain components are provided for ease of explanation only; and the description is not meant to limit the functionalities as being performed by those components only. Thus, the network elements or components shown in FIG. 6 illustrate logical architecture only, and the present teachings do not require the specific components shown to perform specific functionalities described. Moreover, the functional components may use distributed processing to achieve a high availability and redundancy capacity.

The one or more network elements of center 50 illustrated in FIG. 6 support the gateway devices 10 that are services points of presence in the user premises such as users' homes, and the various endpoint devices connected thereto. Examples of functionalities provided in the service management center network 50 are discussed below. Upgrades to gateway device firmware and various endpoint devices may be managed in the service management center network 50, for example, by a firmware updater server 51. VOD (video on demand) functionalities, for example, serviced by VOD servers (VODs) 52, ingest wholesale multi-media content and provide DRM-based premium content to the multi-services gateway device and endpoint devices. The service management center network 50 also may enforce DRM (Digital Rights Management) policies, for example, by a conditional access (CA) server 54, which provides key-based access and initiating billing processes. The service management center network 50 may also provide functionalities such as collecting billing information and processing billing events, which for instance may be handled by billing aggregator sub-system 58. The service management center network 50, for example, using one or more connection manager servers 60, may establish and maintain a signaling control channel with each active multi-service gateway device 10. For message routing functionality of the service management center network 50, for example, one or more message router devices 62, may provide intelligent message routing service for the network 50 and maintain gateway device presence and registration status in an internal session manager sub-system of the service management center 50. Publish and subscribe functionality of the service management center network 50, for example, a Publish/Subscribe (Pub/Sub) server sub-system 65, may provide publish and subscribe messaging services for the multi-services gateway devices 10 and the elements of the service management center network 50.

The service management center network 50 may provide SIP-based directory services for voice and other multimedia services, for example, via its SIP Directory Server 66. In addition, location service functionality, for example, provided by the Location Server 68, may include IP and Port level services for all inbound services. As discussed more later, the location server 68 maintains information as to accessibility of authenticated gateway devices 10, for enabling peer to peer communications among gateway devices 10 via the wide area IP network 99. DNS services functionality may be provided by a DNS server 69 for all inbound services.

The service management center network 50 may also provide virtual private network (VPN) functionalities, for example, handled by its VPN server/subsystem 70, and provide VPN connection services for certain inbound services on multi-services gateway devices 10. VPN connection services may be provided on those multi-services gateway devices that have accessibility challenges, for example, those that are behind external firewalls and NATs. The service management center network 50 may also include functionality for determining the nature of the accessibility configuration for the multi-services gateway devices 10. In one embodiment accessibility service may be performed by an accessibility test server 72 that functions in cooperation with the multi-services gateway device 10 to determine the nature of the accessibility. For example, the accessibility test determines whether the gateway devices are behind a firewall, whether NATs is required, etc.

The service management center network 50 also functions to provide provisioning services to all elements of service management center network 50 and to multi-services gateway devices 10. Such functionality of the network 50, for example, may be implemented by the provisioning server 74 in one embodiment.

Authentication functionality of the service management center network 50, for example, provided by an authentication manager 71, provides authentication services to all service management center network elements and to multi-services gateway devices 10. As discussed more later, upon successful authentication of a gateway device 10, the authentication manager 71 controls the connection manager 60 to establish a signaling communication link through the wide area IP network 99 with the authenticated gateway device 10. The authentication manager 71 confirms authentication of the respective gateway device 10 from time to time, and the authentication manager 71 controls the connection manager 60 to maintain a session for the signaling communication link through the wide area IP network 99 with the respective gateway device 10 as long as the authentication manager 71 continues to confirm the authentication of the respective gateway device. The signaling connection may be torn-down, when the device 10 no longer passes authentication, either because it becomes inaccessible to the authentication manager 71 or its service status changes.

The gateway devices 10 and service manager center 50 implement several methodologies that allow the service provider to manage various subscription application services provided for endpoint devices associated with the gateway devices 10. In general, one subscription management methodology involves sending information indicating configuration data or software currently needed for the one gateway device to implement server functionality for an application service or a feature of an application service, based on a service subscription of a customer associated with that gateway device. Several different ways of sending this information are discussed by way of example below. A request from a particular gateway device 10 is received in the service management center 50, indicating that the device 10 needs the configuration data or software to implement the application service or feature thereof. In response, the service management center 50 sends the necessary configuration data or software through the wide area network 99 to the gateway device 10. The gateway device 10 can install the configuration data or software, to enable that device 10 to deliver the server functionality for the application service or the feature to its associated one or more endpoint device(s) that implement the client functions regarding the particular application service.

Subscription functionality of the service management center network 50, for example, provided by a subscription manager 73, is one mechanism used to provide management of subscription services to all multi-services gateway devices 10. The subscription manager 73 manages applications services and/or features of the server functionality of the gateway device 10, to be enabled on each respective authenticated gateway device, based on a service subscription associated with the respective device 10.

The service management center network 50 may include functionality for providing management services for each of the services provided in the gateway device 10. For example, respective service managers 75 store and serve to distribute service specific configuration data to the multi-services gateway devices 10, typically via the signaling communication links established through the wide area IP network 10 upon successful device authentication. The configuration data downloads by the service managers 75 are based on the service subscription of the user or premises associated with the particular gateway device 10, that is to say, as indicated by the subscription manager 73.

The service management center network 50 also includes elements to provide necessary software to the gateway devices 10 through the wide area network, as needed to implement customers' subscription services. In the example, the service management center network 50 includes an updater 51 for transmitting software to the gateway devices. The software resident in the gateway device is sometimes referred to as firmware. Software can be distributed upon request from an individual gateway device 10 or as part of a publication procedure to distribute upgrades to any number of the gateway devices. For this approach, the publication/subscription (Pub/Sub) server or like functionality 65 provides notifications of available software updates. For example, upon detecting an update regarding an application service, gateway devices 10 subscribing to an update notification service with regard to the relevant application service are identified. The Pub/Sub server 65 sends notification messages through the wide area network 99 to the identified gateway devices 10. Assuming that a notified gateway device does not yet have the software update installed as part of its resident firmware, it sends a request indicating that the gateway device needs the available update. In response to the received request, the updater 51 sends the update of the software through the wide area network 99 to the one gateway device 10. The update enables the gateway device 10 to deliver the subscription application service or feature thereof, based on the updated software, to one or more endpoint devices implementing client functions related to the subscription application service.

Service access test functionality of the service management center network 50 performs tests to multi-services gateway devices to verify the accessibility for each subscribed service. Such functionality may be provided by service access test managers 77. The service management center network 50, for example, in an alarm aggregator subsystem 82 may aggregate alarms received from the multi-services gateway devices. The service management center network 50 also may include functionalities to support, for instance, by alarms, diagnostics and network management (NWM) server 85, network management and network management services. The service management center network 50 enables web interface communication mechanism, for example, via a web services interface server 90, to for example provide access interface and manage authentication as multi-services gateway devices access the service management center for various services, including access to configuration data in the service managers 75.

Additional service management center network functionalities shown in FIG. 6 may include providing HTTP redirection services for public web access to the multi-services gateway devices, which function, for example, may be provided via a public web redirect server 91. Public SIP Redirect/Proxy functionality provides, for instance, via a Public SIP Redirect/Proxy server 92, SIP redirection and proxy services to public remote SIP phones and devices. The service management center network 50 also may include functionalities to provide a SIP-based network border interface and billing services for off-net voice calls. Such functionality in one embodiment may be provided in a Session Border Controller device 93*a*. Another functionality of the service management center network 50 may be providing Session Border Control services to SIP roaming SIP callers in certain situations, which functionality for example may be provided by a Roaming Session Border Controller device 93*b*. The service management center network 50 also functions to provide dynamic NAT services during certain SIP roaming scenarios. Such functionality may be implemented in the Roamer Dynamic NAT Server 94.

The service management center network 50 further may provide off-site backup services for the service management center network to a Wholesale Back-up Provider 96. The service management center network 50 further interoperates with Wholesale VoIP Provider 97, which may provide VoIP call origination/termination services for off-net voice calls. For instance, the service management center network 50 may provide VoIP/PSTN gateway that enables a translation between protocols inherent to the Internet (e.g. voice over Internet protocol) and protocols inherent to the PSTN. Other entities that may be partnered with the service management center network 50 as shown in FIG. 6 include the content providers 98 that provide media-based content (including, but not limited to music, video, and gaming) to the service management center network 50, gateway interfaces 101 for billing, alarms/diagnostic network management (NWM), and provisioning interfaces for partnered wholesale providers (e.g. peering interfaces) and service provider customers (e.g. North bound interfaces).

In the illustrated example, a server or servers of the service management center network 50 are intended to represent a general class of data processing device commonly used to run "server" programming. Such a device typically utilizes general purpose computer hardware to perform its respective server processing functions and to control the attendant communications via the network(s). Each such server, for example, includes a data communication interface for packet data communication. The server hardware also includes a central processing unit (CPU), in the form of one or more processors, for executing program instructions. The server platform typically includes program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith.

In one embodiment, the connection manager 60 may aggregate a plurality of connection channels 150 and multiplex these signaling channels to the message router device 62. The connection manager 60 works with the message router 62 and the authentication manager 71 to authenticate the multi-services gateway device 10 and allow its access to the network 50 by enabling the establishment of a control channel 150 providing an "always on" control channel between the multi-services gateway device and the services service management center 50 once the gateway device is authenticated. The connection managers 60 also provide network security and protection services, e.g. for preventing flooding, denial of service (DOS) attacks, etc. In one embodiment, there may be interfaces such as APIs for interfacing the connection managers 60 or the like to the message routers 62 and the multi-services gateway devices 10. As the network of multi-services gateway devices grow, the number of connection managers 60 may grow to meet the demand for concurrent signaling control channel connections.

In one embodiment, a message router device(s) 62 provides control signal message routing services and session management services to the multi-services gateway device 10 and the other network elements of the service management center 50. In one embodiment, the message router device 62 has control channel signaling access, via the control channel to the firmware upgrade manager server or gateway firmware updater 51, VOD server(s) 52, a billing system 58, content managers 98, pub/subs 65, service accessibility test manager 77, authentication manager 71, service manager 75, subscription manager 73, alarms aggregator 82, network management (NWM) server 85 and public web proxy redirect 91, and the multi-services gateway devices 10. The message router 62 may also include a session manager subsystem that maintains control channel state information about every multi-services gateway device client in the gateway-service center network. The message router 62, and session manager enable sessions to be established to each multi-services gateway device 10 and each element of the service management center 50 and provide robust routing services between all the components. The message routers 62 may additionally connect to other message routers for geographic based scaling, creating a single domain-based control channel routing infrastructure. The message routers 62 may additionally connect to IM gateways and other message routers that provide user based IM services, which may enable users to interact directly with their multi-services gateway device via IM user clients. Thus, besides providing routing and session management for all the multi-services gateway devices and the network elements, the message router element 62 enables control signaling between all the network elements and the multi-services gateway devices and, connects to IM gateways to provide connectivity to other IM federations.

Web Services Interface

In an example, the service management center network 50 may also provide web services interface functionality (for example, shown at 90 in FIG. 6) that forms an application programming interface (API) between the gateway devices 10 and the service management center network 50 as a mechanism to communicate between the gateway devices and the service management center network. That is, in addition to the established signaling control channel, the gateway devices 10 and the service management center network 50 may utilize web services interface 90 to communicate. For instance, the gateway devices 10 and the service management center network 50 may exchange information via secure HTTP or HTTPS using SOAP, XML, WSDL, etc. or the like.

In one example, an authentication key is used or embedded in the message in order to validate the communication between one or more gateway devices 10 and the web services interface functionality 90 in the service management center network 50. In one embodiment, the gateway device 10 may request from the service management center network 50, for instance, from its authentication manager functionality 71, a temporary key, which is to be used when the gateway device 10 requests services via the web services interface 90. Preferably, this key is not a service specific key, but rather identifies a particular gateway device 10 to enter the service management center 50 through the web services interface 90. Every time the gateway device 10 requests a key, the authentication manager 71 functionality may store the key and the expiry time of the key. A response message provided from the authentication manager 71 has the key and expiry time. In one example, gateway devices 10 are responsible to determine a status of the key compared to the expiry and to request a new key before the expiry time. In another embodiment, the web services interface authentication key may be assigned during initial registration and may be renewable as described above with reference to dynamic renewable authentication and service keys.

The web services interface 90 subsequently directs message requests to the appropriate functionality in the service management center network 50. The incoming requests may be load balanced in one embodiment by the DNS server 69, and loading and performance information may be fed back to the DNS in support of this function. The web services interface 90 may have interfaces (e.g. APIs) to the gateway device 10, the authentication manager functionality 71 of the service management center network 50, DNS 69, the service managers 75 of the service management center network 50, etc.

In an exemplary embodiment, a gateway device 10 may utilize the web services interface to pull data, software or information from the service management center network 50, while the service management center network may utilize the signaling control channel to push data such as various notification data to the gateway devices. In an example discussed more below, the subscription manager 73 notifies the gateway device 10 of configuration data applicable to a service subscribed to by the customer associated with the particular gateway device. If the gateway device 10 determines that it needs the configuration data (not yet resident or not up-to-date), then the gateway device 10 sends a request to the web services interface 90, which is forwarded to the appropriate service manager 75. The service manager 75 in turn sends the configuration data to the gateway device 10 for loading and future use. A similar procedure can be used to download software, e.g. from a gateway updater or other firmware server based on a descriptor from the subscription manager or a published notification from a Pub/Sub server.

Automatic Discovery and Configuration of Endpoint Devices

In one embodiment, a customer or user self-provisions endpoint devices on a particular multi-services gateway device 10. The provisioning system or like functionality 74 may provision how many endpoints and the types of devices that can be self-provisioned by the user. In one embodiment, the gateway devices are capable of automatically discovering and configuring the gateway device compatible devices belonging to enabled services in the premises such as the home or business, for instance, with minimal human intervention (e.g. for security purposes some devices may need administrator level prompting to proceed with configuration actions). For instance, the gateway device compatible endpoint devices are devices that the gateway device can communicate with and thus become the center of management for the services offered through these endpoint devices. One or more of these endpoint devices may have automatic configuration capabilities such as universal plug and play (e.g. uPNP devices). These endpoint devices may include but are not limited to, media adaptors, SIP phones, home automation controllers, adaptors that convert IP interfaces to PSTN FXO and FXS interfaces, etc. In one example, the method of configuration, e.g. automatic discovery and configuration may be based on the specific device's current firmware or software or like version. The gateway device 10 in one embodiment also may keep a record or table of configuration information, for example, for those devices configured automatically. Such information may include, for example, for media adaptor, supported formats and bit rates, for home automation controller, information pertaining to the type of controller such as Insteon, Awave, etc.

As another example, if the phone service is enabled and if the gateway device detects a new SIP device, the gateway device 10 may prompt a user to determine if the detected endpoint device needs to be configured for association with the gateway device. If it does, then the gateway device 10 may configure the detected device on its network (home network or other premises network). Yet as another example, when new drives are added to the gateway device for storage expansion, the gateway device 10 may automate initialization of the expanded device storage.

Gateway to Gateway Device Communications

As mentioned earlier, the gateway devices and service management center support a communication capability between the appliances. This feature, for example, may be utilized for enabling secure peer-to-peer sharing of data between or among the gateway appliances.

Additional aspects of the peering capabilities enabled by the gateway device-service management architecture include the ability to store a roster or contact list of distant gateways on either the gateway 10 or within the service management center 50 and utilizing these addresses to maintain the presence and routing information of selected other gateways. This roster information is used to establish and manage access and message routing, via XMPP messaging, to gateways, to locate and address other gateways, and set up peering relationships between the gateways.

A gateway may also expose other details about resources or endpoints within the home to other gateways by communicating resource information along with presence information. As an example, a gateway may send presence information to selected "buddies" via the signaling channel and also include information about the resources available to the distant buddy. Examples of resources include digital picture frames that the distant gateway user may direct photos to, web cams, or other resources, enabling direct interaction between an end user connected to one gateway, or in automated scenarios, the gateway itself, and a distant device connected to the local area network of another gateway.

When a user interacts with the resource sharing functions of their gateway 10, the user may select a specific gateway $10_1$ from their roster, represented as a "buddy" list. When the user selects a "buddy", additional resource details are displayed to the user, providing information about any resources that the end user may utilize via that selected peer gateway device $10_1$.

The XMPP messaging protocol, combined with the roster and XMPP addressing mechanisms may be utilized for either end user interactions or automated interactions between gateways. Automated use of the peering capabilities include directing utility data for usage and network management information to designated collectors within peering groups and then having the designated collector forward the combined information to the service management center. This distributes the collection processing to the gateways and decreases the overall processing and bandwidth utilization in the service management center. Of course, the XMPP protocol is discussed here merely by way of example, and those skilled in the art will recognize that the gateway to gateway device communications may use other protocols.

Upon gateway device 10 establishing initial communication with selected remote gateways (e.g., gateway device $10_1$, $10_n$, etc as shown in FIG. 4) and devices via service management center 50, gateway device 10 may negotiate a direct signaling communication path with one or more remote gateway devices. The signaling path may be independent of service management center 50, IM networks 99a or 99b, or IM server 99c. Establishing a direct signaling channel between gateway devices may reduce the messaging load on service management center 50, IM networks 99a or 99b, or on IM server 99c.

An Application and Network Gateway (ANG) (e.g., gateway device 10, $10_1$, $10_n$, etc.) may be located, for example, in a user premises. The ANG may have associated endpoint devices, and be managed by an Application Services Provider (e.g., the application service may be delivered via the application services layer by application service management center 50, or may be IM networks 99a or 99b, or IM server 99c). An application network gateway management connection server (MCS) may be used to establish a connection with one or more ANGs, wherein the established connection may be secure or unsecure. The MCS may be a component of application service management center 50, IM networks 99a or 99b, or IM server 99c. This connection between the MCS and the ANGs allows each ANG to "register" its local information (e.g., Internet Protocol (IP) address, Application Ports, Availability, and other attributes) with the MCS. Additionally, when ANGs desire to locate each other (e.g., to establish peer to peer connections for communication), they may retrieve the distant-end ANG information from the MCS.

Location updates may be performed at ANG Startup, or when IP or Port changes occur at the AGN. There may be no predefined time of the validity of the addresses. For example, the last update may be considered valid for an indefinite period of time. Thus, in this example, the AGN does not need to update location information on a periodic basis.

A Location Server may maintain the location information for all the ANGs in the network. A Session Redirect Server (SRS) and SRS database may store service-specific authentication and routing information. The SRS and SRS database may be part of the Applications Services Provider.

Figure 7:
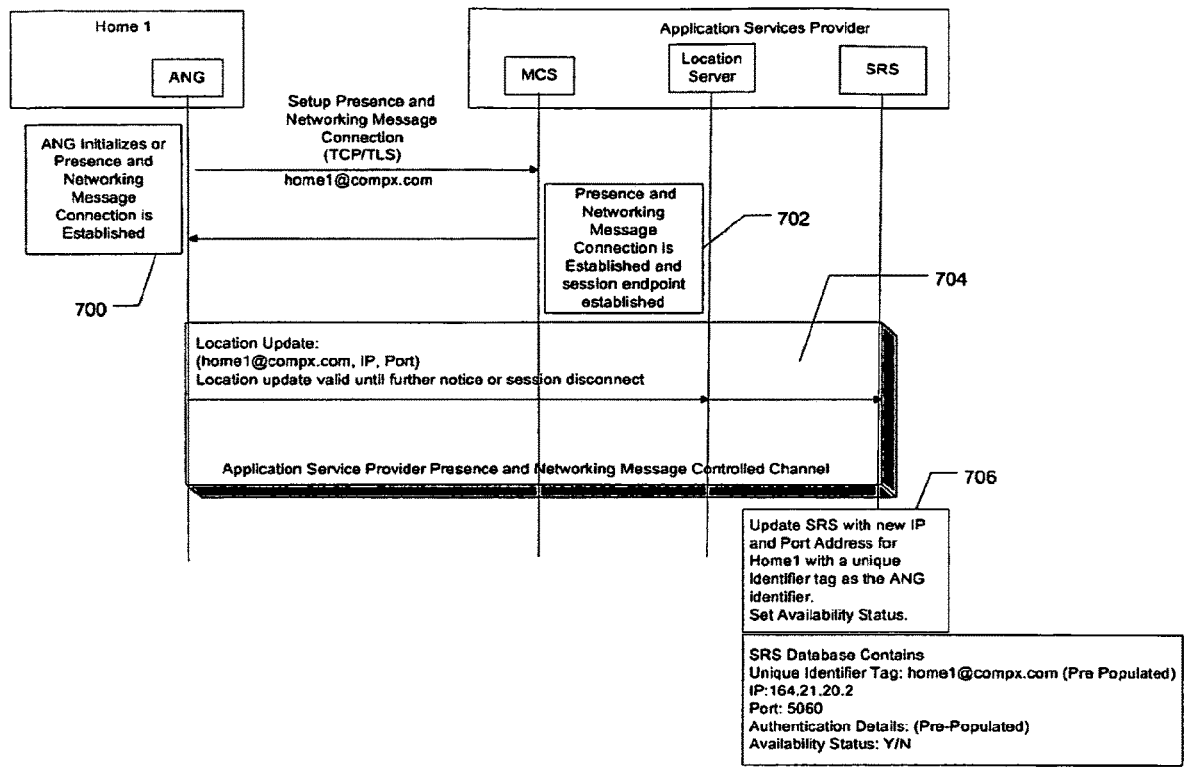
FIG. 7 depicts a flow diagram for an Application Network Gateway (ANG) establishing a connection and updating its associated information with an Application Services Provider.

FIG. 7 illustrates a flow diagram depicting an ANG establishing a secure connection with the Application Services Provider, and updating the Application Services Provider with the ANG's availability, IP address and application Port selection. Once the Application Services Provider has been updated with this information, it may store the information and provide that information to other ANGs that may request to communicate with the ANG of Home 1.

At step 700 shown in FIG. 7, the ANG may initialize or establish a messaging connection with the MCS of the Applications Service Provider. This connection may be either a secure or unsecure connection. At step 702, the secure messaging and presence connection is established between the ANG and the MCS, and the session communication endpoint may be established. At step 704, the location update of the ANG with the location server of the Application Services Provider is established as being valid until, for example, further updates are provided by the AN G or until the session is disconnected. The SRS of the Application Services Provider may be updated with a new IP and port address for ANG of Home 1 at step 706. Also, a unique identifier tag for the ANG may be established in the SRS database.

Figure 8:
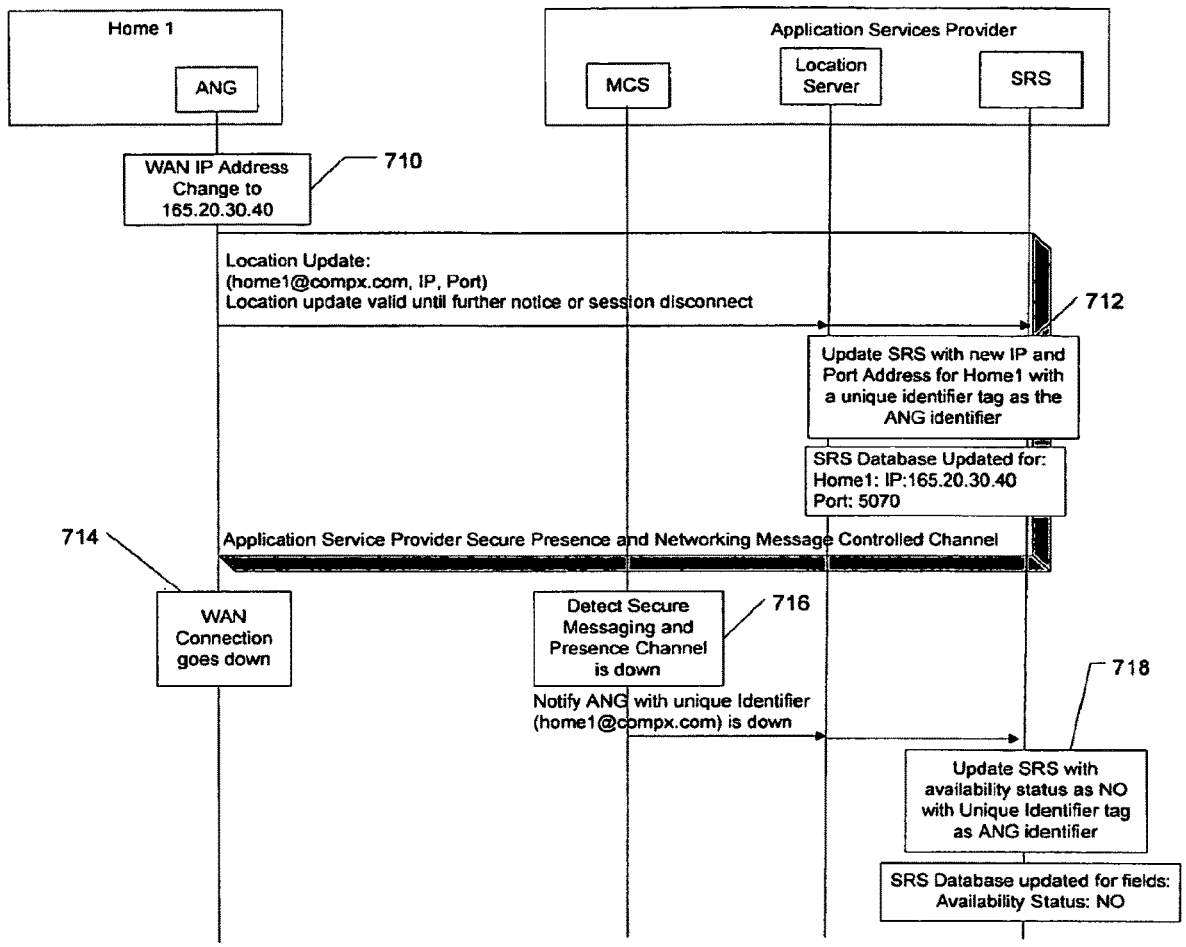
FIG. 8 depicts a flow diagram of the Application Network Gateway (ANG) updating the Application Services Provider's information after the ANG has experienced a network address change.

FIG. 8 illustrates the exemplary steps for the ANG updating the Application Service Provider's information after it has experienced an IP address change. The illustrated flow for creating a dynamic address table is depicted, as is the flow for updating the information associated with the ANG with the SRS. This update may be performed at a time that is not related to a particular application session initiation. The update of the SRS may be enabled by an application service provider presence and networking control channel.

At step 710 shown in FIG. 8, the ANG may initiate an IP address change. At step 712, the SRS may be updated with the new WAN IP and Port Address for the ANG of Home 1. The ANG may have a unique identifier tag in the SRS database for which this updated information is associated with. If the WAN connection between the ANG and the Application Services Provider is severed, disrupted, or otherwise unavailable (i.e., the connection is "down") at step 714, the MCS may detect that the presence and networking messaging channel is unavailable at step 716. At step 718, the SRS may be updated to indicate that it is not available because the WAN connection with the ANG with a particular identifier tag is unavailable. The SRS database fields may be updated to indicate that the availability status of the identified ANG has changed.

Figure 9:
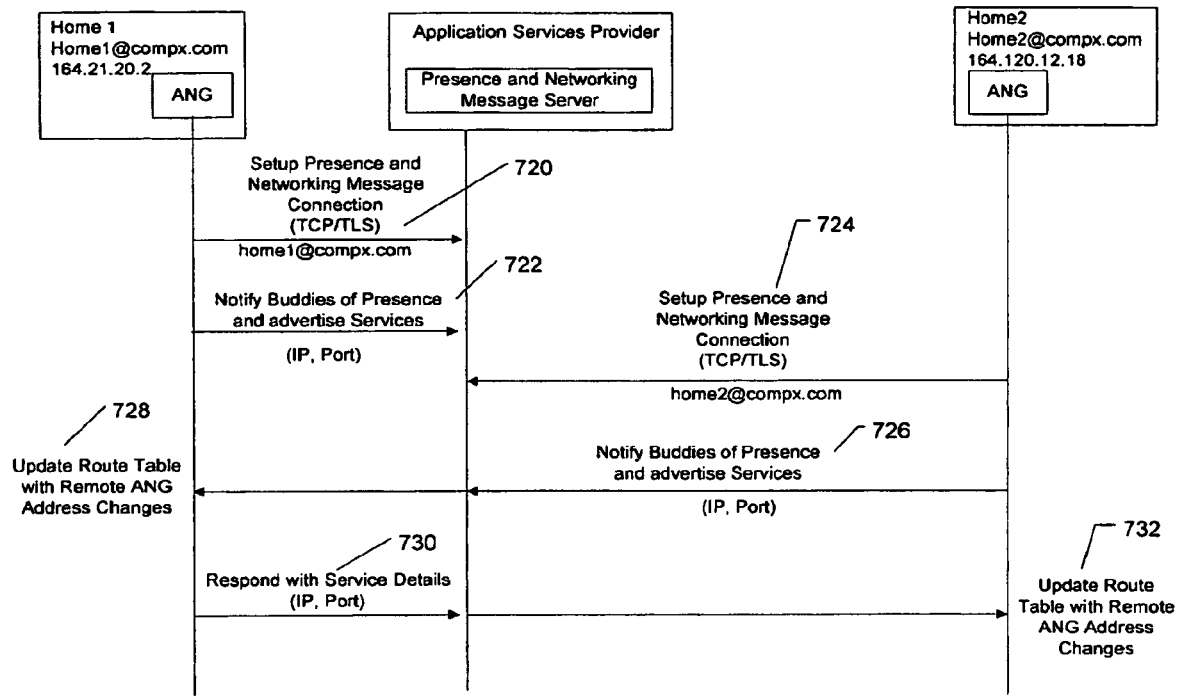
FIG. 9 depicts a flow diagram of two Application Network Gateways (ANGs), as managed by the Application Service Provider, communicating their attributes to one another.

FIG. 9 depicts a first ANG of Home 1 and a second ANG of Home 2, wherein both ANGs are managed by the Application Service Provider in order to communicate their attributes with each other. Each ANG may establish using a presence and networking message communications channel, which may be a secure or unsecure channel, with the Application Services Provider. Once a connection is established, the ANGs may retrieve the distant-end routing information (i.e., location information of the other ANG) if the ANG does not presently have such information. Once each ANG knows the location of the other ANG, they may establish a direct peer to peer connection. In addition, each ANG may update their respective application routing tables and attributes with each other.

As shown at step 720 of FIG. 9, the ANG of Home 1 may establish a presence and networking message communication connection with a presence and networking message server (e.g, IM server 99c or a presence and networking server that is part of service management center 50, etc.). At step 722, buddies in the buddy list of the ANG in Home 1 may be notified of the ANG's presence, as well as display the services offered by the ANG via the presence and networking message server. At step 724, the ANG at Home 2 may set up and establish a presence and networking message connection with the presence and networking message server. The ANG of Home 2, at step 726, may notify buddies of its presence, as well as present its services that are available. At step 728 the ANG of Home 1 may update the routing table with the remote ANG (i.e., the ANG of Home 2) address changes, as provided by the presence and networking message server. At step 730, the ANG of Home I may provide service details, such as IP address and port information to the ANG of Home 2 via the presence and networking server. The ANG of Home 2, at step 732, may update the routing table with the address changes of the ANG of Home 1.

Figure 10:
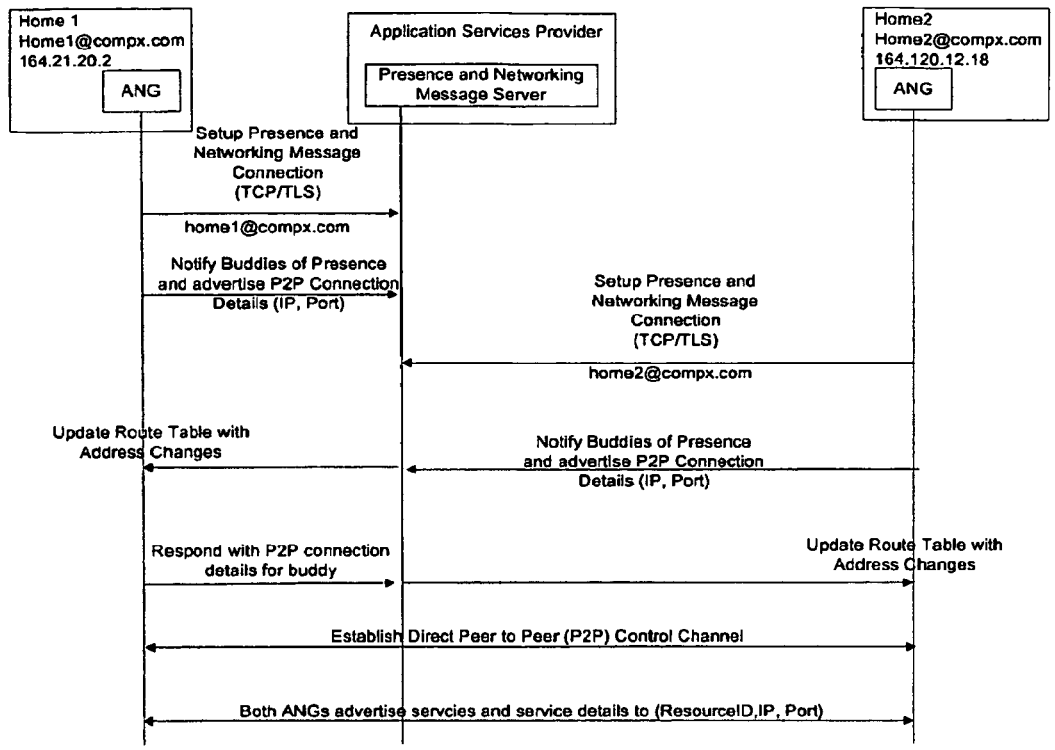
FIG. 10 depicts a flow diagram of two Application Network Gateways (ANGs) establishing a peer to peer connection between on another.

As shown in FIG. 10, the ANG of Home 1 and the ANG of Home 2 may establish a peer to peer presence and networking message connection between each other. The peer to peer connection may be established upon each ANG locating the other via the presence and networking message server or the service management center. Upon obtaining the routing information, each ANG may use the routing information to establish subsequent peer to peer sessions until there is an endpoint status change.

At step 740 illustrated in FIG. 10, the ANG of Home 1 may setup a presence and networking communication connection (which may be secure or unsecure) with the presence and networking messaging server. At step 742, the ANG of Home 1 may notify presence and networking message server of the presence of the ANG, as well as provide peer to peer connection information (e.g., IP address, port, etc.). Next, at step 744, ANG of Home 2 may setup and establish a presence and networking message connection with presence and networking message server. ANG of Home 2 may then notify buddies on the buddy list of the ANG's presence, as well as present peer to peer connection information to the presence and networking message server at step 746. The presence and networking message server, at step 748, may provide the peer to peer connection information (e.g., of the ANG of Home 2) to ANG of Home 1, and the ANG of Home 1 may update the route table with address changes. The ANG of Home I may present the peer to peer connection information for a buddy (e.g., ANG of Home 2) via the presence and networking server at step 750. ANG of Home 2 may update the route table with the address change information from ANG of Home 1 at step 752. Next, at step 754, a peer to peer control channel may be established between ANG of Home 1 and ANG of Home 2. ANGs of Home 1 and Home 2 may then present services and service details (e.g., resource identifier information, IP address, port information, etc.) to one another at step 756.

In providing peer to peer communications between gateway devices, a user of a first gateway device may control associated endpoint devices of a second gateway device, provided such endpoint devices and/or their functionalities are provided to the first gateway device. This may be based, for example, on the second gateway device being present in the buddy list of the first gateway device. For example, a user of the first gateway may control an endpoint device that is a garage door associated with a second gateway device. The user may determine the status of the garage door (e.g., open, closed, etc.), and may provide instructions to the garage door to open or close (e.g., based upon the received status information).

The gateway device 10 and its interactions with various endpoint devices and with the service management center 50 have been described with reference to diagrams of methods, apparatus (systems) and computer program products. It will be understood that elements and functions illustrated in the diagrams, can be implemented by computer program instructions running on one or more appropriately configured hardware platforms, e.g. to operate as a gateway device 10 or as one or more of the enumerated elements of the service management center 50. Hence, operations described above may be carried out by execution of software, firmware, or microcode operating on a computer other programmable device of any type. Additionally, code for implementing such operations may comprise computer instruction in any form (e.g. source code, object code, interpreted code, etc.) stored in or carried by any computer or machine readable medium.

IM Server and Gateway Device for Home Automation Control

Figure 11:
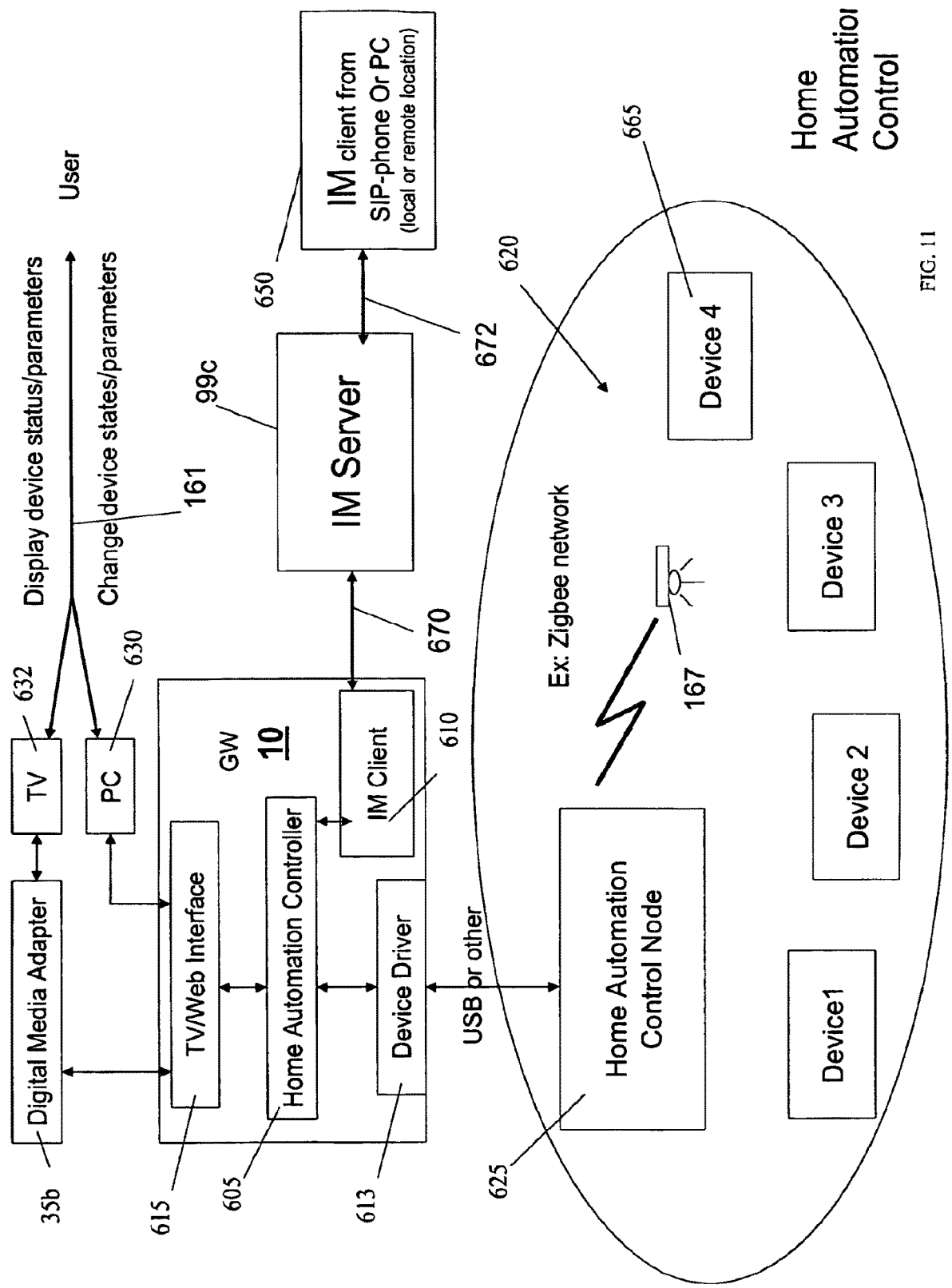
FIG. 11 is a home automation control network depicting a gateway device, a home automation control node and associated devices, TV and PC display devices, and a presence and networking message protocol client.

As described above in connection with FIG. 2, the gateway device 10 may be the central communication platform that interoperates with multiple devices in the home to form a home networking environment. FIG. 11 provides an exemplary home network that includes a home automated control.

In FIG. 11, central to the communication platform functionality is the provisioning of IM client functionality 610 at the gateway device 10. IM client functionality 610 may be enabled for client-server communications with an IM server 99c (e.g., which may be part of IM networks 99a and/or 99b of FIG. 4). IM server 99c may be a publicly-accessible IM server (e.g., Yahoo IM network, MSN IM network, etc.), or may be a privately-accessible IM server, either of which may be remotely located. IM server 99c, whether in a publicly or privately accessibly form, may enable communications between a remote IM client (e.g., IM client 650, etc.) and IM client 610 of gateway 10, for example, via a wide area network. IM client 650 may communicate with endpoint devices (e.g., device 665, etc.) that may be part of home automation network 620 via IM server 99c. Communication messages 672 from IM client 650 may be directed by IM server 99c to IM client 610 of gateway device 10. Home automation controller 605 and device driver 613 may process the communication messages 670 for endpoint devices (e.g., device 665) of home automation network 620. As endpoint devices of home automation network may not be enabled with IM client programming, and thus may not communicate with other IM devices using a presence and networking messaging protocol (e.g., an Instant Messaging protocol), device driver 613 may provide the communications to a respective endpoint device in the home automation network using a device driver communication protocol. Messages from one or more endpoint devices (e.g., endpoint device 65), such as alert messages, status messages, or other communications may be received by home automation control node 625, and then transmitted to device driver 613 of gateway device 10. Home automation controller 605 may be configured to direct the received message to a remote IM client. Accordingly, IM client 610 may "package" the message received from the endpoint device into a message that may be transmitted using a presence and networking message protocol.

In the context of home automation in FIG. 11, the gateway appliance 10 is additionally provisioned with a home automation controller device 605 that communicates with the IM client function 610 to facilitate home network management, including: a home automation controller 605 that interfaces with a TV/Web interface 615 that interfaces with the digital media adaptor component 635 and, a device driver 613 that interfaces with the home automation network 620 (e.g., Zigbee network) via a home automation control node 625 that is responsible for communicating with the "smart" devices designed for home automation. The digital media adaptor component 635 further communicates with the TV device 632 at the premises and, the TV/Web interface 615 further interfaces with the computing device, e.g., PC 630 at the premises. Further, the IM client functionality 610 interfaces with an IM client 650 that is either local (at the premises) or remote and may include a SIP phone or a PC.

In the context of home automation services, the appliance supports multiple types of home automation controllers and multiple protocol standards including a variety of non-IP protocol standards and vendor specific proprietary protocols such as Insteon, Zwave etc. This enables the user to integrate multiple vendor devices in the home. It is further understood that the controller device itself may support more than one automation protocol such as Insteon or (legacy) x10 devices and these protocols will be transported via RF or other suitable communication path. The gateway appliance 10 may communicate with controllers via vendor-specific protocols.

Via the IM client functionality 610 and IM server 99c, the local or remote IM client 650 may be provided with IM-based state notification messages, e.g., messages of any alarm generated. Although such messages may not be initially transmitted using a presence and networking message protocol (e.g., IM protocol), gateway 10 may be configured such that IM client 610 may transmit the messages (e.g., alert messages, etc.) received from messages to, for example, IM client device 650 using a presence and networking message protocol. The IM client device 650 may receive device state notification messages 672 via the appliance's e-mail application, a phone call, or at a PC directly. Thus, when events are detected, for example, a change in the device's status or parameter(s) the gateway appliance 10 generates alert notifications 670, via the notification manager which is part of the presence and networking module shown in FIG. 5C, for receipt at the IM client device via IM server.

Moreover, as shown in FIG. 11, via the IM client 610 functionality, a user may control home networking devices 665 or home automation devices locally or remotely. For example, this functionality specifically enables a user to configure and control networking devices and home automation devices, e.g., networked light switch controlling light fixture 167 to show up as controllable entities, via a list (not shown), on another device, e.g., the PC 630 or television 632 via digital media adaptor 35b such as shown in FIG. 11. Thus, users receive immediate notifications of changes or check on connectivity or status of the home devices via communications from the gateway 10. Thus, gateway device 10 may be programmed through a service offering or as a default, to enable the notification directly on the TV via overlay onto a video signal at the home.

Figure 12:
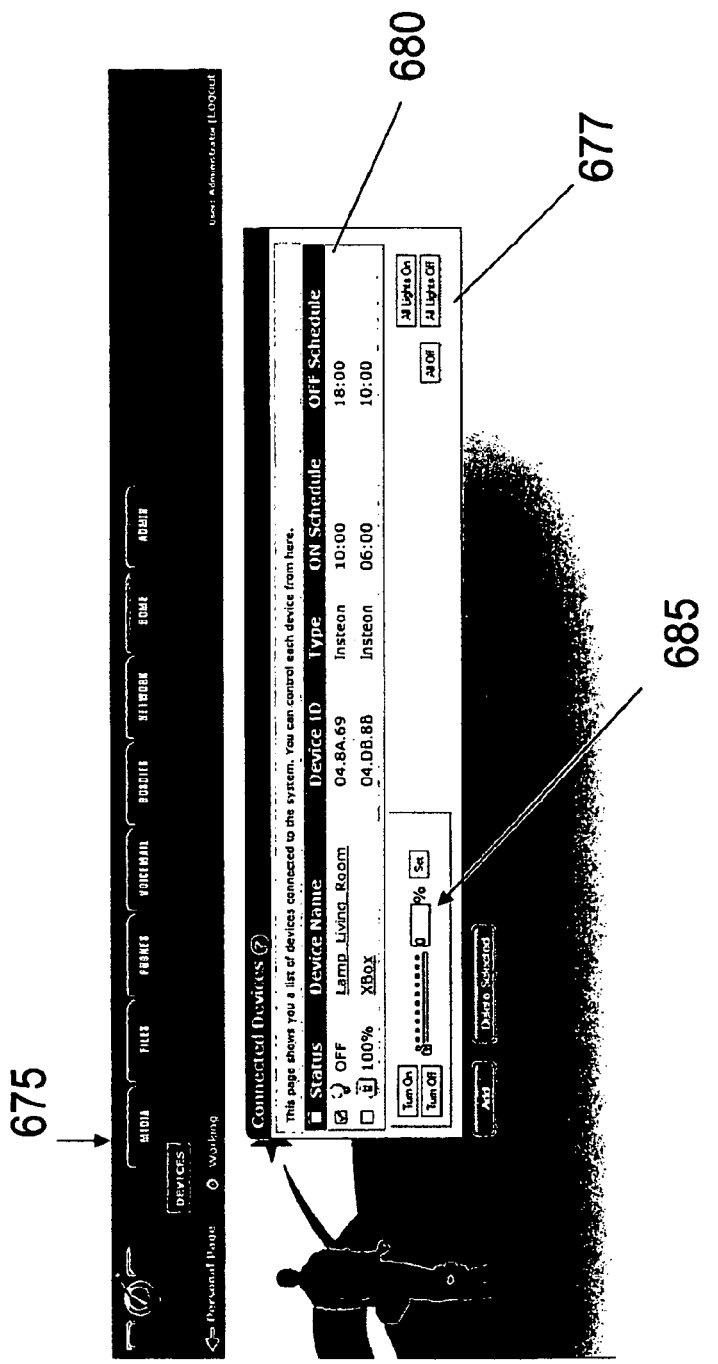
FIG. 12 depicts an exemplary user interface showing a generated list of devices connected to the gateway and their current status.

Additionally, gateway device 10, through its device registry which is part of the presence and networking module (e.g., IM client 610, etc.), provides a list of the device state/parameters (status) 162 of many devices that are connected to the gateway for additional control services, e.g., via a local PC client notification message 161. One example of such a notification is shown in FIG. 12, which depicts an exemplary user interface 675 showing a generated list 680 of devices connected to the gateway 610 and their current status. Although devices connected to home automation control network 620 may not have presence and network message capabilities, device driver 613 may communicate with each endpoint device of home automation control network 620 to determine the status and functionalities of the endpoint device, and provide the status and functionality information to a local or remote IM client device (e.g., IM client device 650).

As described herein, gateway device 10 may have a configuration data file (e.g., similar to configuration data 520 shown in FIG. 2) that may be accessible by a user of gateway 10 or by a service provider, where the configuration file data is configurable so as to indicate the level of "transparency" of whether an endpoint device is connected to the home automation network 620, what features are available, what the status of the endpoint device is, etc. User interface 675, as illustrated in FIG. 12, may be used to configure various endpoint devices.

For example, as shown in FIG. 12, the presented columns include the device, device identifier, the device status (e.g., ON/OFF), a type of device it is, and its scheduled operation/activity. Using the interface, a user may be able to control or change the status of a device, e.g., lights, by selecting on/off functionality embodied as user selectable buttons 677. The home automation controller functionality 605 of the gateway appliance 10 responds by generating appropriate signals that are forwarded to the home automation control node 625 to effect the status change of a particular device. In one embodiment, an additional control interface 685 is provided to effect a change in analog type devices, e.g., dimmer switch.

Thus, in using the exemplary interface, a user may check on the status of each of these devices and send commands to change the status information. Any change in status of these devices will come as notifications or alerts. For example, an assisted living device 665, e.g., a sensor, monitors user behavior or biological function and checks behavioral patterns against stored patterns. If there is determined a break in the pattern, when detected by the system, an automatic notification may be generated and provided to a user endpoint device, e.g., the PC or TV, etc.

As described herein with respect to file and content sharing, the gateway appliances are able to communicate with each other to share information through using IM clients at each gateway device, wherein presence and networking messages are sent via an IM server to one more gateway devices IM server functionality provided at the appliance. The messages and commands may be communicated through a secure network connection.

IM Access and Control Display

As described above in connection with FIG. 11, the home automation service network is supported at least in part by gateway appliance 10, wherein the home automation service may be accessible by a user through a presence and networking protocol client (e.g., IM client) from a PC or any other suitable interface. Particularly, the gateway appliance 10 may be configured to appear as a buddy in the user's buddy list. However, as the one or more of the endpoint device connected to gateway device 10 do not themselves have presence and networking message capabilities, they may not appear in the buddy list. The gateway appliance 10 may provide a listing of endpoint devices and their functions to a local or remote IM client. Which endpoint devices are "visible" by a remote client, as well as their respective available functions, may be, as described above, configurable by a user or by a service provider. The name for the gateway appliance 10 itself as it appears in an IM buddy client list is also configurable.

Once a user selects the gateway appliance buddy from the buddy list, a number of events may occur. The user may enter into an IM "chat" mode. A menu option such as "home automation" may be presented to the user. Upon selection of the "home automation" option, the user may be prompted for a password. Once password authenticated, the user is capable of requesting status of one or more of the endpoint devices of the home automation network that are configured to be visible during an IM session and report status information. The user may also change the status of a selected device, and may elect to receive notifications from a device (e.g., a user may update a configuration of the gateway device such that associated endpoint devices may provide notifications). An exemplary IM interface dialog may be presented to the user that displays one or more of the following: whether any events have occurred in which may require user input, such that the user is prompted to enter an instruction; request a Status Check; Change a device status; and Review an event log. In one example, upon selection of change device status request, the user is prompted to select from options such as device type, (e.g., light switch, garage door, outlet, sprinkler system, etc.), a Main Menu option, or any other suitable option. Furthermore, in one example, upon selection of a device, (e.g., a garage door, etc.) the user is prompted with additional selection options related to the first selection (e.g., select a first garage door, a second garage door, etc.). Thus, the user interaction with gateway appliance 10 and associated endpoint devices may text based and/or menu driven.

Program aspects of the technology may be thought of a "products," typically in the form of executable code and/or associated data for implementing desired functionality, which is carried on or embodied in a type of machine readable medium. In this way, computer program instructions may be provided to a processor of a general purpose computer, special purpose computer, embedded processor or other programmable data processing apparatus to produce a machine, such that the instructions, which execute via the processor of the computer or other programmable data processing apparatus, so as to implement functions described above.

Terms regarding computer or machine "readable medium" (or media) as used herein therefore relate to any storage medium and any physical or carrier wave transmission medium, which participates in providing instructions or code or data to a processor for execution or processing. Storage media include any or all of the memory of the gateway device or associated modules thereof or any of the hardware platforms as may be used in the service management center, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer into another computer, for example, from the updater 51 a hardware platform for a gateway device 10 or from another source into an element of the service management center 50. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. Hence, the broad class of media that may bear the instructions or data encompass many forms, including but not limited to, non-volatile storage media, volatile storage media as well as carrier wave and physical forms of transmission media.

Those skilled in the art will recognize that the teachings of this disclosure may be modified, extended and/or applied in a variety of ways. An extension of the system architecture, for example, provides the ability of various and disparate third-party application service providers to provide multiple application services independently. Application services are managed by the "managed" service provider through the service management center 50, meaning, generally, authorizing, provisioning, and monitoring the usage of a particular application service. This can be accomplished in a variety of ways with varying degrees of involvement of, or coordination with, the service management center. The service management center 50 could manage these items "soup-to-nuts" or have minimal involvement. For example, the service management center 50 could deal directly with the third-party service provider to acquire application services at the request of a user and manage the delivery, authorization, usage-monitoring and upgrading of the application service. At the other end of the spectrum, the managed service provider may have arrangements with the third-party application service provider by which orders or requests from the users may come directly to the third-party application service provider, and services are delivered to the user by the third-party service provider who in turn coordinates with the managed service provider to register and monitor the particular application service placed in the gateway device 10. It should be noted that this ability to manage application services extends through the gateway device into the endpoint devices registered or associated with the gateway or network.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A communication device for use at a user premises to provide interactive user voice-controlled home automation, comprising;
   (a) a first interface for enabling communications with at least one endpoint device located within the user premises;
   (b) a second interface for enabling communications of the communication device at the user premises via a wide area network;
   (c) a local processor coupled to the interfaces;
   (d) local storage coupled to the processor; and
   (e) programming in the storage including:
      (1) a communications program for configuring the communication device to communicate via the first interface with the at least one endpoint device, associate the at least one endpoint device with the communication device, and communicate with at least one remote server each associated with at least one of a plurality of third-party applications that are stored locally on the communication device, wherein each third-party application is configured for authentication with a respective one of a plurality of third-party service providers, wherein each of the third-party applications is capable of being accessed and controlled via the at least one endpoint device, and wherein the communication device:
      stores authentication information in the local storage;
      executes one of the locally stored third-party applications to authenticate the communication device with the respective one of the plurality of third-party service providers based on the locally stored authentication information, wherein at least a portion of the locally stored authentication information is obtained in response to an initial registration with the respective one of the plurality of third-party service provider, wherein the authenticating is independent of authenticating the communication device with other ones of the plurality of third-party service providers;
      in response to successful authentication of the communication device,
         establishes bi-directional communication with the respective one of the plurality of third-party service providers that has authenticated the communication device, independently from other ones of the plurality of third-party service providers, wherein the at least a portion of the locally stored authentication information is used for renewing key-based authentication for the bi-directional communication with the respective one of the plurality of third-party service provider,
         receives, via the wide area network, media from the respective one of the plurality of third-party service providers,
         sends, via the one of the locally stored third-party applications, the received media to the at least one endpoint device such that the media is displayed on a display of the at least one endpoint device, and
         causes the display of the at least one endpoint device to display an interface for controlling at least one of displaying of the media or media control functions; and
      (2) a control program providing operations via a controller associated with the communication device having voice protocols, wherein in response to successful authentication of the communication device, the control program enables the user to provide voice commands to control, via the one of the locally stored third-party applications, displaying of the media by the at least one endpoint device, wherein the voice commands are provided through the communication device and/or a remote client.

2. The communication device of claim 1, further including in the storage at least one of: IP protocol standards, non-IP protocol standards, and vendor specific protocols, and also configured to enable in-premise protocol messaging with the at least one endpoint device, retrieval of presence and a status information from the at least one endpoint device, and remote monitoring and control of vendor diverse devices located within the premises.

3. The communication device of claim 2, wherein the remote monitoring and control of vendor diverse devices is via endpoint devices associated with the communication device.

4. The communication device of claim 1, wherein the wide area network provides communications of the communication device with the remote server to access a service management center.

5. The communication device of claim 1, wherein the programming, when executed by the processor, causes the communication device to provide enforcement regarding authorization, authentication, configuration, or use of the communication device via the remote client to access and control the at least one endpoint device.

6. The communication device of claim 1, wherein the programming, executed by the processor, causes the communication device to further provide management of application services based upon communications of the communication device with a service management center via the wide area network through the second interface.

7. The communication device of claim 1, wherein the programming enables the first or second interface of the communication device to establish peer communications between the communication device and the remote server via the wide area network.

8. The communication device of claim 1, wherein the remote client is provided in the form of at least one of: a personal computer, a cell phone, a personal digital assistant, a remote control, a television, a set top box, or any combination thereof, and includes a user interface to access the third-party applications.

9. The communication device of claim 1, wherein the programming in the storage includes configuration data for management, responses, and interactions with the at least one endpoint device in response to communications between the communication device and the remote server via the wide area network.

10. The communication device of claim 1, wherein the voice protocols for communications between the communication device and the remote server comprise an instant messaging protocol.

11. The communication device of claim 8, wherein the user interface is enabled by at least one of a driver and a communications protocol accessible from at least one of the communication device or the remote server and enables the user to determine at least one of status, change, configuration, event log, or any combination thereof for the at least one endpoint device.

12. The communication device of claim 1, wherein the programming in the communication device further enables communications with a second communication device via the remote server.

13. The communication device of claim 12, wherein the programming in the communication device configures the communication device to communicate over the wide area network and receive network address information from the second communication device such that the address information enables the communication device to establish peer to peer communication with the second communication device.

14. The communication device of claim 1, wherein the programming in the communication device further enables communications with a second communication device via the remote server.

15. The communication device of claim 14, wherein the programming in the communication device configures the communication device to communicate over the wide area network and receive network address information from the second communication device such that the address information enables the communication device to establish peer to peer communication with the second communication device.

16. The communication device of claim 1, wherein media content is displayed on the endpoint device.

17. The communication device of claim 1, wherein control of the plurality of third-party applications via the at least one endpoint device includes setting limitations configured to prevent access to one or more of the third-party applications and/or a portion of media content associated with the plurality of third-party applications.

18. The communication device of claim 1, wherein the wide area network enabling communications of the communication device can be enabled and/or disabled via a display of the at least one endpoint device.

19. The communication device of claim 1, wherein the controller is part of the communication device.

20. A system for enabling the operation and management of interactive user voice-control, the system comprising:

a communication device configured for operation at a user premises and including:
  (a) a first interface for enabling communications with at least one endpoint device located within the user premises;
  (b) a second interface for enabling communications of the communication device at the user premises via a wide area network;
  (c) a local processor coupled to the interfaces;
  (d) local storage coupled to the processor and configured to store a plurality of third-party programming each configured for authentication by a respective one of a plurality of third-party service providers, and
  (e) programming in the storage including:
    (1) programming for executing one of the third-party programming in the local storage to authenticate the communication device with the respective one of the plurality of third-party service providers using authentication information locally stored on the local storage, wherein the at least a portion of the locally stored authentication information is obtained based on an initial registration with the respective one of the plurality of third-party service providers,
    (2) a communications program for configuring the communication device to associate the at least one endpoint device and enable communications by communication device via the interfaces with the at least one endpoint device and with a remote server to establish bi-directional communication with the respective one of the plurality of third-party service providers in response to successful authentication of the communication device, wherein the communication device receives media transmitted via the wide area network and sends the received media to the at least one endpoint device, wherein the third-party programming associated with the respective third-party service provider provides control of displaying of the media by a display of the at least one endpoint device, and wherein the at least a portion of the locally stored authentication information is used for renewing key-based authentication for the bi-directional communication with the respective one of the plurality of third-party service provider; and
    (3) in response to the successful authentication of the communication device and via the one of the third-party programming, a control program having voice automation protocols capable of enabling interactive voice-enabled control of the media displayed by the at least one endpoint device through at least one of the communication device, a remote client, or the at least one endpoint device.

21. The system of claim 20, further including in the storage at least one of IP protocol standards, non-IP protocol standards, or vendor specific protocols, and also configured to enable in-premise protocol messaging with the at least one endpoint device, retrieval of presence and a status information from the at least one endpoint device, and remote monitoring and control of vendor diverse devices located within the premises.

22. The system of claim 21, wherein the remote monitoring and control of vendor diverse home automation devices is via endpoint devices associated with the communication device.

23. The system of claim 20, wherein the wide area network provides communications of the communication device with the remote server to access a service management center.

24. The system of claim 20, wherein execution of the programming by the processor causes the communication device to provide enforcement regarding authorization, authentication, configuration, or use of the communication device via the client to access and control the at least one endpoint device.

25. The system of claim 20, wherein the execution of the programming by the processor causes the communication device to further provide management of application services based upon communications of the communication device with the service management center via the wide area network through the second interface.

26. The system of claim 20, wherein the programming enables the first or second interface of the communication device to establish peer communications between the communication device and the remote server via the wide area network.

27. The system of claim 20, wherein the remote client is provided in the form of at least one of a personal computer, a cell phone, a personal digital assistant, a remote control, a television, a set top box or any combination thereof, and includes a user interface to access the third-party programming.

28. The system of claim 27, wherein the user interface is enabled by at least one of a driver and a communications protocol accessible from at least one of the communication device or the remote server and enables the user to determine at least one of status, change, configuration, event log, or any combination thereof for the at least one endpoint device.

29. The system of claim 20, wherein the programming in the storage includes configuration data for management, responses, and interactions with the at least one endpoint device in response to communications between the communication device and the remote server via the wide area network.

30. The system of claim 20, wherein the voice automation protocols for communications between the communication device and the remote server comprise an instant messaging type protocol.

31. The system of claim 20, wherein the communication device transmits a list of functionalities to a second communication device via peer to peer communications between the communication device and the second communication device.

32. The system of claim 31, further comprising a first associated endpoint device that is a remote control, wherein the communication device is enabled to receive a signal from the remote control via a driver communications protocol of a driver program, and wherein the communication device controls and manages a second associated endpoint device via the driver program based on the received signal from the remote control.

33. A method for operating a communication device at a user premises to provide and manage interactive user voice-controlled services and enable the provision of a service from at least one endpoint device associated with the communication device, the method comprising;
(a) providing a communication device including a first interface for enabling communications with at least one endpoint device located within the user premises, a second interface for enabling communications of the communication device at the user premises via a wide area network, a processor coupled to the interfaces, and programming in a storage of the communication device to utilize protocols and enable communications, voice recognition, endpoint association, and/or endpoint management, the storage having a plurality of locally stored third-party applications each configured to perform authentication with a respective one of a plurality of third-party service providers;
(b) configuring the communication device for bi-directional communication with the respective one of the third-party service providers to provide information for authorization and/or authentication by the respective one of the third-party service providers based, at least in part, on one or more locally stored credentials that are obtained in response to an initial registration with the respective one of the third-party service providers, wherein the one or more locally stored credentials are used for renewing key-based authorization and/or authentication for the bi-directional communication with the respective one of the plurality of third-party service provider;
(c) after authentication, via one of the locally stored third-party applications, by the respective one of the plurality of third-party service providers, the one of the locally stored third-party applications manages delivery of media from the respective one of the plurality of third-party service providers to the at least one endpoint device and displaying of the delivered media by the at least one endpoint device, wherein the media includes at least one of video or music; and
(d) accessing a control program to configure the communication device with voice automation protocols to enable interactive voice-enabled control of one or more endpoint devices via voice commands provided from a user through at least one of the communication device, a remote client, and/or the at least one endpoint device such that the user is capable of providing voice commands to control, via the one of the locally stored third-party applications and in response to successful authentication, automate functions associated with the one or more endpoint devices providing the media.

34. The method of claim 33, wherein at least one of the communication device and the storage contains at least one of: IP protocol standards, non-IP protocol standards, and vendor specific protocols, and the communication device is further configured to enable in-premise protocol messaging with the at least one endpoint device, retrieval of presence and a status information from the at least one endpoint device, and remote monitoring and control of vendor diverse devices located within the premises.

35. The method of claim 34, wherein the remote monitoring and control of vendor diverse home automation devices is conducted via endpoint devices associated with the communication device.

36. The method of claim 33, wherein the wide area network enables communications of the communication device with a remote server to access a service management center.

37. The method of claim 33, wherein execution of the programming by the processor further enables the communication device to enforce at least one of authorization, authentication, configuration, and use of the communication device to access and control the at least one endpoint device.

38. The method of claim 33, wherein execution of the programming by the processor causes the communication device to further provide management of the application services based upon communications of the communication device with a service management center via the wide area network.

39. The method of claim 33, wherein execution of the programming enables the first or second interface of the communication device to establish peer communications between the communication device and the remote server via the wide area network.

40. The method of claim 33, wherein the remote client is provided in the form of at least one of: a personal computer, a cell phone, a personal digital assistant, a remote control, a television, a set top box, or any combination thereof, and includes a user interface to access the plurality of locally stored third-party applications.

41. The method of claim 40, wherein the user interface is enabled by at least one of a driver and a communications protocol accessible from at least one of the communication device or the remote server and enables the user to determine at least one of status, change, configuration, event log, or any combination thereof for the at least one endpoint device.

42. The method of claim 33, wherein the programming in the storage includes configuration data for management, responses, and interactions with the at least one endpoint device in response to communications between the communication device and the remote server via the wide area network.

43. The method of claim 33, wherein a controller further enables the user to provide voice commands that enable messaging protocols for communications between the communication device and the remote server via at least one instant messaging protocol.

44. The method of claim 33, wherein the programming in the communication device further enables communications with a second communication device via the remote server.

45. The method of claim 44, wherein the programming in the communication device configures the communication device to communicate over the wide area network and receive network address information from the second communication device such that the address information enables the communication device to establish peer to peer communication with the second communication device.

46. A communication system for use at a user premises to manage interactive user voice-controlled services, comprising:
  a communication device including:
    a first interface configured to enable communications of the communication device with at least one television located within the user premises;
    a second interface configured to enable communications of the communication device via a wide area network;
    a processor coupled to the first and second interfaces; and
    memory coupled to the processor and including:
      a communications program configured to allow the communication device to communicate via the first and second interfaces with the at least one television and at least one remote server,
      a plurality of locally stored third-party applications, wherein a respective one of the locally stored third-party applications is configured to establish communication with a respective third-party service provider to enable authentication by the respective third-party service provider based, at least in part, on authentication information locally stored in the memory, wherein at least a portion of the locally stored authentication information is obtained in response to an initial registration with the respective third-party service provider, wherein the communication is independent of the other third-party service providers associated with other ones of the locally stored third-party applications, wherein in response to the authentication, the respective one of the locally stored third-party applications enables media to be streamed to the television, and wherein the at least a portion of the locally stored authentication information is used to renew authentication during streaming of the media; and
      a control program having voice protocols configured to enable, in response to the authentication, interactive voice-enabled control of the respective one of the locally stored third-party applications by a user within the user premises.

47. The communication system of claim 46, wherein the voice commands provided from the user are received via a controller associated with the communication device, wherein the controller is configured to control functions associated with the at least one television or the communication device.

48. The communication system of claim 46, further comprising a controller configured to communicate with and control the communication device.

49. A communication device for use at a user premises, the communication device comprising:
  at least one interface that enables communication with at least one endpoint device at the user premises and communication via a wide area network;
  one or more processors; and
  local storage that stores authentication information, wherein the local storage includes
    authentication information;
    a plurality of third-party applications for enabling communication with a respective one of a plurality of third-party service providers;
  wherein the communication device
    executes one of the locally stored third-party applications to authenticate the communication device with the respective one of the plurality of third-party service providers based on at least a portion of the locally stored authentication information, wherein the authentication is independent of authentication of the communication device by other ones of the plurality of third-party service providers and wherein the at least a portion of the locally stored authentication information is obtained based, at least in part, on an initial registration with the respective one of the plurality of third-party service providers;
    in response to successful authentication of the communication device, the communication device communicates with the respective one of the plurality of third-party service providers that has authenticated the communication device to receive media from the respective one of the plurality of third-party service providers, wherein the at least a portion of the locally stored authentication information is used to renew key-based authentication for communicating with the respective one of the plurality of third-party service providers; and enables a user to provide voice commands to the communication device to control displaying of the received media by the at least one endpoint device.

50. The communication device of claim 49, wherein the voice commands are provided through the communication device and/or a remote client.

* * * * *

UNITED STATES PATENT AND TRADEMARK OFFICE
CERTIFICATE OF CORRECTION

PATENT NO. : 10,530,598 B2  
APPLICATION NO. : 14/962165  
DATED : January 7, 2020  
INVENTOR(S) : Ansari et al.

Page 1 of 1

It is certified that error appears in the above-identified patent and that said Letters Patent is hereby corrected as shown below:

On the Title Page

In item (57), in Column 2, in "Abstract", Line 5, delete "use" and insert -- user --, therefor.

On page 2, in item (57), in Column 1, in "Abstract", Line 1, delete "an" and insert -- and --, therefor.

In the Specification

In Column 1, Line 6, delete "Nov" and insert -- Nov. --, therefor.

In Column 1, Lines 7-8, delete "ENDPO LN IT" and insert -- ENDPOINT --, therefor.

In Column 1, Line 9, delete "PREMISES"" and insert -- PREMISES," --, therefor.

In Column 1, Line 10, delete "PCT/US2007/1019534," and insert -- PCT/US2007/019534, --, therefor.

In Column 1, Line 10, delete "Sep" and insert -- Sep. --, therefor.

In Column 10, Line 6, delete "7of" and insert -- 7 of --, therefor.

In Column 12, Line 37, delete "a an" and insert -- an --, therefor.

In Column 20, Line 13, delete "UNDA-DA" and insert -- UNA-DA --, therefor.

In Column 31, Line 53, delete "3providing" and insert -- 3) providing --, therefor.

In Column 41, Line 6, delete "AN G" and insert -- ANG --, therefor.

Signed and Sealed this  
Twenty-first Day of April, 2020

Andrei Iancu  
*Director of the United States Patent and Trademark Office*